(12) United States Patent
Dasher et al.

(10) Patent No.: US 12,501,115 B2
(45) Date of Patent: Dec. 16, 2025

(54) SYSTEMS AND METHODS FOR PROVIDING INTERACTIVE CONTENT DURING A PRESENTATION OF A LIVE PROGRAM

(71) Applicant: Adeia Guides Inc., San Jose, CA (US)

(72) Inventors: Charles Dasher, Lawrenceville, GA (US); Christopher Phillips, Hartwell, GA (US); Serhad Doken, Bryn Mawr, PA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 161 days.

(21) Appl. No.: 18/228,391

(22) Filed: Jul. 31, 2023

(65) Prior Publication Data

US 2025/0047946 A1    Feb. 6, 2025

(51) Int. Cl.
*H04N 21/475* (2011.01)
*H04N 21/2187* (2011.01)
*H04N 21/258* (2011.01)

(52) U.S. Cl.
CPC ..... *H04N 21/4758* (2013.01); *H04N 21/2187* (2013.01); *H04N 21/25841* (2013.01)

(58) Field of Classification Search
None
See application file for complete search history.

(56) References Cited

U.S. PATENT DOCUMENTS

| | | | |
|---|---|---|---|
| 10,805,656 B1 * | 10/2020 | Jackson | H04N 21/64322 |
| 10,856,036 B2 | 12/2020 | Nasir et al. | |
| 2008/0086742 A1 * | 4/2008 | Aldrey | H04H 60/33 |
| | | | 725/24 |
| 2009/0089838 A1 * | 4/2009 | Pino, Jr. | H04N 21/4758 |
| | | | 725/40 |
| 2009/0312103 A1 * | 12/2009 | Chen | H04N 21/475 |
| | | | 463/43 |
| 2014/0157307 A1 * | 6/2014 | Cox | H04N 21/47214 |
| | | | 725/34 |
| 2020/0099976 A1 * | 3/2020 | Nasir | H04N 21/47217 |

(Continued)

OTHER PUBLICATIONS

"Fubo TV aces sports betting business," [retrieved from URL: https://www.sportspromedia.com/news/fubotv-sportsbook-gaming-betting-closure-q3-2022/?zephr_sso_ott=MXgcDw], 1-3 (Oct. 18, 2022).

(Continued)

*Primary Examiner* — Jason K Lin
(74) *Attorney, Agent, or Firm* — HALEY GUILIANO LLP

(57) ABSTRACT

Systems, methods, and apparatuses are described herein for generating, for presentation at a particular computing device, a display of a live program and determining that the display of the live program at the particular computing device is delayed in relation to a live program stream of the live program. Interactive content related to a particular event that is to occur in the live program stream of the live program may be received, the interactive content enabling selection of a predicted outcome of the particular event. Prior to presentation of the particular event in the display of the live program at the particular computing device, the interactive content may be generated for presentation at the particular computing device, and a selection of the predicted outcome is received. Based on determining an outcome of the particular event, an indication of whether the predicted outcome was correct may be generated for presentation.

19 Claims, 34 Drawing Sheets

(56) References Cited

U.S. PATENT DOCUMENTS

2022/0417603 A1\* 12/2022 Pleiman ............... H04N 21/478
2023/0106936 A1\*  4/2023 Dinsdale ............. G07F 17/3288
                                                            463/25
2023/0319346 A1\* 10/2023 Panchaksharaiah .........................
                                                      H04N 21/21805
                                                            382/190

OTHER PUBLICATIONS

Epstein, A., "Live Sports betting is coming to your TV screen," [retrieved from URL: https://www.yahoo.com/video/live-sports-betting-coming-tv-193526011.html], 1-6 (Mar. 3, 2021).

\* cited by examiner

SYSTEMS AND METHODS FOR PROVIDING INTERACTIVE CONTENT DURING A PRESENTATION OF A LIVE PROGRAM

BACKGROUND

The present disclosure is directed to systems and methods for providing interactive content (e.g., an opportunity to predict an outcome) in relation to a particular event that is to occur in a live program. More particularly, techniques are disclosed for providing, at a computing device, interactive content prior to presentation of a particular event in a display of the live program, and receiving selection of the predicted outcome, where the display of the live program at the computing device may be delayed relative to a live program stream of the live program.

SUMMARY

Modern media distribution systems enable a user to access more media content than ever before, and on more devices than ever before. A transmission of media content may include a variety of interactive content related to the media content, that may enhance the user experience and allow users to better interact with the media content.

Time-shifting technologies, which enable a user to request to delay a broadcast of a live event to a later time than a real-time start of the broadcast, have also enhanced the user experience by allowing users to consume the media content at a time that is convenient for the user. But such technologies (as well as processing delays between a real-time occurrence and its broadcast, even in the absence of user-initiated time-shifting being employed) may cause time-sensitive interactive content (e.g., a poll related to particular portions of media content) to be no longer available, or to be outdated, by the time the users consume a portion of the media content related to the interactive content. This may cause content platforms providing digital polls (e.g., prediction polls) to lose respondents who are consuming live programs in a time-shifted (or otherwise delayed) manner.

To help overcome these drawbacks, systems, methods and apparatuses are disclosed herein for generating, for presentation at a particular computing device, a display of a live program; determining that the display of the live program at the particular computing device is delayed in relation to a live program stream of the live program; receiving interactive content related to a particular event that is to occur in the live program stream of the live program, wherein the interactive content enables selection of a predicted outcome of the particular event; generating for presentation, at the particular computing device and prior to presentation of the particular event in the display of the live program at the particular computing device, the interactive content; receiving, via the particular computing device, the selection of the predicted outcome associated with the interactive content; and, based on determining an outcome of the particular event, generating for presentation an indication of whether the predicted outcome was correct.

Such aspects may enable a user who is consuming content that is delayed (e.g., based on a user request to do so, or the user joining the stream later than a start time, or otherwise based on processing delays and/or network delays) relative to a live media stream and/or broadcast of the content to nonetheless be provided with interactive content (e.g., a poll or other opportunity to predict an outcome). Such interactive content may be relevant to portion(s) of a live program (e.g., depicting a live event) that are occurring in real time (e.g., in the live event, and near real time in the live program stream of the live program), even if based on the user's current progress point, such portion(s) of the content will have concluded by the time the user reaches the portion during his or her consumption session. Such features may enable providing an improved user interface for, and managing timing for, providing interactive content when the user's current content consumption session is time-shifted. Moreover, such features may enable improved accuracy, improved participation and engagement on the content platform, and improved scalability with respect to providing opportunities for, and receiving selections of, predicted outcomes of portions of a live event or other content.

In some embodiments, generating for presentation the indication of whether the predicted outcome was correct is performed prior to presentation of the particular event in the display of the live program at the particular computing device. Such aspects may increase a time-shifted user's engagement with interactive content, such as by encouraging a user to continue consuming content from a current progress point rather than fast-forwarding to a currently occurring event or future event. For example, the user may be enabled to select predictions in relation to future portions of the content and be informed of a prediction result on a same device when such result is final.

In some embodiments, generating for presentation the indication of whether the predicted outcome was correct is performed during or after the presentation of the particular event in the display of the live program at the particular computing device. In some circumstances, this may be desirable, to increase a time-shifted user's engagement with interactive content, such as by encouraging a user to continue consuming content from a current progress point rather than fast-forwarding to real-time by giving the user a glimpse or notification of a future event. For example, the user may be enabled to select predictions in relation to future portions of the content, and while still avoiding spoilers as to the future events, e.g., providing the result of the prediction when the user views the relevant portion himself or herself in his or her live program consumption session, which may be delayed in relation to the live program stream of the live program.

In some embodiments, the indication of the outcome of the particular event that is to occur in the live program stream of the live program may be deeplinked to a portion of the live program corresponding to the particular event, and therefore a selection of the indication may result in presenting the particular event. Such portion can be presented in picture-in-picture (PIP) along with other portions of the live program, or the selection can result in skipping to the portion of the live program associated with the indication and the particular event. In some embodiments, all available outcome notifications can be associated with their corresponding video and/or audio portion of the live program, which enables viewers to easily consume content related to outcomes that they are interested in.

In some embodiments, the interactive content comprises an indication that the particular event is occurring or is about to occur in the live program stream of the live program; an indication of an amount of time that the display of the live program is delayed relative to the particular event; and selectable indications of a plurality of potential outcomes of the particular event, the plurality of potential outcomes including the selected predicted outcome. For example, such features may provide a user with a glimpse of indication of a future event to look forward to, and allow the user to engage with such event despite being behind the live event real-time and being behind the near real-time progress point of the stream.

In some embodiments, the interactive content is provided by a content provider that is providing the display of the live program, e.g., on a same computing device that is providing the display of the live program, thereby avoiding a scenario where a user might have to exit the application providing the display of the live program to access a different interactive content application on a same device, or utilize a second separate device to access such interactive content.

In some embodiments, a content provider is providing the display of the live program, the interactive content is provided as a plugin by an interactive content provider to the content provider, and the content provider is distinct from the interactive content provider. Such features may enable content providers to offload interactive content provisioning to a third-party interactive content provider, while also enabling predicted outcomes to be selected within a same application or platform that is providing the display of the live program. Moreover, the scenario may be avoided where users might have to exit the application providing the display of the live program to access a different interactive content application on the same device, or utilize a second separate device to access such interactive content. In some embodiments, such features may enable providing a standard user interface among an ecosystem of devices and/or applications and/or platforms, independent of a type of the live event or type of the prediction.

In some embodiments, the systems, methods and apparatuses disclosed herein may be further configured to determine whether the user (consuming the display of the live program) is permitted to access the interactive content by generating, by the content provider, a token indicative of a location of the user; transmitting the token to the interactive content provider; and determining, by the interactive content provider and based on the location, whether the user is permitted to access the interactive content. Such aspects may provide security and help enforce restrictions (e.g., age and/or location-based restrictions) regarding whether a predicted outcome is permitted to be selected.

In some embodiments, the systems, methods and apparatuses disclosed herein may be further configured to determine whether the user is permitted to access the interactive content; and in response to determining that the user is permitted to access the interactive content, generate for presentation interactive content enabling, for a remainder of the display of the live program, selection of predicted outcomes of a plurality of events that are to occur in the live program stream of the live program.

In some embodiments, the systems, methods and apparatuses disclosed herein may be further configured to receive a request to cease the presentation of the display of the live program; and, based on the request, causing the presentation of the display of the live program to be ceased and revoking the permission to access the interactive content.

In some embodiments, the display of the live program is being provided to a user of the particular computing device, the user is a first user, the particular computing device is a first computing device, the selection of the predicted outcome is a first selection. In some embodiments, the systems, methods and apparatuses disclosed herein may be configured to determine that a second user is consuming the live program at a second computing device; generate for presentation, at the second computing device, the interactive content enabling a second selection of a predicted outcome of the particular event; receive, via the second computing device, the second selection of the predicted outcome associated with the interactive content; determine that the first selection matches the second selection; and generate for display an indication at the first and second computing devices that the first selection of the first user matches the second selection of the second user. In some embodiments, the systems, methods and apparatuses disclosed herein may be configured to determine that the first selection is contrary to the second selection, and generate for display an indication at the first and second computing devices that the first selection of the first user is contrary to the second selection of the second user.

In some embodiments, the systems, methods and apparatuses disclosed herein may be further configured to identify a plurality of interactive content providers, wherein generating for presentation the interactive content, at the particular computing device and prior to presentation of the particular event in the display of the live program at the particular computing device, comprises generating for presentation a plurality of interactive content items respectively associated with different interactive content providers.

In some embodiments, the systems, methods and apparatuses disclosed herein may be further configured to store a portion of the live program depicting the particular event to enable consumption of the particular event by the user at a future time; generate for presentation a selectable option to consume the particular event; and in response to receiving selection of the selectable option at the future time, generating for presentation the depiction of the particular event.

In some embodiments, the systems, methods and apparatuses disclosed herein may be further configured to determine historical predicted outcomes previously selected by the user, and determine to generate for presentation the interactive content based on the historical predicted outcomes previously selected by the user. By providing opportunities to select predictions only where a user is likely to be interested in doing so, user engagement may be maximized, usage of computing resources (e.g., processing power and/or memory and/or bandwidth) may be minimized, and efficiency may be enhanced.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1A:
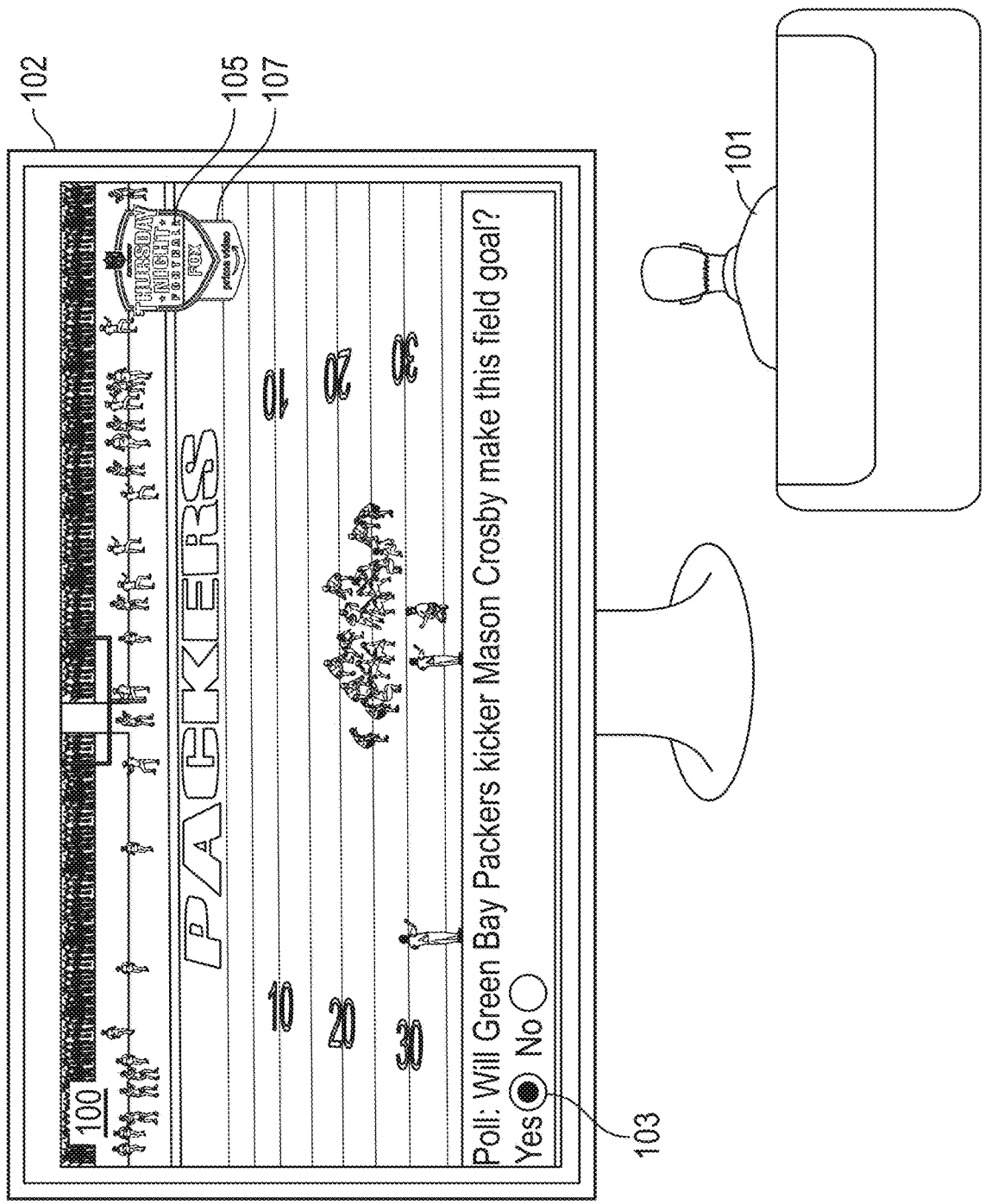
FIGS. 1A-1B show illustrative examples of providing a live program and interactive content, in accordance with some embodiments of this disclosure.
Figure 1B:
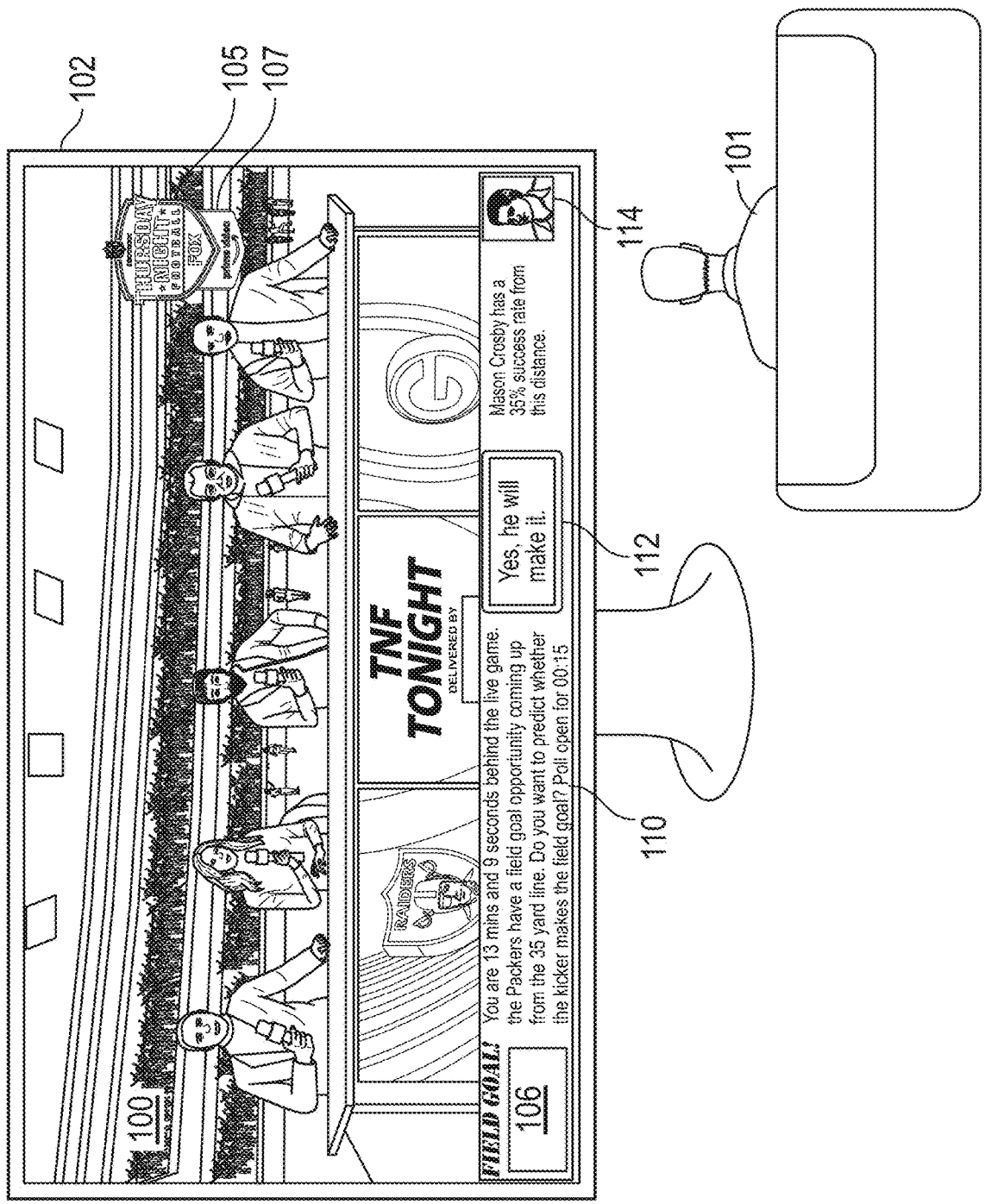

FIGS. 1A-1B show illustrative examples of providing a live program and interactive content, in accordance with some embodiments of this disclosure. In the example of FIG. 1, media asset 100 corresponding to a live event is depicted as a broadcast and/or stream of a National Football League (NFL) game at a football stadium, it should be appreciated that the present disclosure is applicable to any suitable live event, e.g., a professional or collegiate or other level of a sporting event, such as, for example, a football game, a baseball game, a hockey game, a soccer match, a tennis match, a golf tournament, horse racing, vehicle racing, or the Olympics, or any other suitable sporting event, or any combination thereof; a concert; an awards show; a play or theater or drama performance; a political debate or rally; a video game tournament; or any other suitable event at any suitable venue; or any combination thereof. In some embodiments, the present disclosure is applicable to on-demand and/or previously recorded, non-live content. In some embodiments, media asset 100 may be a linear asset, a display of a live program, a first run or on-demand presentation, a non-linear asset, a pre-recorded asset, or any other suitable content, or any combination thereof.

In some embodiments, a media application may be executed at least in part on a computing device 102 and/or at one or more remote servers and/or at or distributed across any of one or more other suitable computing devices, in communication over any suitable number and/or types of networks (e.g., the Internet). The media application may be configured to perform the functionalities (or any suitable portion of the functionalities) described herein. In some embodiments, the media application may be a stand-alone application, or may be incorporated (e.g., as a plugin) as part of any suitable application, e.g., one or more broadcast content provider applications, broadband provider applications, live content provider applications, media asset provider applications, extended reality (XR) applications, video or image or electronic communication applications, social networking applications, image or video capturing and/or editing applications, or any other suitable application(s), or any combination thereof.

As referred to herein, the terms "media asset" and "content" may be understood to mean electronically consumable user assets, such as 3D content, television programming, as well as pay-per-view programs, on-demand programs (as in video-on-demand (VOD) systems), live content, Internet content (e.g., streaming content, downloadable content, Webcasts, etc.), video clips, audio, content information, pictures, GIFs, rotating images, documents, playlists, websites, articles, books, electronic books, blogs, advertisements, chat sessions, social media, applications, games, and/or any other media or multimedia and/or combination of the same. As referred to herein, the term "multimedia" should be understood to mean content that utilizes at least two different content forms described above, for example, text, audio, images, video, or interactivity content forms. Content may be recorded, played, transmitted to, processed, displayed and/or accessed by a computing device, and/or can be part of a live performance or live event. In some embodiments, the media asset may be generated for display from a broadcast or stream received at a computing device, or from a recording stored in a memory of the computing device and/or a remote server.

In some embodiments, the media application may be installed at or otherwise provided to a particular computing device, may be provided via an application programming interface (API), or may be provided as an add-on application to another platform or application. In some embodiments, software tools (e.g., one or more software development kits, or SDKs) may be provided to any suitable party, to enable the party to implement the functionalities described herein.

XR may be understood as virtual reality (VR), augmented reality (AR) or mixed reality (MR) technologies, or any suitable combination thereof. VR systems may project images to generate a three-dimensional environment to fully immerse (e.g., giving a user a sense of being in an environment) or partially immerse (e.g., giving the user the sense of looking at an environment) users in a three-dimensional, computer-generated environment. Such environment may include objects or items that the user can interact with. AR systems may provide a modified version of reality, such as enhanced or supplemental computer-generated images or information overlaid over real-world objects. MR systems may map interactive virtual objects to the real world, e.g., where virtual objects interact with the real world or the real world is otherwise connected to virtual objects.

The media application may generate for display media asset 100 at a computing device 102, e.g., based on a request by user 101 to access media asset 100. Computing device 102 may comprise or correspond to a mobile device such as, for example, a smartphone or tablet; a laptop computer; a personal computer; a desktop computer; a smart television; a smart watch or wearable device; smart glasses; a stereoscopic display; a wearable camera, XR glasses; XR goggles; an XR head-mounted display (HMD); near-eye display device; a set-top box; a streaming media device; or any other suitable computing device or computing device; or any combination thereof.

In some embodiments, media asset 100 (e.g., a display of a live program corresponding to Thursday night NFL game between the Las Vegas Raiders and the Green Bay Packers) may be provided by a content provider (e.g., "FOX" indicated at 105 and/or "Amazon Prime video" indicated at 107 and/or "Amazon FireTV"). The media application may access, receive and/or cause to be generated for display interactive content 103 (FIG. 1A) and/or interactive content 106 (FIG. 1B). Interactive content 106 may be related to the live event and may enable selection, via the particular computing device, of a predicted outcome in relation to a particular event that is to occur in a live program stream of a live program (or other content) corresponding to media asset 100. In some embodiments, interactive content 103 and 106 may be provided (e.g., via a plugin) by an interactive content provider (e.g., an organization providing services related to sports) distinct from content providers 105 and/or 107. Alternatively, in some embodiments, interactive content 103 and/or 106 may be provided by content provider 105 and/or 107 providing media asset 100. The media application may be implemented by or associated with one or more of content provider 105 and/or 107 and/or a provider of interactive content 103 and 106. In some embodiments, interactive content 103 and 106 may be provided to an account or profile of user 101 with content provider 105 and/or 107 and/or an account or profile of user 101 with the interactive content provider, when such account or profile is logged in on computing device 102. For example, interactive content 103 and 106 may augment and be accessible from within content provider 105 and/or 107 that is providing media asset 100.

As shown in FIG. 1A, interactive content 103 may comprise a poll stating "Will Green Bay Packers Kicker Mason Crosby make this field goal?" and providing selectable options "Yes" or "No" to answer the query. In the example of FIG. 1A, such interactive content 103 may be provided in real time or near real time (e.g., at the latest time point being provided by content provider 105 and/or 107 in the live event corresponding to the NFL game of the Green Bay Packers vs. the Las Vegas Raiders), such as right before the field goal attempt begins, and/or when the Packers are lining up for the field goal attempt or sending their field goal unit out onto the field.

As shown in FIG. 1B, as indicated at portion 110 of interactive content 106, the media application may determine that the media asset is a stream or broadcast of a live program (e.g., an NFL game), and that the presentation of such live program is delayed in relation to a live program stream of the live program, which may correspond to a point of the live program that is substantially near real time. For example, the media application may make this determination by comparing a timestamp of a current position of user 101 within the live program to a timestamp of the latest point of the live program stream and/or to a real time position of the live event. Such delay may be based on a user joining or accessing the broadcast or stream late (e.g., where the user had requested to record the broadcast or stream, or otherwise accessed the broadcast or stream at a point in time after a start time of the broadcast or stream); time-shifting caused by user input (e.g., pausing and/or rewinding the live content); user 101 consuming media asset 100 in catch-up mode; and/or based on a processing and/or transmission delay of media asset 100 (e.g., network or processing lag). For example, a live program may inherently have latencies which in some cases may be, e.g., close to a minute behind live depending on processing latencies (e.g., based on encoding and/or transcoding the content and/or network transmission latencies), which may include buffering of segments (e.g., via adaptive bit rate streaming) on computing device 102.

Portion 110 of interactive content 106 indicates an amount of time (e.g., 13 minutes and 9 seconds) that a current presentation position of user 101 is behind the position of the live event, and indicates that a particular event (e.g., a 35-yard field goal attempt by Green Bay Packers kicker Mason Crosby) is occurring or is about to occur in the live program stream of the live program. The media application may present option 112, which may be selected by user 101 to select a predicted outcome regarding whether the 35-yard field goal attempt by Green Bay Packers kicker Mason Crosby will be successful, or whether Mason Crosby will miss the field goal. Alternatively, in some embodiments, a current presentation point of user 101 when interactive content 106 is generated for display may correspond to a real-time or near real-time presentation point. Selection of option 112 may be received in any suitable form, e.g., as voice input, tactile input, input received via a keyboard or remote control, input received via a touchscreen, text-based input, biometric input, or any other suitable input, or any combination thereof. In some embodiments, interactive content 106 may comprise a plurality of selectable options respectively corresponding to potential outcomes of the particular event, e.g., "Yes, he will make it" and "No, he will miss it," and/or other potential outcomes of the particular event, e.g., "This will be a fake field goal and the kick won't event be attempted," or "The other coach is going to call timeout before the kick," or "This kick will hit the uprights." As another example, the potential outcomes for a particular event, such as, for example, in a basketball game may be "The next shot will be a two pointer"; "The next shot will be a three pointer"; and/or "The next shot will be a free throw."

In some embodiments, after the particular event (e.g., the 35-yard field goal attempt by Green Bay Packers kicker Mason Crosby) of the live program stream of the live program occurs in real time (e.g., at the football stadium in real time, and/or occurs in the live program stream of the live program which may be slightly delayed relative to real-time), the media application may generate for presentation (at the same computing device 102 at which media asset 100 is being presented or at a different computing device, such as, for example, a mobile device of user 101) a result of the particular event, e.g., an indication or notification of whether the predicted outcome was correct. For example, if the media application receives selection of option 112 of "Yes, he will make it," and the media application determines that such field goal attempt was successful, the media application may generate for display an indication that the predicted outcome was correct. On the other hand, if the media application receives selection of option 112 of "Yes, he will make it," and the media application determines that such field goal attempt was not successful, the media application may generate for display an indication that the predicted outcome was not correct. In some embodiments, the media application may provide an option to predict that the field goal will not be successful, e.g., "No, he will not make it," and may generate for display the indication of whether such predicted outcome was correct.

In some embodiments, such result of the particular event may be generated for output (e.g., visual output and/or audio output and/or any other suitable type of output) as soon as the outcome of the field goal is known, even if a progress point of user 101 within media asset 100 is still sufficiently behind the live broadcast such that user 101 has not yet viewed any part of the particular event, or has viewed part of the particular event but is not yet aware of its outcome. On the other hand, the media application may wait to generate for output the outcome of the event until after user 101 views the particular event (e.g., the field goal) in media asset 100. In some embodiments, the media application may notify user 101 that a notification regarding the outcome of the particular event will not be provided until the progress point of user 101 indicates that he or she viewed the event. In some embodiments, the media application may determine, based on a type of the event, whether to provide an indication of whether the prediction was successful, e.g., for a sports game, the prediction outcome may be shown immediately, whereas, in an episode of a television show or movie the prediction outcome may not be revealed until the scene corresponding to the prediction is reached (e.g., to avoid spoilers).

In some embodiments, for a particular event (e.g., a field goal) that is to occur in media asset 100 (e.g., a display of a live program at computing device 102), only certain users of the media application may be provided with interactive content to enable selection of a predicted outcome of the particular event. For example, interactive content 106 may be provided to user 101 based on comparing attributes of media asset 100 and/or a portion thereof to a user profile of user 101, where the user profile may indicate preferences and/or historical interactions of user 101 with the media application and/or other applications or services. For example, if the user profile of user 101 indicates that user 101 has a preference for NFL football or the Green Bay Packers, and/or that historically user 101 has selected a predicted outcome during Green Bay Packers games, and/or for Green Bay Packers kicker Mason Crosby, and/or for other field goal attempts and/or other special teams plays, the media application may determine to provide interactive content 106 to user 101.

As another example, if the user profile of user 101 indicates that historically user 101 has selected a predicted outcome for particular event(s) of a live program, even when the progress point of user 101 in such circumstances is behind the most recently shown live play, the media application may determine to provide interactive content 106 to user 101. As another example, if the media application determines that a friend or other user related to user 101 has selected a predicted outcome via interactive content 106 on a different computing device, and/or that in the past user 101 tends to submit a prediction on the same event that the friend submits a prediction on, the media application may determine to provide interactive content 106 to user 101. As another example, if the media application determines that a particular event of the live program is trending (e.g., on social media, and/or that a relatively large number of users are submitting predictions of outcomes for a particular event within media asset 100), the media application may determine to provide interactive content 106 to user 101.

On the other hand, if the user profile of user 101 does not indicate a preference for NFL football, or the Green Bay Packers, or field goal attempts, and/or if historically user 101 has not selected a predicted outcome for these types of events or similar types of events, the media application may cease providing (or decline to provide) interactive content 106 to user 101. In some embodiments, the media application may receive an explicit instruction from user 101 as to whether user 101 would like to be provided with interactive content at all, and/or whether user 101 would like to be provided with interactive content for particular types of media assets and/or portions thereof, and the media application may determine whether to provide interactive content by comparing currently viewed content to attributes associated with the explicit instruction.

In some embodiments, upon receiving a selection of a predicted outcome of the particular event that is to occur in the live program, the media application may automatically provide, or may provide an option selectable by the user to provide, real-time video of the particular event (e.g., the field goal attempt) that the prediction relates to. For example, such real time video may be provided even if a user's current progress point is not caught up to the field goal attempt, the real time video may be generated for simultaneous display with the user's current position in a separate window, or may be provided in a full screen display, or on a secondary device (e.g., a mobile device in a vicinity of computing device 102). After the field goal attempt concludes, the media application may cause the window displaying the field goal to cease being displayed and/or otherwise return to the user's presentation position that is delayed relative to the live program stream of the live program (and/or relative to the live event).

In some embodiments, indication 110 may specify a time period (e.g., 15 seconds) during which such selection of a predicted outcome of the particular event that is to occur in the live program has to be received. For example, such time period may correspond to an estimated amount of time before the field goal attempt is to occur in real time (after which selection of the predicted outcome may be disabled and/or presentation of interactive content 106 may cease), since at this point the result of the field goal attempt is known or discoverable (e.g., via the Internet on a mobile device), even if the position of user 101 remains behind the field goal attempt. In some embodiments, portion 114 may indicate certain statistics related to the particular event that is to occur in the live program (e.g., the field goal attempt). For example, portion 114 of interactive content 106 indicates that Green Bay Packers kicker Mason Crosby has a 35% success rate on similar field goals in this particular season, and/or a success rate in his career, and/or a success rate whether home or away or in certain portions of the game or in certain weather conditions. In some embodiments, portion 114 may include any suitable statistics related to the live event, e.g., statistics on how successful kickers have been against the Las Vegas Raiders on their field goal attempts, indications of whether the user's friends have selected a predicted outcome on the field goal attempt, and/or indications of whether the user historically has selected a predicted outcome for similar events.

In some embodiments, the media application may prompt the user to select a predicted outcome for a different live program than the live program (e.g., the Green Bay Packers vs. the Las Vegas Raiders NFL game) associated with media asset 100. For example, the media application may notify the user (e.g., via user equipment device 102) that there is a fourth down play upcoming in a different NFL game, and may provide the user with an opportunity to select a predicted outcome as to whether the fourth down play will successfully convert a fourth down. In some embodiments, if the user submits a predicted outcome for such different live program, the media application may switch to the channel showing the fourth down play, or show the fourth down play in a picture-in-picture (PIP) window (e.g., at computing device 102 or at a mobile device of user 101) simultaneously with media asset 100, to enable the user to view the play he or she submitted a prediction for. In some embodiments, this may occur even if the NFL game in which the fourth down play is occurring is blacked out in the user's region, to incentivize the user to submit a prediction, since the user otherwise might not be able to view such play in real time or near real time. In some embodiments, a replay of a play or other key moment associated with the predicted outcome may be provided (e.g., at computing device 102 or at a mobile device of user 101) to the user after such play occurs, e.g., in a PIP window at computing device 102 or a link may be provided to the mobile device of user 101. In some embodiments, the user may be permitted to view only the particular event that is to occur in the live program that he or she selected the predicted outcome for a particular event, e.g., the fourth down play in the otherwise blacked out NFL game.

As shown in FIG. 1, the user's current progress point may correspond to a pregame show (or a halftime show) of the NFL game between the Green Bay Packers and Oakland Raiders. During such pregame show, one or more commentators or analysts or panelists may give their prediction on which team will win the game (e.g., one analyst might state during the pregame show that he or she believes that the Las Vegas Raiders will win the NFL game corresponding to media asset 100). The media application may utilize one or more techniques (e.g., automatic speech recognition) and/or image processing techniques (e.g., if the analyst's prediction is displayed on a graphic) to detect and interpret the audio uttered by one of the analysts and/or the analyze the graphic of the prediction, and in response may provide an opportunity for the user to predict his or her own outcome (e.g., "Analyst Troy Aikman believes the Raiders will beat the Packers. Do you think he is right?"). For example, the media application may present an icon similar to icon 112 allowing the user to select his or her predicted outcome. In some embodiments, this functionality may be available only if the user has caught up to the stream of the live event in real time or near real time. In some embodiments, such opportunity to select a predicted outcome may be provided during a halftime or postgame show, e.g., if an analyst indicates during halftime that he or she believes that a certain team is going to come back and win, the user may select the same or a different predicted outcome. As another example, if an analyst (e.g., Charles Barkley) states in a postgame show that the user is watching that a certain team is going to lose its next game (or is going to lose a playoff series or is not going to make the playoffs) the user may be provided with an opportunity to select the same or different predicted outcome. In some embodiments, a profile of the user may record the user's results as compared to analyst's results in predicting outcomes. In some embodiments, metadata associated with media asset 100 may be stored in association with a user profile, or may otherwise be used, to provide replays (at a future time than a current time) of portions of content associated with a predicted outcome, e.g., allowing a user to go back and view a penalty kick that he or she correctly predicted the outcome of at an earlier time, based on receiving a user request from the user at such future time.

In some embodiments, media asset 100 may correspond to on-demand or previously recorded content. For example, media asset 100 may be a first airing of a serial programming or episode (e.g., "Game of Thrones"), or a live program stream of an episode or other content (e.g., a comedy show) on a streaming platform or other content provider, and interactive content 106 may be provided enabling a user to select a predicted outcome regarding whether certain events might occur in the episode. As an example, selectable option 112 in a "Game of Thrones" episode may correspond to "Will the character Jaime Lannister die in this episode of Game of Thrones?" or "Will the White Walkers win this battle?"). In some embodiments, interactive content may be provided during such episode only if the event is still occurring or has not yet occurred in the latest portion of the first airing being shown. In some embodiments, the media application may enable predictions in relation to certain live events (e.g., a sporting event) and/or portions thereof to be associated with amounts or micro-amounts of virtual credits (e.g., redeemable for real-world value), or not), whereas on-demand or previously recorded content may be associated with only non-monetary or micro-amounts, e.g., since executives of the television show or actors in the television show or other personnel may be privy to the outcome of such events. In some embodiments, a predicted outcome may be suggested to be associated with micro-amounts of virtual credit when the time left for a user to predict an outcome for a particular event that is to occur in the live program is below a threshold (e.g., 10 seconds or any other suitable time).

In some embodiments, the techniques described herein may be used in relation to audio only content, or primary audio-based content. For example, the media application may provide user 101 with an audio stream (e.g., radio, podcast, and/or other suitable audio transmission or recording) of the NFL game between the Las Vegas Raiders and Green Bay Packers, which may be delayed based on a user-initiated action (e.g., pausing or rewinding, or joining the stream later) and/or based on processing delays of providing the audio stream. The media application may provide, via any suitable output (e.g., audio and/or visual and/or haptic) an indication that a particular event is to occur in a live audio stream of the live audio program corresponding to the NFL game, and may provide the user with interactive content enabling the user to select a predicted outcome for the particular event, using the techniques described herein.

Figure 2:
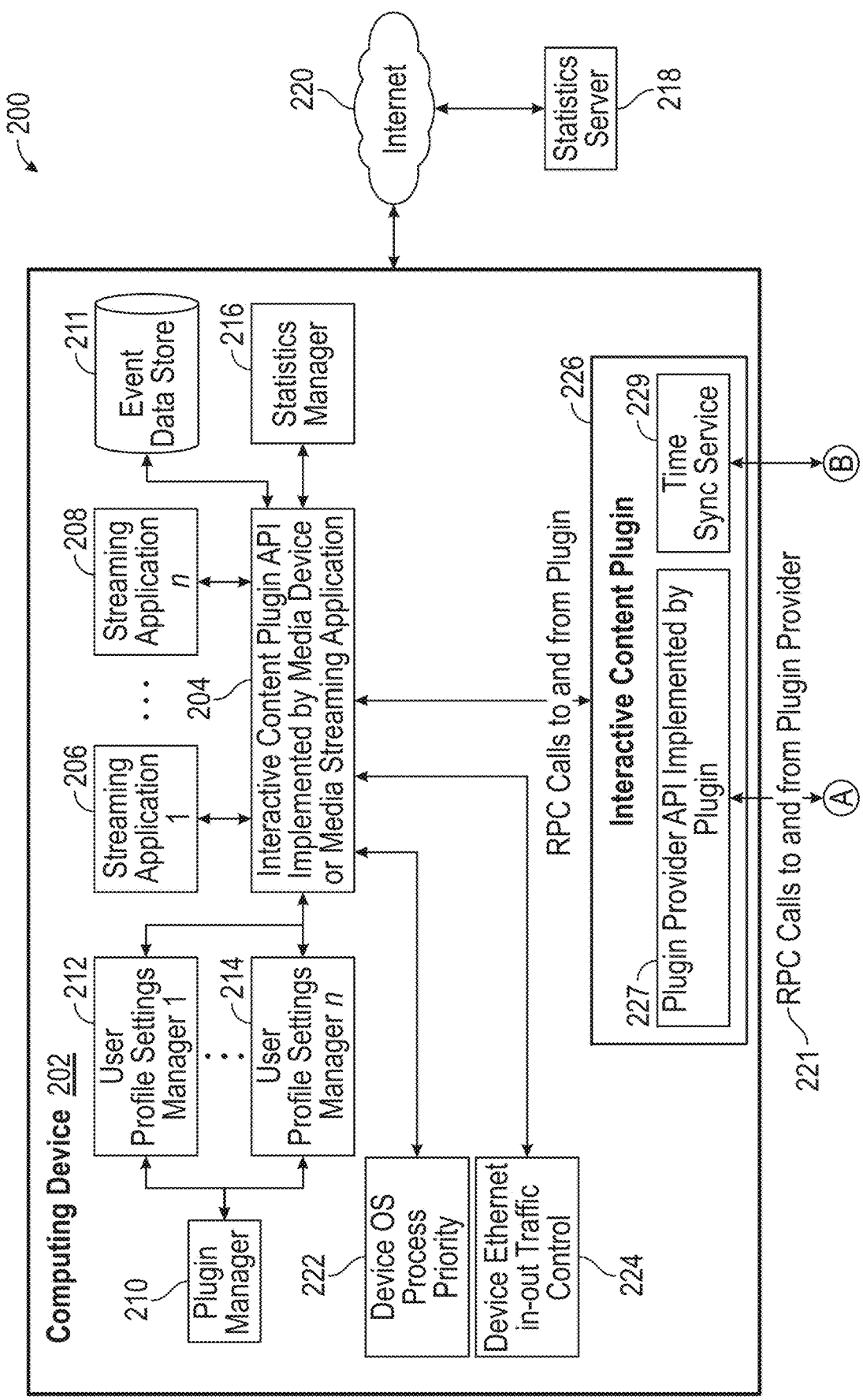
FIG. 2 is a block diagram of an illustrative system for providing interactive content related to a media asset, in accordance with some embodiments of this disclosure.
Figure 2:
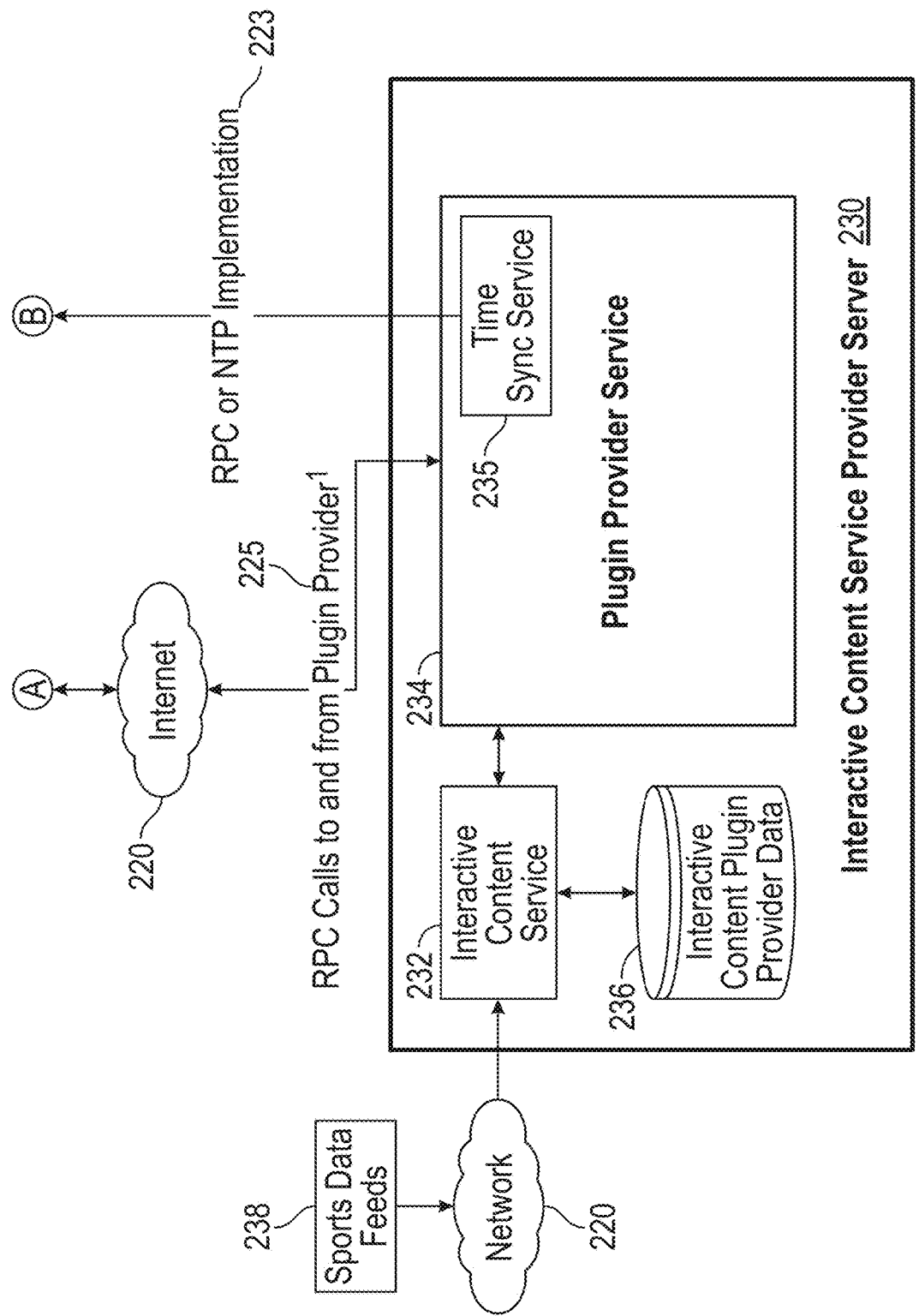

FIG. 2 is a block diagram of an illustrative interactive content system 200 for providing interactive content related to a media asset, in accordance with some embodiments of this disclosure. Interactive content system 200 may comprise computing device 202, interactive content service provider server 230, statistics server 218, and sports data feeds 238. Interactive content system 200 may implement the media application, which may be executable to implement (or may otherwise be in communication with) one or more of interactive content plugin API 204; streaming application 206; streaming application 208; plugin manager 210, user profile settings manager; event datastore 211; user profile settings manager 212 . . . 214; statistics manager 216; statistics server 218; device OS process priority 222; device ethernet in/out traffic control 224; interactive content plugin 226 comprising plugin provider API 227 and time sync service 229; interactive content service provider server 230; interactive content service 232; plugin provider service 234 comprising time sync service 235; interactive content plugin provider data 236; and/or sports data feeds 238.

In some embodiments, interactive content plugin API 204 may enable any streaming application 206 . . . 208, or other content provider, to provide interactive content (e.g., interactive content 103 and/or 106 of FIGS. 1A-1B related to enabling selection of a predicted outcome of the particular event of the live program) related to streaming content (e.g., media asset 100 of FIGS. 1A-1B). In some embodiments, a streaming application 206 . . . 208 may be associated with multiple interactive content plugins 226, allowing the user to select predicted outcomes using multiple interactive content providers within the same program. In some embodiments, the media application may generate for simultaneous display interactive content for selection of predicted outcomes for multiple interactive content providers, related to a same or different event of the live program or other content. In some embodiments, the media application may enable a user to select from which interactive content provider of multiple content providers he or she would like to receive interactive content. In some embodiments, multiple interactive content providers may allow the user to select a predicted outcome for the same action or event, e.g., a user may choose to select a predicted outcome on the same action or event using multiple interactive content providers. In some embodiments, the media application may provide multiple opportunities to select predicted outcomes for one or more portions of a live event during a live broadcast of the live event. In some embodiments, only one interactive content provider may provide an opportunity to select predicted outcomes within the live broadcast for a particular occurrence or event within such live broadcast.

Plugin manager 210 may manage each interactive content plugin 226 from the one or more content providers and/or interactive content providers, and each content plugin 226 may provide or be assigned user profile settings manager 212 . . . 214, which may be configured to apply user profile settings in connection with a corresponding interactive content plugin API 204. Statistics manager 216 may be in communication with interactive content plugin API 204, and statistics manager 216 may access statistics server 218 via a network (e.g., Internet 220), to enable providing statistics to the user within the streaming media application (e.g., YouTube TV or any other suitable streaming media application) and/or as part of the interactive content, leveraging the APIs provided by interactive content plugin 226. In some embodiments, interactive content plugin API 204 may transmit and/or receive data in the form of remote procedure calls (RPCs) or representational state transfer (REST) API calls utilizing HTTP requests (or any other suitable technique or any combination thereof) to and from interactive content plugin 226, which may be installed on or otherwise provided to computing device 202 (and/or otherwise linked to a user account or profile of user 101 of FIGS. 1A-1B) and configured to provide the interactive content. Such data may be transferred between interactive content plugin API 204 and interactive content plugin 226 at a low latency, and/or may comprise opportunities to provide selections of predicted outcomes, authentication, predicted outcome statistics controlled by plugin provider service 234 (e.g., odds), timing (e.g., time allowed for selecting a predicted outcome), user account information, user account search, or any other suitable data, or any combination thereof.

In some embodiments, interactive content plugin 226 comprises time sync service 229 (e.g., a clock or other mechanism) to maintain synchronization with plugin provider service 234 of interactive content service provider server 230, to ensure that opportunities for selecting predicted outcomes are available (e.g., for in-progress or upcoming events) at a time deemed acceptable by the interactive content provider, e.g., when the result of a field goal attempt that is the subject of the predicted outcome is not yet known. In some embodiments, sports data feeds 238 may comprise information indicative of whether outcomes of one or more portions of the live event are known, e.g., whether the event is yet to occur, is occurring or has occurred. In some embodiments, interactive content plugin 226 and/or interactive content service provider server 230 provides for a real-time synchronization reconciled against a consumption session playback time of the user and allowing for the addition of or subtraction of user interface elements (e.g., icons to submit predicted outcomes).

While time sync service 229 and/or time sync service 235 may not be perfectly in sync with the live event (e.g., due to processing, buffering and network latencies throughout the media asset provider's service and/or interactive content provider's service), the clock may be substantially in sync (e.g., near real time) in relation to the live event. In some embodiments, time sync service 229 and/or time sync service 235 may be a time RPC or NTP implementation, and/or may be used to ensure that opportunities to select predicted outcomes fall within the real time of events as they actually occur independent of device local time, on-screen playback or playback location.

In some embodiments, interactive content plugin 226 may change a process priority 222 and/or ethernet in/out traffic control 224 on computing device 202, and/or plugin provider service 234 may change priorities on interactive content service provider server 230, to assign a highest processing and network priority to the interactive content provider. In some embodiments, plugin provider service 234 interfaces with interactive content service 232 and/or interactive content plugin provider data 236 (which may control all opportunities for selecting predicted outcomes and associated odds), which may be a common service that is offered through the interactive content provider's web interface, and/or may include additional interactive content opportunities (e.g., associating a prediction with amounts or microamounts of virtual credits, and/or providing the option for selecting predicted outcomes not associated with monetary value). In some embodiments, plugin provider service 234 may manage data stored at interactive content service provider server 230, e.g., user management, account management, deciding when to create interactive content events or opportunities, creation of odds and other interactive content statistics, and/or other suitable data, and/or the interactive content provider may be a clearinghouse for collection or distribution of virtual credits or prizes.

In some embodiments, interactive content system 200 (e.g., interactive content plugin 226) may be enabled via a user setting or user account profile setting (e.g., received via a user input interface of computing device 202). In some embodiments, at least a portion of interactive content system 200 may be native to computing device 202, or native to the media application or another media streaming application (e.g., Amazon Prime Video).

Figure 3A:
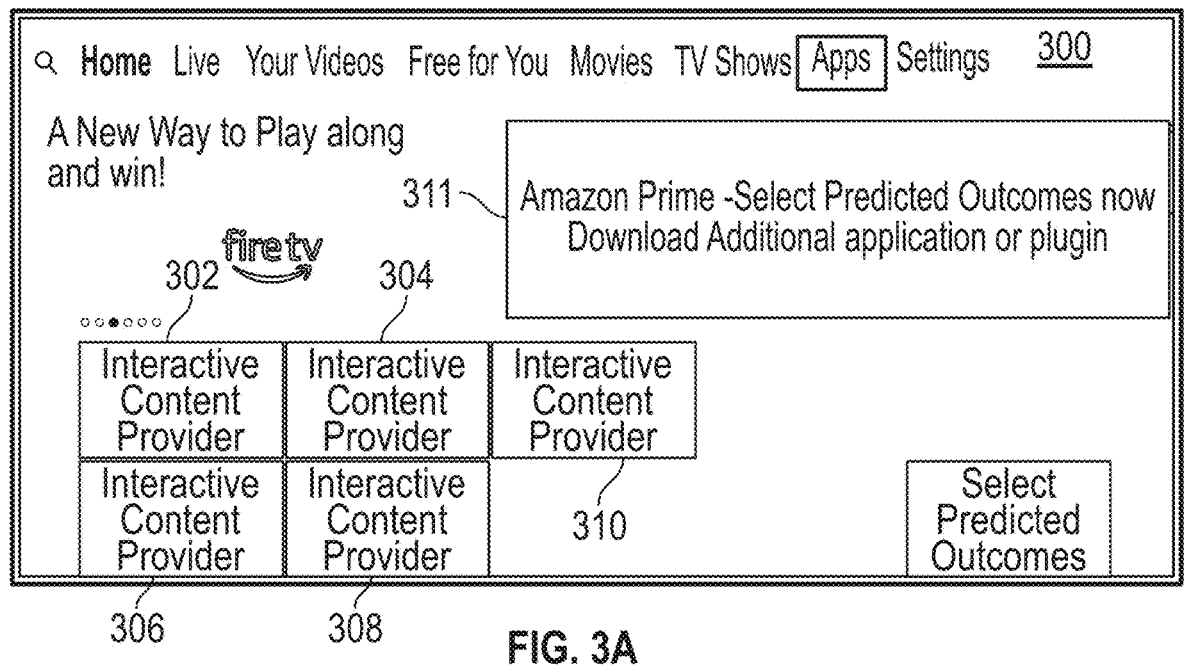
FIGS. 3A-3J show illustrative user interfaces for providing interactive content related to a media asset, in accordance with some embodiments of this disclosure.

FIGS. 3A-3J show illustrative user interfaces for providing interactive content related to a media asset, in accordance with some embodiments of this disclosure. As shown in FIG. 3A, interface 300 may be provided by the media application, which may provide interactive content via a plugin (e.g., interactive content plugin 226 of FIG. 2). Interface 300 may comprise icons 302, 304, 306, 308 and 310 associated with respective interactive content providers having applications installed on, and/or otherwise able to provide interactive content over a network to, a computing device (e.g., computing device 202 executing the media application). In some embodiments, a particular interactive content provider may be associated with the same entity as, or a different entity than, a content provider (e.g., Amazon Prime Video indicated at 311, which may provide a media asset such as media asset 100 of FIGS. 1A-1B). In some embodiments, the media application enables a standard experience via computing device 102 regardless of the interactive content provider application utilized, including seamlessly handling and accounting for virtual credits and/or digital assets associated with predicted outcomes selected by the user.

Figure 3B:
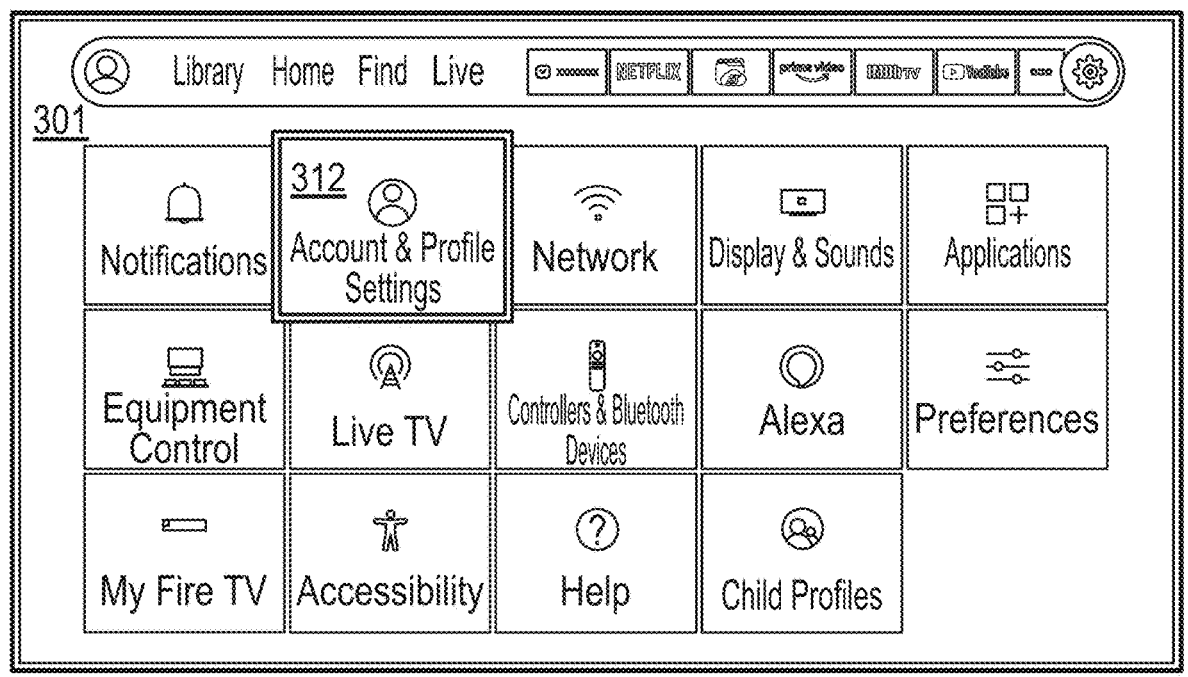
Figure 3C:
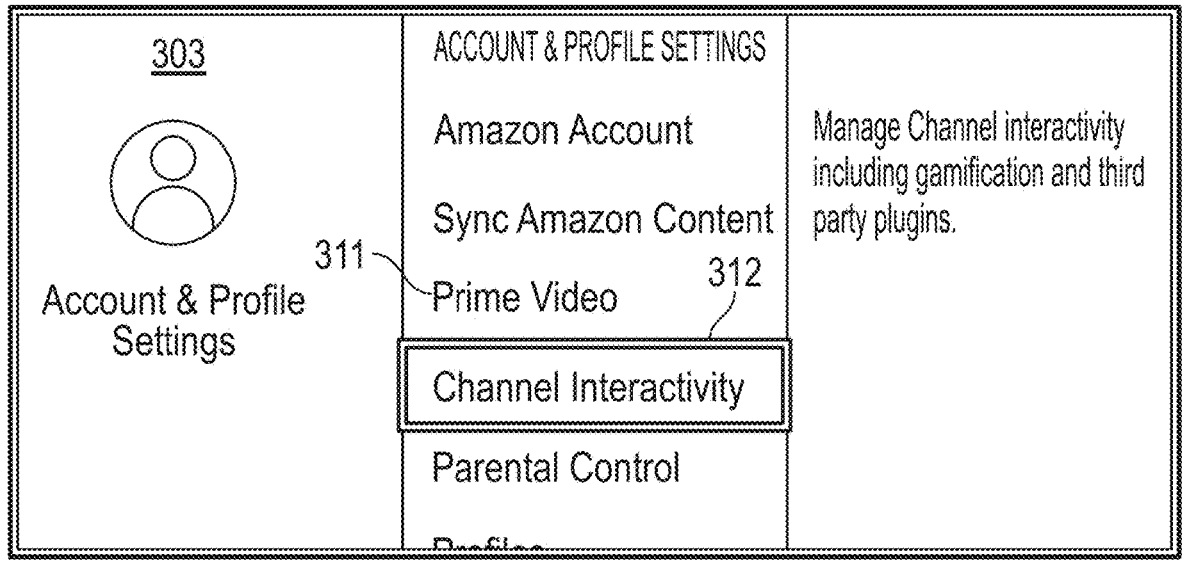

As shown in FIG. 3B, interface 301 may be provided by the media application, and may correspond to settings associated with the content provider and/or interactive content providers. The media application may receive selection of option 312, which causes presentation of interface 303 shown in FIG. 3C. The media application may receive selection of option 314 of interface 303, to cause presentation of interface 305 of FIG. 3D, at which the media application enables a user (e.g., user 101 of FIGS. 1A-1B) to manage interactive content associated with his or her profile, e.g., gamification, selection of predicted outcomes and third-party interactive content plugins. The media application may receive selection of option 314 at interface 305 to enable selection of predicted outcomes in connection with one or more content providers and/or interactive content providers.

Figure 3D:
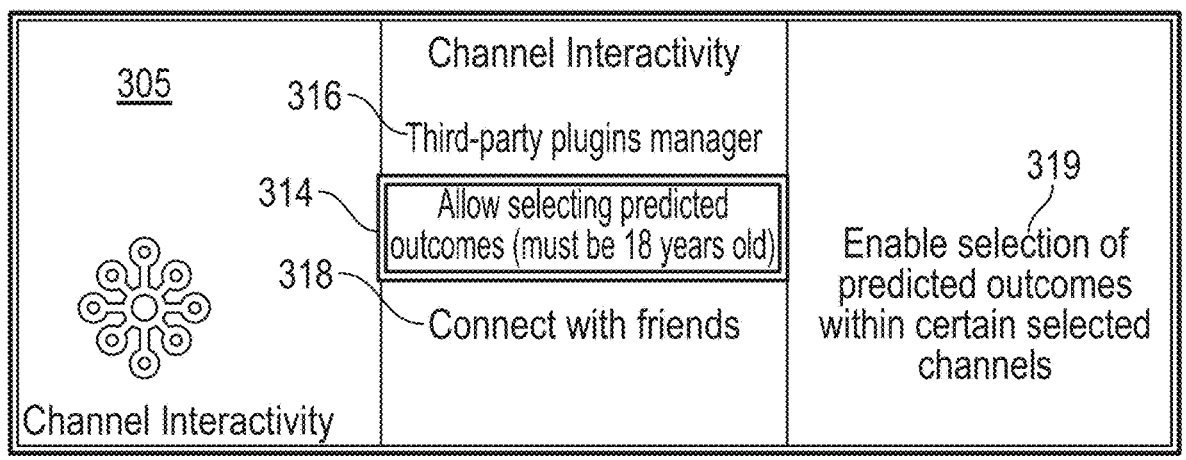
Figure 3E:
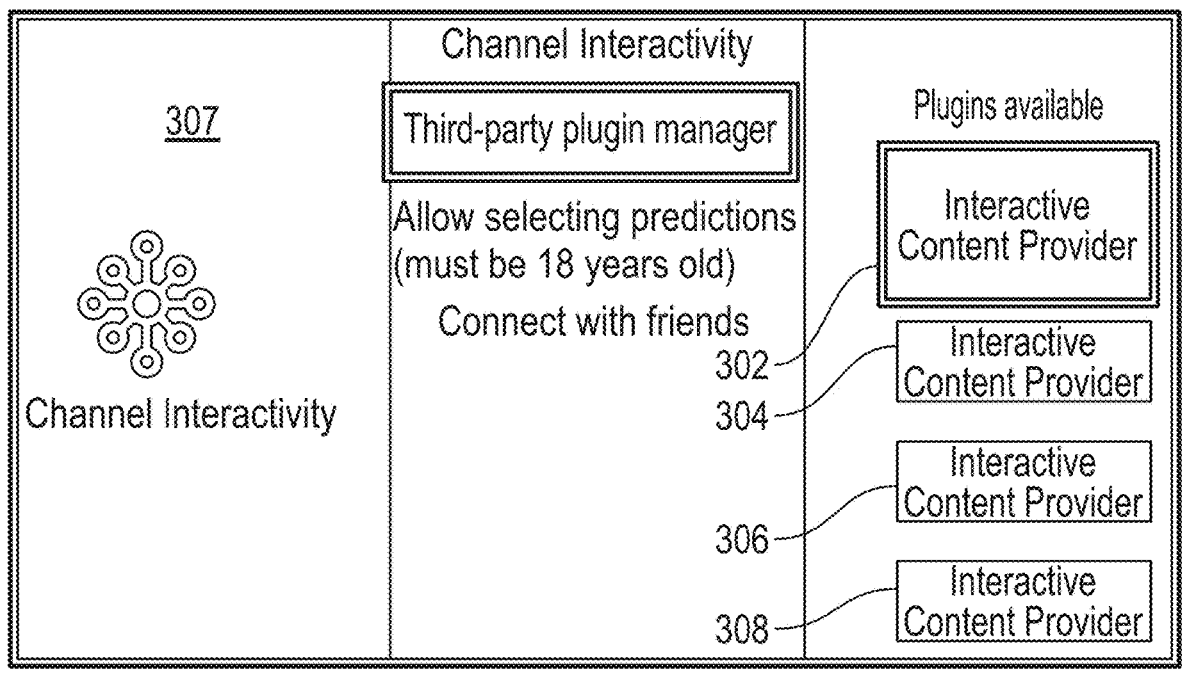

As shown in FIG. 3D, interface 305 may comprise a third-party plugin manager option 316 and a connect with friends option 318. Selection of third-party plugin manager option 316 may cause presentation of interface 307 of FIG. 3E, where one or more icons for interactive content providers 302, 304, 306 and 308 may be selected by the user to indicate that the user would like to be provided, while consuming media assets at a computing device (e.g., computing device 202 of FIG. 2), opportunities for selecting predicted outcomes at such computing device or another device associated with the user's profile. Selection of connect with friends option 318 may enable the user (e.g., using computing device 102 of FIGS. 1A-1B) to indicate one or more other users for which the user (e.g., user 101 of FIGS. 1A-1B) would like to be notified when such one or more other users select a predicted outcome, to enable user 101 of FIGS. 1A-1B to decide whether he or she would like to join in such prediction (e.g., as part of a group prediction or a pool prediction) or submit an opposing prediction. In some embodiments, in the group prediction, any prizes or value associated with a successful prediction may be divided up amongst the group, or in an unsuccessful prediction may be provided to the interactive content provider in equal shares by the group participants.

In some embodiments, the user may manually select profiles of friends to add to a buddy list or retrieve profiles of friends from another platform (e.g., user profile on a social media account, user's mobile device contacts, or from any other suitable source, or any combination thereof). In some embodiments, selection of option 318 may enable user 101 to request that the media application send an electronic message to one or more friends regarding a particular prediction. In some embodiments, option 319 may enable a user to specify which channels (e.g., FOX, ABC or any other suitable channel) and/or which other content provider (e.g., Amazon Prime video, YouTube TV, or any other suitable provider) the user would like to permit to show interactive content opportunities while the user is consuming content from such channel or content provider.

Figure 3F:
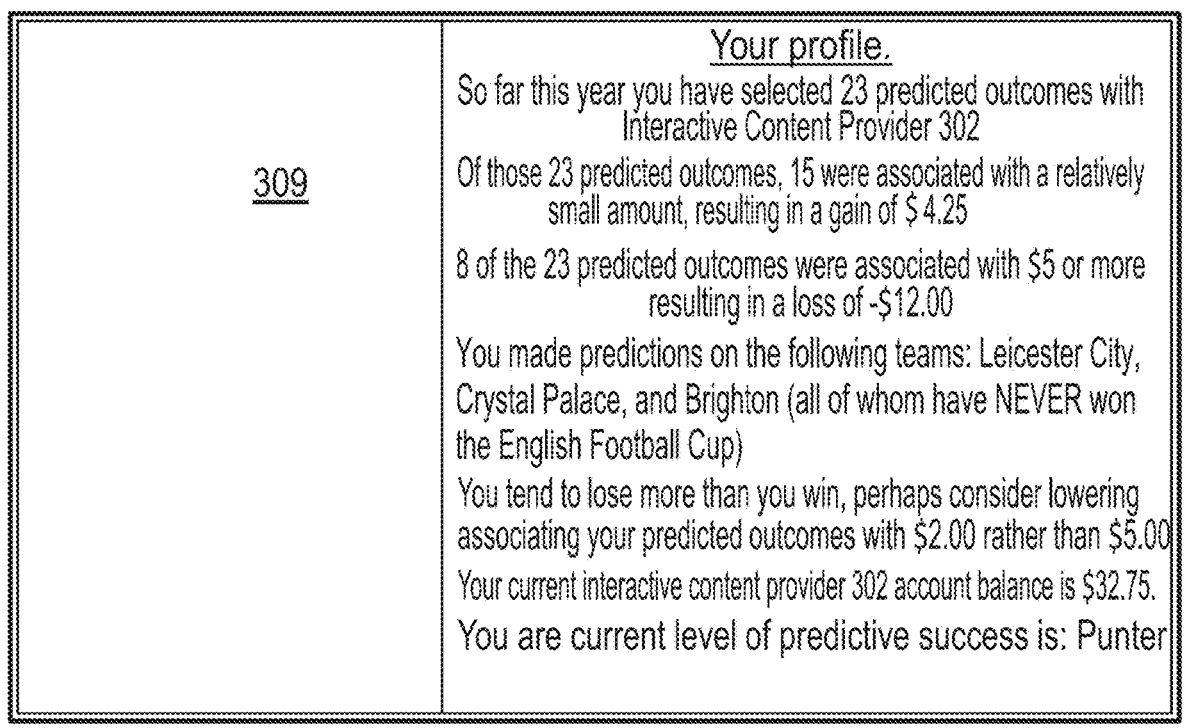

As shown in FIG. 3F, interface 309 may provide various historical information related to the user's profile with one or more of the interactive content provider(s) indicated at 302, 304, 306, 308, e.g., a user's history with selecting predicted outcomes in association with a particular interactive content provider. For example, the historical information may indicate a total amount of predicted outcomes selected, a type of the predictions, amounts of virtual credits associated with a predicted outcome, winnings vs. losses, frequency of selecting predicted outcomes (e.g., whether predicted outcomes are selected by a particular user at a frequency above an average or threshold frequency), which events or content predictions were selected in association with, recommended future event(s) to select predictions for based on the user's prior selected predictions, a user's account balance with one or more interactive content providers, loss limit, and/or any other suitable information, or any combination thereof. In some embodiments, a user may be permitted to select a predicted outcome even if the user has insufficient balance in his or her account, and may be prompted (e.g., at his or her mobile device) to supplement the account after the predicted outcome is submitted.

In some embodiments, the historical information may be used by the media application to recommend predictions and/or associated amounts (e.g., increasing an amount of a minimum or maximum dollar amount associated with predictions). In some embodiments, aggregate historical information from across multiple interactive content providers may be provided to a user, and the user's prediction behavior with a first interactive content provider may be used by the first interactive content provider and other interactive content providers for providing recommendations.

In some embodiments, the media application can learn about the events that a user normally selects predicted outcomes for and can personalize future suggested interactive content to the user based on the learning. For example, if the media application learns that a user typically submits predicted outcomes for certain teams and/or players (and/or associates the particular predicted outcomes with a certain amount of virtual credits), the media application may provide targeted opportunities to predict outcomes to the user for such teams and/or players.

Figure 3G:
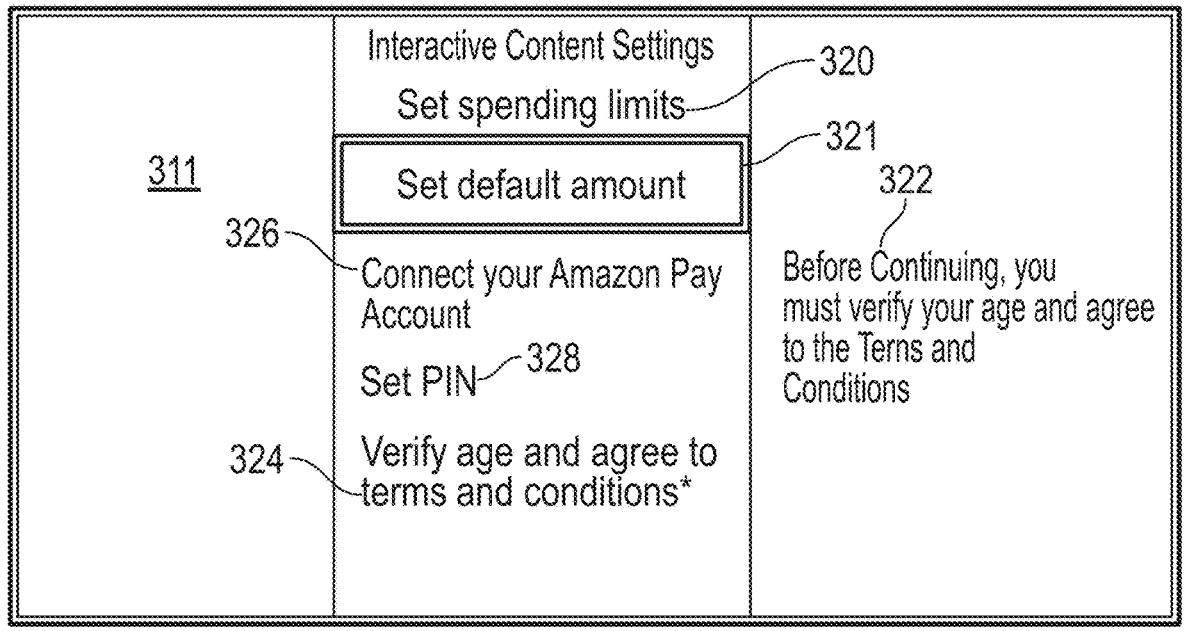
Figure 3H:
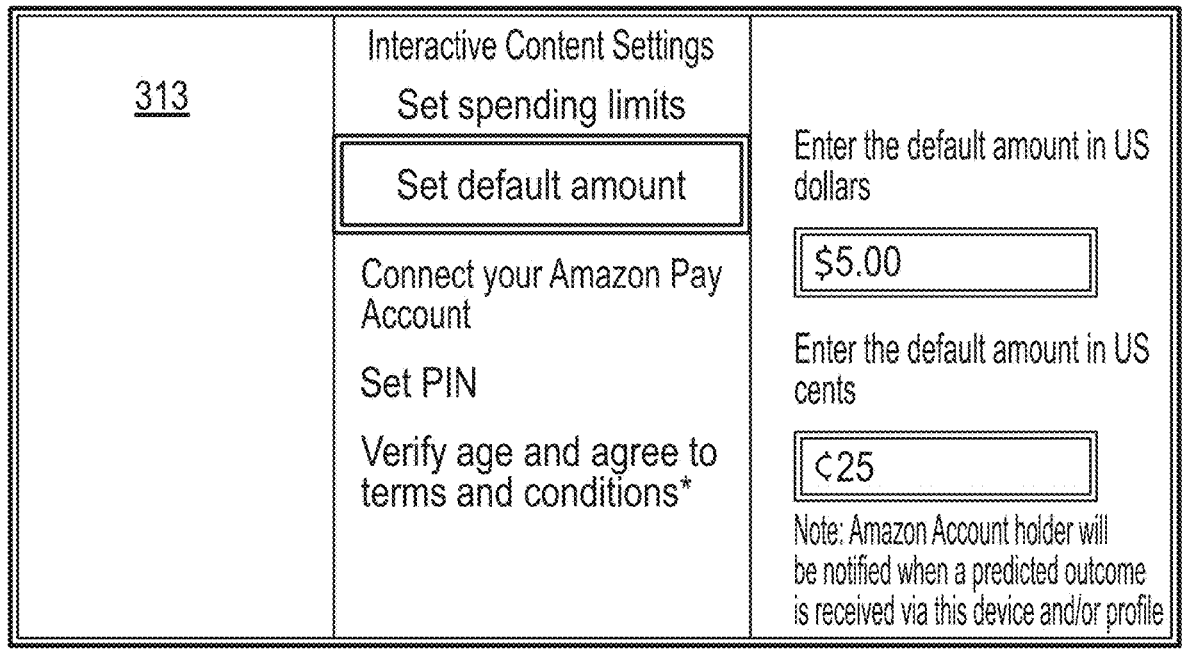

As shown in FIG. 3G, the media application may provide option 320 to set a default amount to be associated with predictions. Selection of option 321 may cause presentation of interface 313 in FIG. 3H, where a user may specify default amounts (e.g., standard or relatively large amounts or micro amounts) for predictions. Interface 311 may provide an indication 322 that the user's age and/or location must be verified before a prediction may be submitted. For example, such verification may be performed automatically prior to providing interactive content 103 of FIG. 1A and/or 106 of FIG. 1B, and/or based on receiving selection of a prediction, or based on receiving input selecting option 324. Option 326 may be selectable to link the user's predictions to a third-party payment account (e.g., Venmo) or a payment account related to the content provider and/or interactive content provider (e.g., Amazon Pay Account). Option 328 may enable a user to set a PIN code, to ensure that other users cannot select predictions, e.g., if the user steps away during a live broadcast of an event providing interactive content.

Figure 3I:
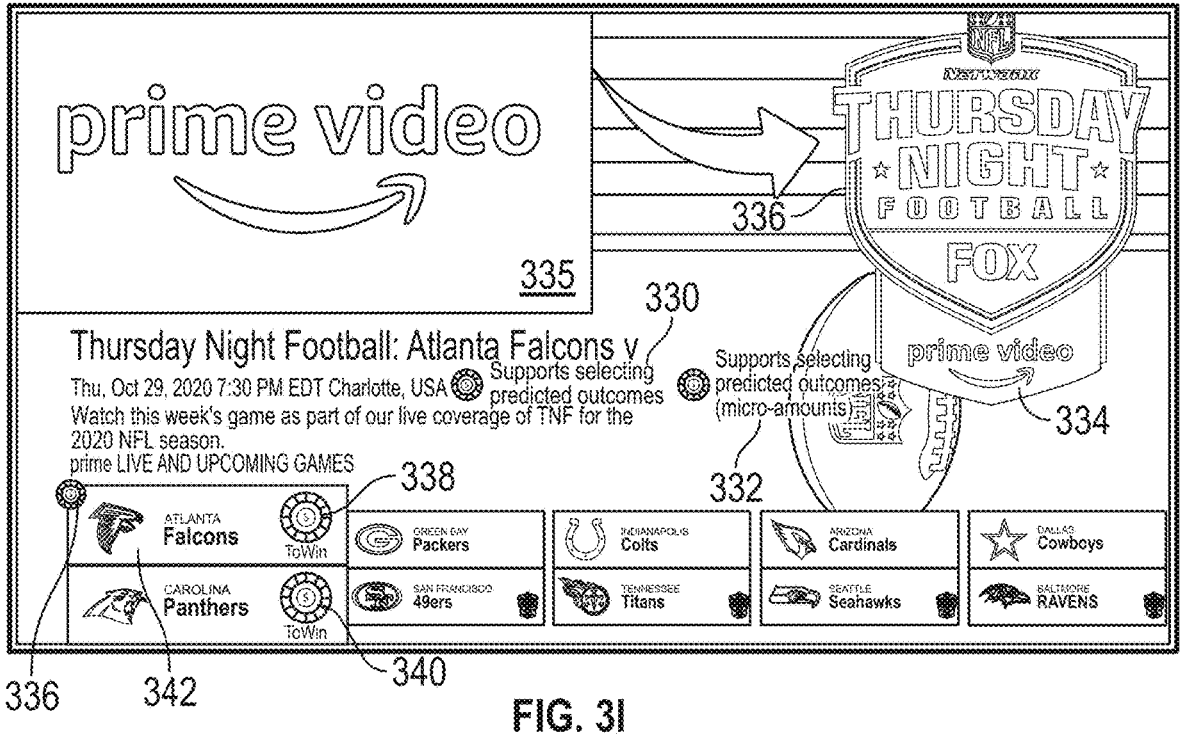

As shown in FIG. 3I, the media application (e.g., corresponding to or comprising one or more of content provider 334 (e.g., Amazon Prime Video) and/or 336 (FOX) and/or an interactive content provider associated with icons 330 and 332) may generate for display interface 335 comprising plurality of icons indicating upcoming live event, e.g., NFL games. For example, as shown at 342, the Atlanta Falcons are scheduled to play against the Carolina Panthers. Icon 330 associated with the interactive content provider indicates that for a particular matchup, selection of a predicted outcome is enabled (e.g., associated with relatively higher amounts of virtual credits). Icon 332 associated with the interactive content provider indicates that for a particular matchup, selection of a predicted outcome is enabled (e.g., associated with a micro-amounts of virtual credits). As shown at 342, for the matchup of the Atlanta Falcons vs. the Carolina Panthers, icons 338 and 340 correspond to icon 332 indicating that selection of a predicted outcome (e.g., associated with relatively higher amounts of virtual credits) is permitted in relation to selecting the Atlanta Falcons or Carolina Panthers in a predicted outcome of the game. Icon 342 indicates that selection of predicted outcome is permitted (e.g., associated with a micro-amounts of virtual credits) in relation to selecting the Carolina Panthers. In some embodiments, each of the other matchups (e.g., Indianapolis Colts vs. Tennessee Titans and Dallas Cowboys vs. Baltimore Ravens) may be depicted with or without icons corresponding to icons 330 or 332, to indicate whether selection of predicted outcomes is permitted for such matchups.

Figure 3J:
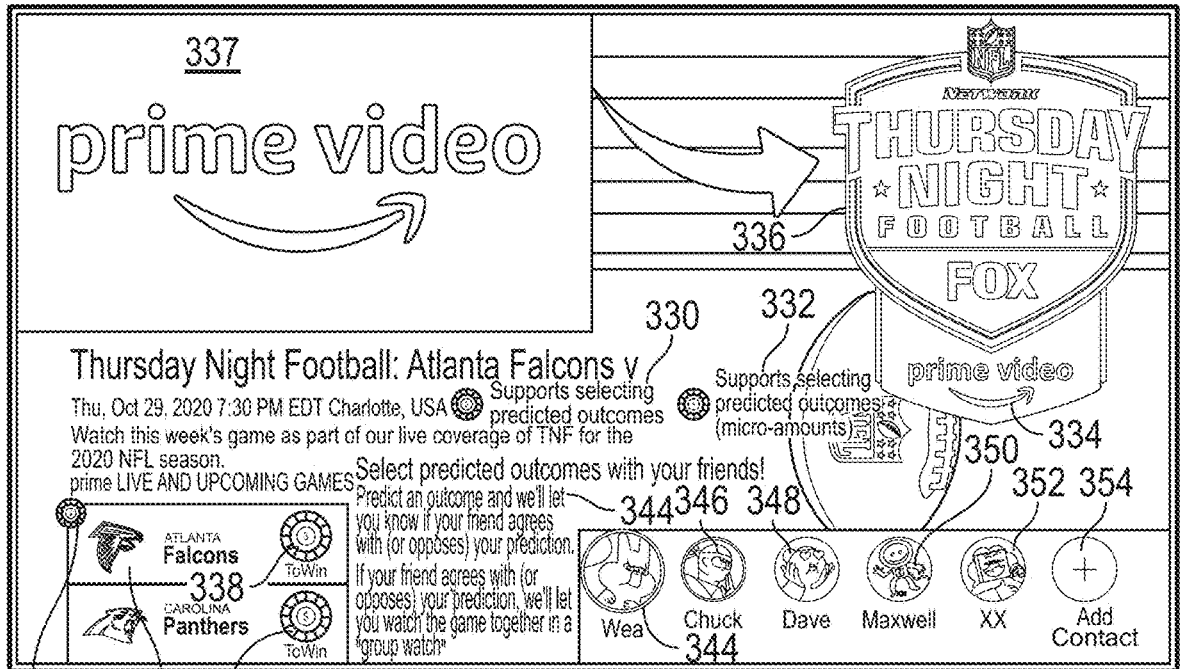

As shown in FIG. 3J, the media application may provide interface 337 which comprises an indication 344 that a user can predict an outcome for a particular event of a live program (e.g., the NFL game indicated at 342) and select one or more friends respectively associated with icons 344, 346, 348, 350, and 352 (or select icon 354 to add a different friend from the user's contacts). Selection of one or more of such icons may cause a notification to be transmitted to a computing device of the user associated with the selected icon(s). For example, if the user selects a prediction that the Atlanta Falcons will defeat the Carolina Panthers in the upcoming NFL game indicated at 342, and selects icon 344, the user's friend may receive a notification and choose to select his or her own prediction (e.g., agreeing that the Atlanta Falcons will defeat the Carolina Panthers, or opposing the user's prediction and predicting that the Carolina Panthers will defeat the Atlanta Falcons). The user may be notified of his or her friend's prediction, and may be provided with the option to view the game with his or her friend (e.g., in a "group watch" session) in which the users can view the game together.

Figure 4:
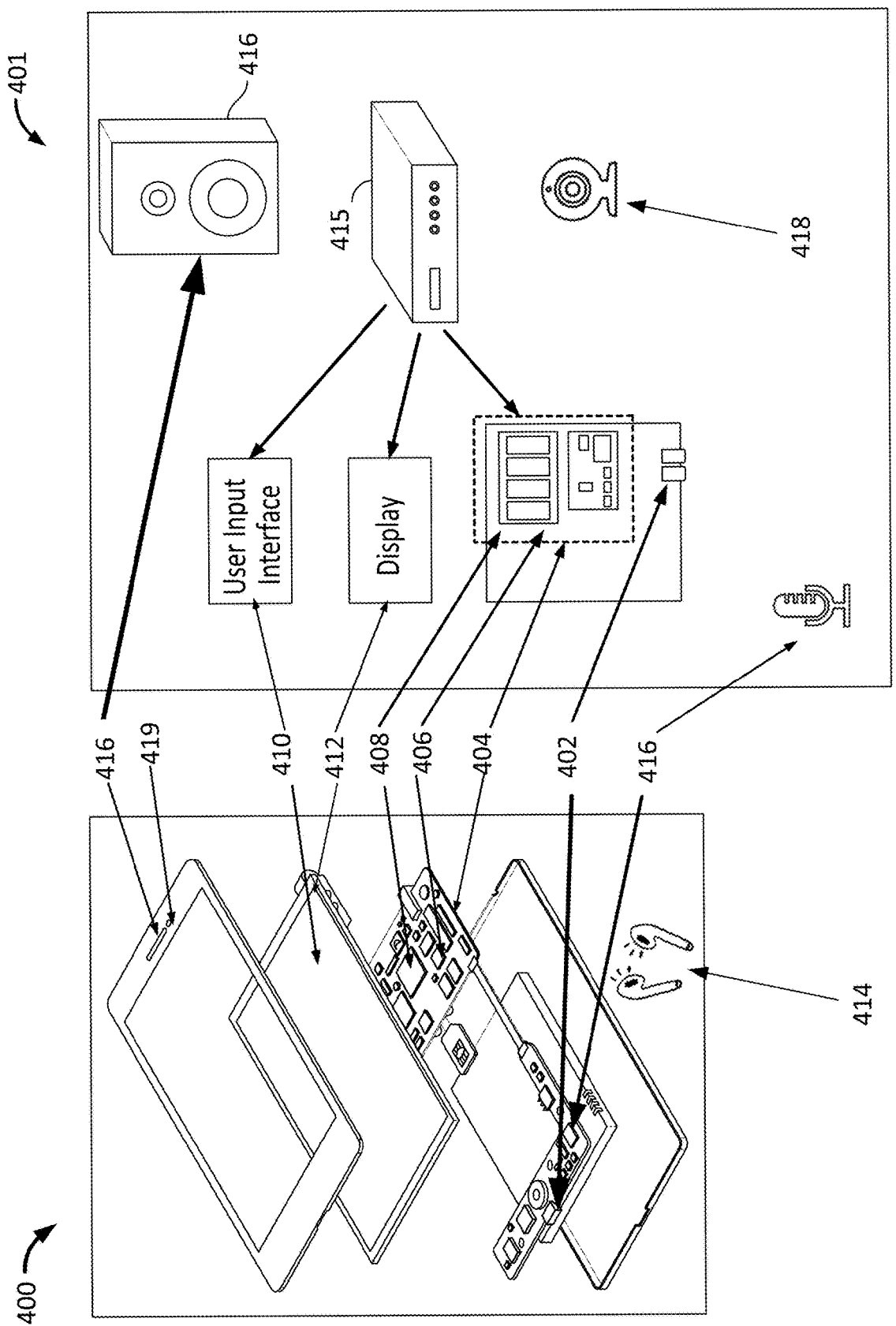
FIGS. 4-5 describe illustrative computing devices, systems, servers, and related hardware for providing interactive content related to a live program, in accordance with some embodiments of the present disclosure.
Figure 5:
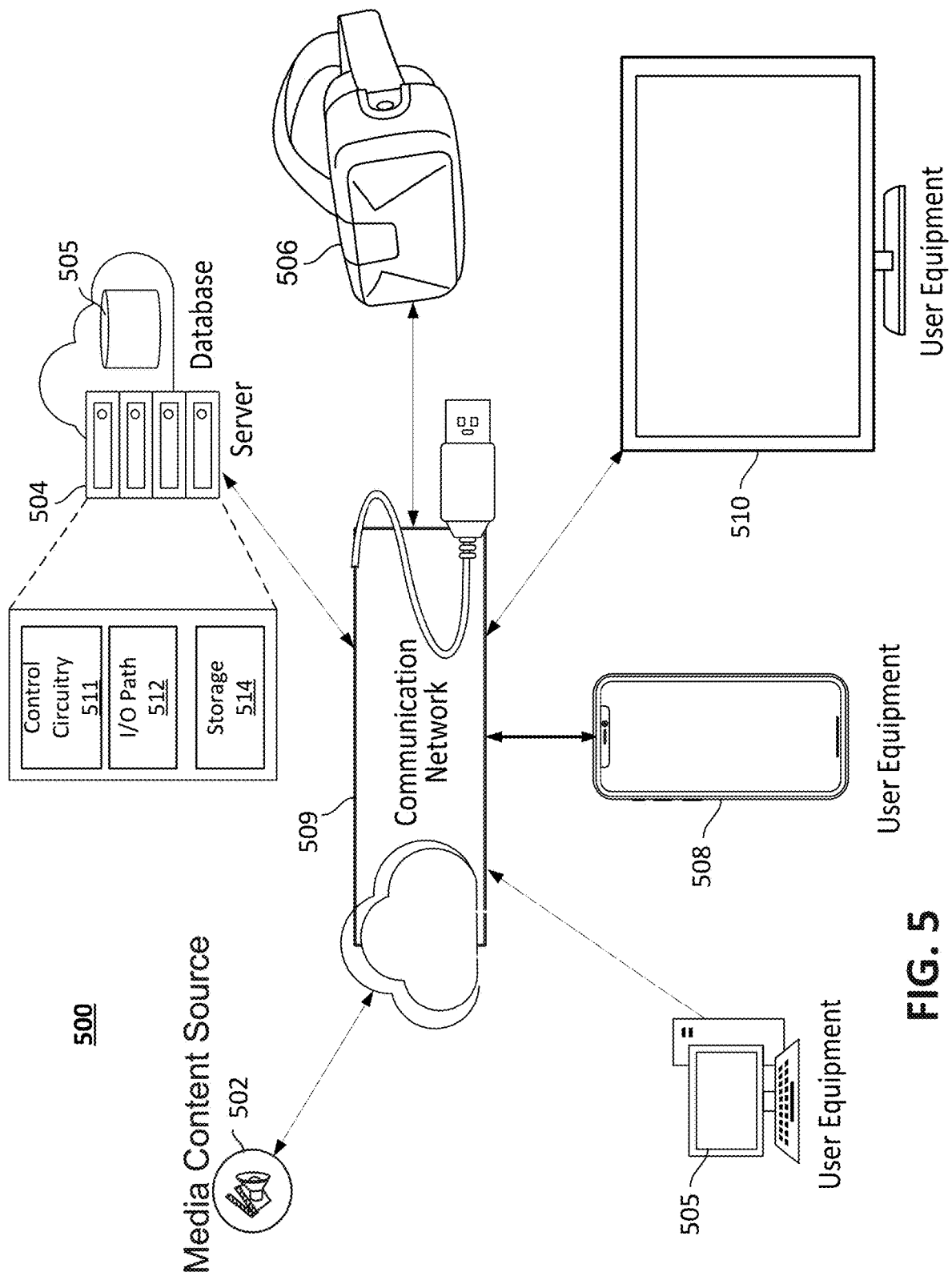

FIGS. 4-5 describe illustrative computing devices, systems, servers, and related hardware for providing interactive content related to a media asset, in accordance with some embodiments of the present disclosure. FIG. 4 shows generalized embodiments of illustrative computing device 400 and 401, which may correspond to, e.g., computing device 102 of FIGS. 1A-1B and computing device 202 of FIG. 2. For example, computing device 400 may be a smartphone device, a television, a tablet, a near-eye display device, an XR computing device, or any other suitable computing device capable of receiving and outputting a media asset (e.g., media asset 100 of FIGS. 1A-1B) and interactive content (e.g., interactive content 103 of FIG. 1A and/or interactive content 106 of FIG. 1B). In another example, computing device 401 may be a user television equipment system or device. Computing device 401 may include set-top box 415. Set-top box 415 may be communicatively connected to microphone 416, audio output equipment (e.g., speaker or headphones 414), and display 412. In some embodiments, microphone 416 may receive audio corresponding to a voice of a user (e.g., user 101 of FIGS. 1A-1B) requesting to select a particular prediction associated with interactive content provided to the user during display of a media asset.

In some embodiments, display 412 may be a television display or a computer display. In some embodiments, set-top box 415 may be communicatively connected to user input interface 410. In some embodiments, user input interface 410 may be a remote-control device. Set-top box 415 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of computing device are discussed below in connection with FIG. 5. In some embodiments, computing device 400 may comprise any suitable number of sensors (e.g., an accelerometer), and/or a GPS module (e.g., in communication with one or more servers and/or cell towers and/or satellites) to ascertain a location of computing device 400. In some embodiments, computing device 400 comprises a rechargeable battery that is configured to provide power to the components of computing device 400.

Each one of computing device 400 and computing device 401 may receive content and data via input/output (I/O) path 402. I/O path 402 may provide content (e.g., broadcast programming, on-demand programming, internet content, content available over a local area network (LAN) or wide area network (WAN), and/or other content) and data to control circuitry 404, which may comprise processing circuitry 406 and storage 408. Control circuitry 404 may be used to send and receive commands, requests, and other suitable data using I/O path 402, which may comprise I/O circuitry. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing. While set-top box 415 is shown in FIG. 4 for illustration, any suitable computing device having processing circuitry, control circuitry, and storage may be used in accordance with the present disclosure. For example, set-top box 415 may be replaced by, or complemented by, a personal computer (e.g., a notebook, a laptop, a desktop), a smartphone (e.g., computing device 400), an XR device, a tablet, a network-based server hosting a user-accessible client device, a non-user-owned device, any other suitable device, or any combination thereof.

Control circuitry 404 may be based on any suitable control circuitry such as processing circuitry 406. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i5 processors) or multiple different processors (e.g., an Intel Core i4 processor and an Intel Core i5 processor). In some embodiments, control circuitry 404 executes instructions for the media application stored in memory (e.g., storage 408). Specifically, control circuitry 404 may be instructed by the media application to perform the functions discussed above and below. In some implementations, processing or actions performed by control circuitry 404 may be based on instructions received from the media application.

In client/server-based embodiments, control circuitry 404 may include communications circuitry suitable for communicating with a server or other networks or servers. The media application may be a stand-alone application implemented on a computing device or a server. The media application may be implemented as software or a set of executable instructions. The instructions for performing any of the embodiments discussed herein of the media application may be encoded on non-transitory computer-readable media (e.g., a hard drive, random-access memory on a DRAM integrated circuit, read-only memory on a BLU-RAY disk, etc.). For example, in FIG. 4, the instructions may be stored in storage 408, and executed by control circuitry 404 of a computing device 400.

In some embodiments, the media application may be a client/server application where only the client application resides on computing device 400, and a server application resides on an external server (e.g., server 504 and/or media content source 502 of FIG. 5). For example, the media application may be implemented partially as a client application on control circuitry 404 of computing device 400 and partially on server 504 as a server application running on control circuitry 511. Server 504 may be a part of a local area network with one or more of devices 400, 401 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 504 and/or an edge computing device), referred to as "the cloud." Computing device 400 may be a cloud client that relies on the cloud computing capabilities from server 504 to provide a media asset and/or interactive content related to the media asset. The client application may instruct control circuitry 404 to provide a media asset and/or interactive content related to the media asset.

Control circuitry 404 may include communications circuitry suitable for communicating with a server, edge computing systems and devices, a table or database server, or other networks or servers. The instructions for carrying out the above mentioned functionality may be stored on a server (which is described in more detail in connection with FIG. 5). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the internet or any other suitable communication networks or paths (which is described in more detail in connection with FIG. 5). In addition, communications circuitry may include circuitry that enables peer-to-peer communication of user equipment, or communication of computing devices in locations remote from each other (described in more detail below).

Memory may be an electronic storage device provided as storage 408 that is part of control circuitry 404. As referred to herein, the phrase "electronic storage device" or "storage device" should be understood to mean any computing device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media application data described above. Nonvolatile memory may also be used (e.g., to launch a boot-up routine and other instructions). Cloud-based storage, described in relation to FIG. 4, may be used to supplement storage 408 or instead of storage 408.

Control circuitry 404 may include video generating circuitry and tuning circuitry, such as one or more analog tuners, one or more MPEG-4 decoders or MPEG-2 decoders or decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 404 may also include scaler circuitry for upconverting and downconverting content into the preferred output format of computing device 400. Control circuitry 404 may also include digital-to-analog converter circuitry and analog-to-digital converter circuitry for converting between digital and analog signals. The tuning and encoding circuitry may be used by computing device 400, 401 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from computing device 400, the tuning and encoding circuitry (including multiple tuners) may be associated with storage 408.

Control circuitry 404 may receive instruction from a user by way of user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone computing device or integrated with other elements of each one of computing device 400 and computing device 401. For example, display 412 may be a touchscreen or touch-sensitive display. In such circumstances, user input interface 410 may be integrated with or combined with display 412. In some embodiments, user input interface 410 includes a remote-control device having one or more microphones, buttons, keypads, any other components configured to receive user input or combinations thereof. For example, user input interface 410 may include a handheld remote-control device having an alphanumeric keypad and option buttons. In a further example, user input interface 410 may include a handheld remote-control device having a microphone and control circuitry configured to receive and identify voice commands and transmit information to set-top box 415.

Audio output equipment 414 may be integrated with or combined with display 412. Display 412 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 412. Audio output equipment 414 may be provided as integrated with other elements of each one of computing device 400 and computing device 401 or may be stand-alone units. An audio component of videos and other content displayed on display 412 may be played through speakers (or headphones) of audio output equipment 414. In some embodiments, audio may be distributed to a receiver (not shown), which processes and outputs the audio via speakers of audio output equipment 414. In some embodiments, for example, control circuitry 404 is configured to provide audio cues to a user, or other audio feedback to a user, using speakers of audio output equipment 414. There may be a separate microphone 416 or audio output equipment 414 may include a microphone configured to receive audio input such as voice commands or speech. For example, a user may speak letters or words that are received by the microphone and converted to text by control circuitry 404. In a further example, a user may voice commands that are received by a microphone and recognized by control circuitry 404. Camera 418 may be any suitable video camera integrated with the equipment or externally connected. Camera 418 may be a digital camera comprising a charge-coupled device (CCD) and/or a complementary metal-oxide semiconductor (CMOS) image sensor. Camera 418 may be an analog camera that converts to digital images via a video card.

The media application may be implemented using any suitable architecture. For example, it may be a stand-alone application wholly implemented on each one of computing device 400 and computing device 401. In such an approach, instructions of the application may be stored locally (e.g., in storage 408), and data for use by the application is downloaded on a periodic basis (e.g., from an out-of-band feed, from an internet resource, or using another suitable approach). Control circuitry 404 may retrieve instructions of the application from storage 408 and process the instructions to provide video conferencing functionality and generate any of the displays discussed herein. Based on the processed instructions, control circuitry 404 may determine what action to perform when input is received from user input interface 410. For example, movement of a cursor on a display up/down may be indicated by the processed instructions when user input interface 410 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 404 may allow a user to provide user profile information or may automatically compile user profile information. For example, control circuitry 404 may access and monitor network data, video data, audio data, processing data, participation data from a conference participant profile. Control circuitry 404 may obtain all or part of other user profiles that are related to a particular user (e.g., via social media networks), and/or obtain information about the user from other sources that control circuitry 404 may access. As a result, a user can be provided with a unified experience across the user's different devices.

In some embodiments, the media application is a client/server-based application. Data for use by a thick or thin client implemented on each one of computing device 400 and computing device 401 may be retrieved on-demand by issuing requests to a server remote to each one of computing device 400 and computing device 401. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on device 400. This way, the processing of the instructions is performed remotely by the server while the resulting displays (e.g., that may include text, a keyboard, or other visuals) are provided locally on device 400. Device 400 may receive inputs from the user via input interface 410 and transmit those inputs to the remote server for processing and generating the corresponding displays. For example, device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to device 400 for presentation to the user.

In some embodiments, the media application may be downloaded and interpreted or otherwise run by an interpreter or virtual machine (run by control circuitry 404). In some embodiments, the media application may be encoded in the ETV Binary Interchange Format (EBIF), received by control circuitry 404 as part of a suitable feed, and interpreted by a user agent running on control circuitry 404. For example, the media application may be an EBIF application. In some embodiments, the media application may be defined by a series of JAVA-based files that are received and run by a local virtual machine or other suitable middleware executed by control circuitry 404. In some of such embodiments (e.g., those employing MPEG-2, MPEG-4, HEVC or any other suitable digital media encoding schemes), the media application may be, for example, encoded and transmitted in an MPEG-2 object carousel with the MPEG audio and video packets of a program.

As shown in FIG. 5, computing device 505, 506, 508, 510 (which may correspond to, e.g., computing device 102 of FIGS. 1A-1B and computing device 202 of FIG. 2) may be coupled to communication network 509. Communication network 509 may comprise or correspond to one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 509) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 5 to avoid overcomplicating the drawing.

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 502-11x, etc.), or other short-range communication via wired or wireless paths. The computing device may also communicate with each other directly through an indirect path via communication network 509.

System 500 may comprise media content source 502, one or more servers 504, and/or one or more edge computing devices. In some embodiments, the media application may be executed at one or more of control circuitry 511 of server 504 (and/or control circuitry of computing device 505, 506, 508, 510 and/or control circuitry of one or more edge computing devices). In some embodiments, media content source 502 and/or server 504 may correspond to interactive content service provider server 230 and/or statistics server 218 and/or sports data feeds 238 of FIG. 2. In some embodiments, sports data feeds 238 may be associated with one or more content sources and/or organizations that track sports statistics in real time and such tracked sports statistics to various other entities, e.g., over network 509 of FIG. 5.

In some embodiments, server 504 may include control circuitry 511 and storage 514 (e.g., RAM, ROM, Hard Disk, Removable Disk, etc.). Storage 514 may store one or more databases. Server 504 may also include an I/O path 512. I/O path 412 may provide video conferencing data, device information, or other data, over a local area network (LAN) or wide area network (WAN), and/or other content and data to control circuitry 511, which may include processing circuitry, and storage 514. Control circuitry 511 may be used to send and receive commands, requests, and other suitable data using I/O path 512, which may comprise I/O circuitry. I/O path 512 may connect control circuitry 511 (and specifically control circuitry) to one or more communications paths.

Control circuitry 511 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 411 may be distributed across multiple separate processors or processing units, for example, multiple of the same type of processing units (e.g., two Intel Core i5 processors) or multiple different processors (e.g., an Intel Core i4 processor and an Intel Core i5 processor). In some embodiments, control circuitry 511 executes instructions for an emulation system application stored in memory (e.g., the storage 514). Memory may comprise or correspond to an electronic storage device provided as storage 414 that is part of control circuitry 511.

Figure 6:
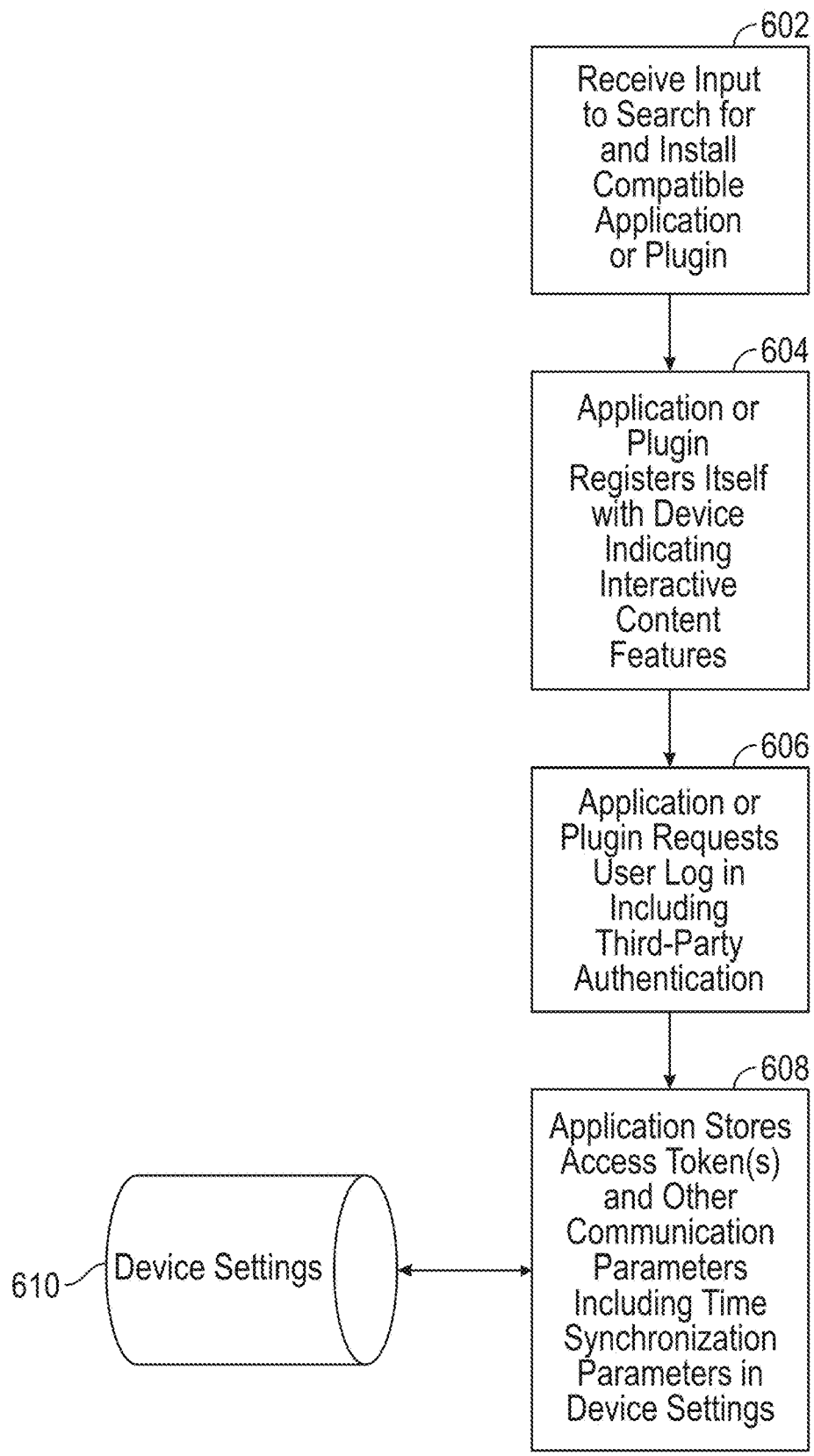
FIG. 6 is a flowchart of an illustrative process 600 for registering a third-party application as an interactive content provider, in accordance with some embodiments of this disclosure.

FIG. 6 is a flowchart of an illustrative process 600 for registering a third-party application as an interactive content provider, in accordance with some embodiments of this disclosure. In various embodiments, the individual steps of process 600 may be implemented by one or more components of the devices, systems and methods of FIGS. 1-22 and may be performed in combination with any of the other processes and aspects described herein. Although the present disclosure may describe certain steps of process 600 (and of other processes described herein) as being implemented by certain components of the devices, systems and methods of FIGS. 1-22, this is for purposes of illustration only. It should be understood that other components of the devices, systems and methods of FIGS. 1-22 may implement those steps instead.

At 602, control circuitry (e.g., control circuitry 404 of FIG. 4 and/or control circuitry 511 of FIG. 5), and/or I/O circuitry 402 or 512 of FIGS. 4-5, may receive input from a user (e.g., user 101 of FIGS. 1A-1B) to search for and install (e.g., at computing device 102 of FIGS. 1A-1B) a compatible interactive content application or plugin (e.g., interactive content plugin 226 of FIG. 2) associated with an interactive content provider (e.g., interactive content service provider server 230 of FIG. 2). In some embodiments, the media application may comprise or correspond to the interactive content application or plugin, or the media application may be separate from the interactive content application or plugin. In some embodiments, one or more interactive content applications or plugins may be installed from a filtered list of compatible interactive content applications or plugins. In some embodiments, such interactive content application(s) or plugin(s) may be linked to (e.g., provided over a network by interactive content service provider 230 to) a computing device rather than being installed at such computing device.

At 604, the control circuitry may cause the application identified at 602 to be registered with, e.g., an operating system associated with computing device 102 of FIGS. 1A-1B and/or a user profile of user 101, and may indicate (to computing device 102 and/or the media application and/or content provider) one or more features (e.g., different types of predictions, and/or amounts or prizes able to be awarded, and/or micro-amounts or prizes able to be won, based on predictions, age or location verifications, one-click predictions, maximum or minimum values associated with a prediction, setting a PIN code, or any other suitable setting or any combination thereof) of the interactive content application or plugin to computing device 102 and/or the user profile.

At 606, the control circuitry may request, and receive and/or register, login credentials from the user (e.g., user 101 of FIGS. 1A-1B) for the interactive content provider application. If the user's credentials are not recognized and/or the user is not yet registered with the interactive content provider, the user may be prompted to set up an account with the interactive content provider.

In some embodiments, the control circuitry may perform authentication of the user, prior to providing the interactive content to the user to enable the user to select a predicted outcome via the interactive content for a live event and/or portion(s) thereof, in association with the user's profile or account. For example, a particular geographic location or jurisdiction in which user 101 is located may have certain legal requirements regarding whether predicted outcomes being associated with virtual credits is permitted at all, and/or a required minimum age in order to participate. In some embodiments, the control circuitry may utilize geo-location of each of computing device 102 (e.g., IP geo-location mapping) and a third-party authentication (e.g., with geo-location enabled) to enable or disable the plugin(s) where applicable based on the determined location, e.g., comparing the determined location to a list of locations where selection of predicted outcomes might be permitted or restricted. In some embodiments, multi-factor authentication may be utilized, e.g., via text message, email, or biometric input) when authenticating the user profile.

In some embodiments, an age of the user may be verified based on sensors and/or biometric input, e.g., captured images, facial recognition, or using any other suitable technique, or any combination thereof. In some embodiments, an age of the user may be verified based on receiving payment methods (e.g., credit card information of the user), and/or by providing an option (e.g., on a mobile device) to approve a prediction submitted via a different device (e.g., computing device 102 of FIGS. 1A-1B). In some embodiments, a content provider may generate a token, and share such token with an interactive content provider, to verify a zip code of a user, and the plugin may be enabled if the zip code indicates that the user is in a permitted location.

In some embodiments, once authenticated, the user's authentication may persist for any suitable period of time, e.g., for a particular amount of minutes or hours, for the duration of the live event (e.g., the NFL game shown in FIGS. 1A-1B), for the duration of the session (e.g., until the user exits his or her profile accessing the content provider's media asset 100, for all NFL games, or based on any other suitable criterion, or any combination thereof). For example, the token may be associated with the user's session, and the token may be associated with an expiration time period. In some embodiments, the duration for which the authentication is to persist may be specified by the user as a user preference and/or may be set by the content provider and/or interactive content provider. For example, the interactive content provider may require re-authentication if a channel is changed (or the user's accessing or the media asset is otherwise ceased) or each time a predicted outcome is selected, and this may be a policy of the interactive content provider to be enforced by the content provider. In some embodiments, the authentication process may be somewhat time-consuming or bothersome to a user, and thus allowing the authentication to persist may be advantageous.

At 608, the interactive content application or plugin may store an access token associated with verified login credentials and/or the authentication process, and/or may store other communication parameters (e.g., time synchronization parameters associated with time sync service and/or 235 of FIG. 2) in device settings 610, which may be stored locally at the computing device (e.g., computing device 102 of FIG. 1A-1B) or remotely (e.g., at server 504 of FIG. 5). In some embodiments, the interactive content application or plugin may request to be treated by the control circuitry as required for implementing the media application, e.g., to ensure that the interactive content application or plugin is assigned given priority run status, e.g., increased network bandwidth, increased CPU access, auto-restart, increased thread count, or other suitable actions, or any suitable combination thereof. In some embodiments, the interactive content application or plugin may be integrated into an application or service of, or otherwise interact with, a content provider (e.g., the channel "FOX" indicated at 105 of FIGS. 1A-1B and/or the "Amazon Prime Video" service indicated at 107) to enable selection of predicted outcomes during presentation of a media asset (e.g., media asset 100 of FIGS. 1A-1B) by such content provider.

In some embodiments, the interactive content application and/or plugin may enable selection of predicted outcomes in a real-time event (e.g., an NFL or college football game) within a streaming (e.g., buffered) content playback environment. In some embodiments, if no interactive content application(s) or plugin(s) are available (e.g., not yet installed or not yet configured), predicted outcome results may accumulate within a user profile and may be presented as visual elements for entertainment purposes (e.g., "leveling up" such as to a higher level than "Punter" indicated in FIG. 3F, "showing off" via badges to a user's friends, providing on-screen statistics or leaderboards among friends, or any other suitable visual elements may be provided, or any combination thereof). In some embodiments, the architecture of the system may be inverted in the sense that the content provider (e.g., providing media asset 100) may be implemented as a plugin to the interactive content provider, e.g., by providing a web view of an application of the content provider and overlaying the interactive content.

Figure 7:
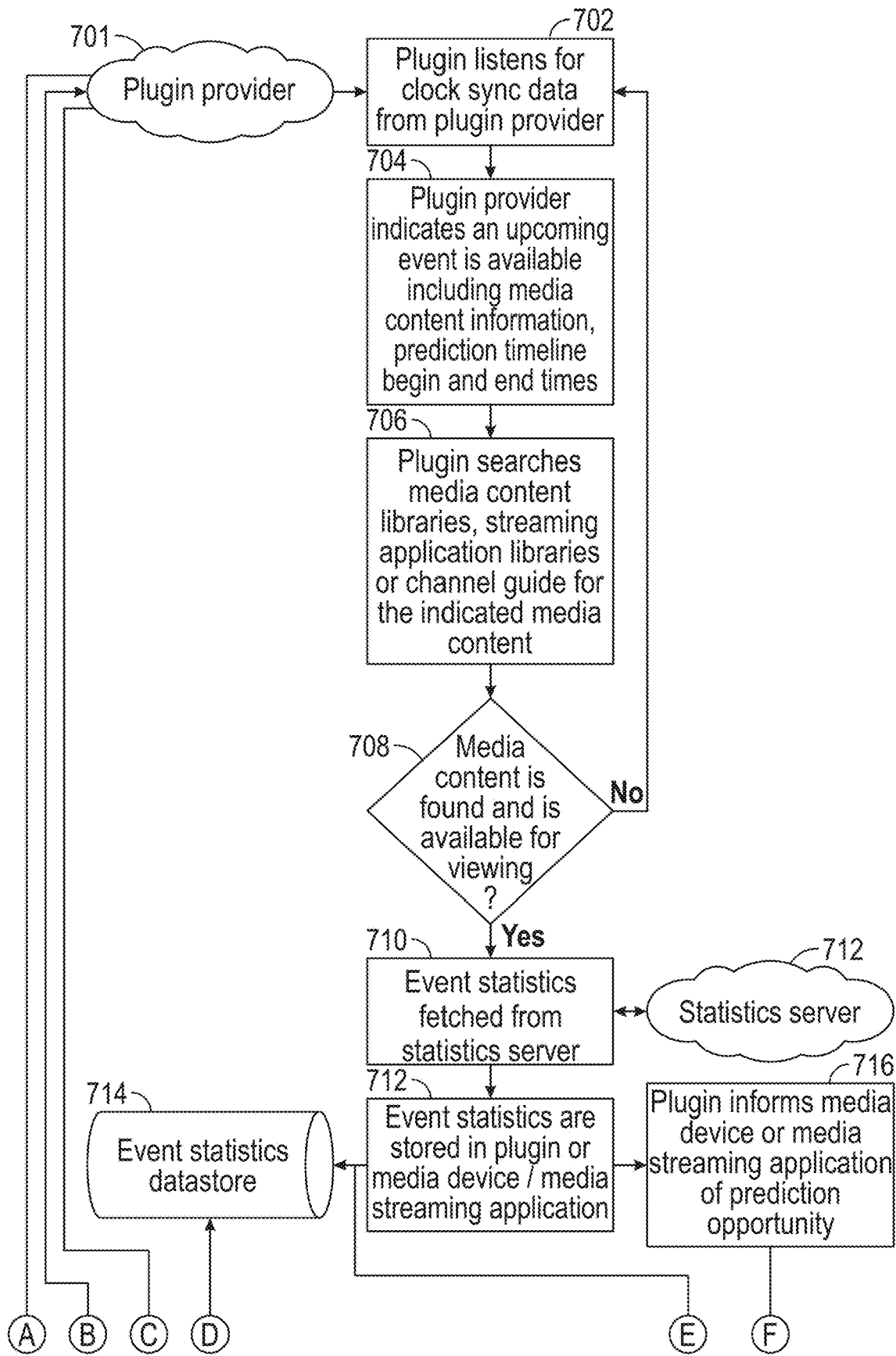
FIG. 7 is a flowchart of an illustrative process 700 for registering a third-party application as an interactive content provider, in accordance with some embodiments of this disclosure.
Figure 7:
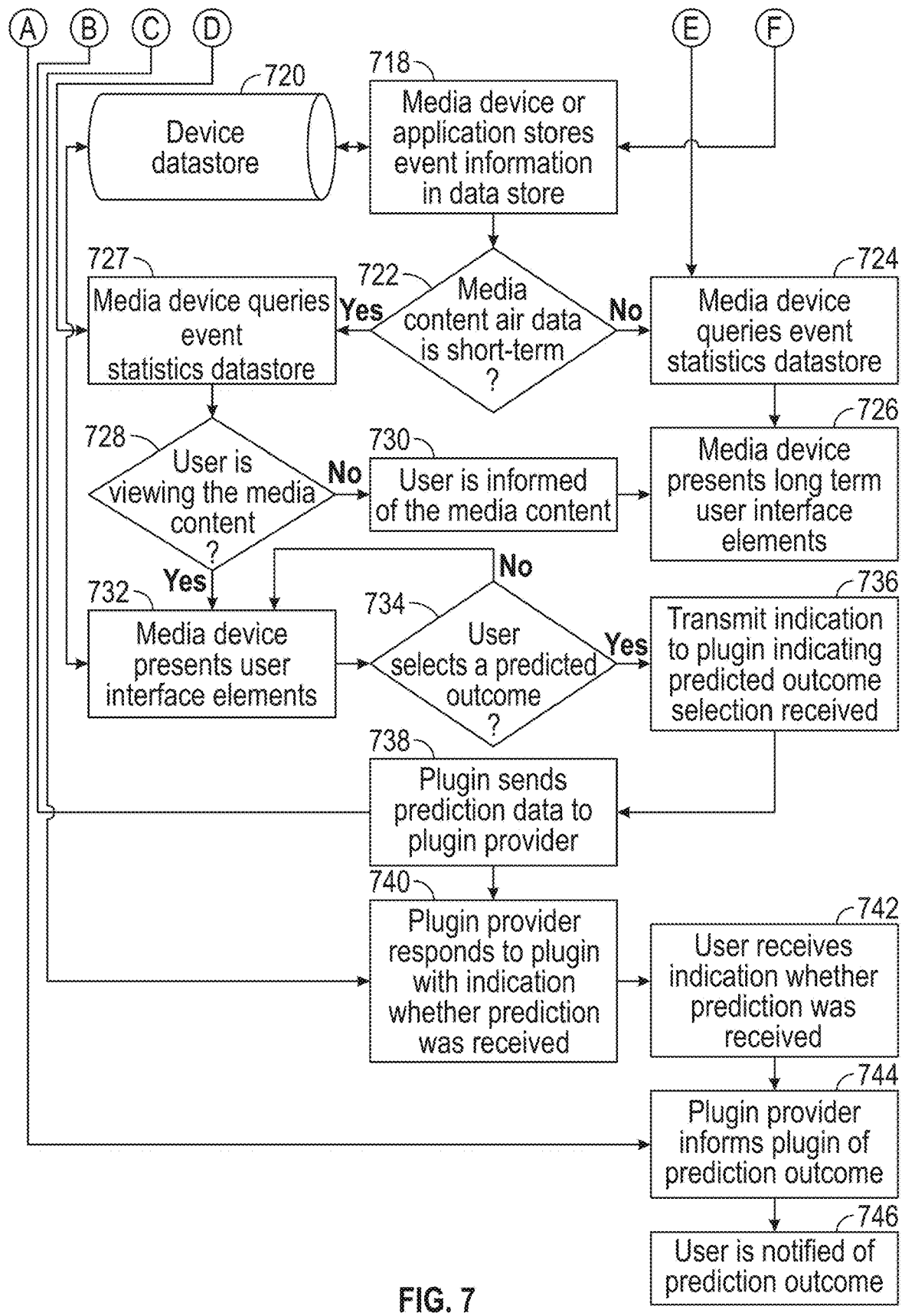

FIG. 7 is a flowchart of an illustrative process 700 for registering a third-party application as an interactive content provider, in accordance with some embodiments of this disclosure. In various embodiments, the individual steps of process 700 may be implemented by one or more components of the devices, systems and methods of FIGS. 1-22 and may be performed in combination with any of the other processes and aspects described herein. Although the present disclosure may describe certain steps of process 600 (and of other processes described herein) as being implemented by certain components of the devices, systems and methods of FIGS. 1-22, this is for purposes of illustration only. It should be understood that other components of the devices, systems and methods of FIGS. 1-22 may implement those steps instead.

At 702, control circuitry (e.g., control circuitry 404 of FIG. 4 and/or control circuitry 511 of FIG. 5) may execute instructions to provide a plugin (e.g., interactive content plugin 226 of FIG. 2 received from plugin provider 701, which may correspond to interactive content service provider server 230 of FIG. 2). Such interactive content plugin may listen for clock sync data from plugin provider 701. Such plugin (e.g., once installed and/or configured with user settings and/or provider settings) can manage the timely presentation of opportunities for predicting selected outcomes during an associated live event (e.g., a professional or collegiate or other level football game) or certain on-demand content.

Due to the time-sensitive nature of live events or first airing of on-demand content, the plugin may "hold" or "keep" the time, e.g., the plugin may determine when events have started and ended and when opportunities to select predicted outcomes are active or expired. In some embodiments, it may be desirable for plugin 226 to receive clock sync data from plugin provider service 234 of FIG. 2, in order to synchronize time between the plugin and the plugin provider, e.g., the time may be kept by the plugin provider regardless of clock time on the device (e.g., computing device 102 of FIG. 1A-1B) or playback time within the media content. The plugin may also receive, handle and/or be the "holder" of value (e.g., virtual credits associated with a predicted outcome).

At 704, the control circuitry may execute instructions to cause the plugin provider (e.g., plugin provider service 234) to indicate to the plugin (e.g., interactive content plugin 226 of FIG. 2) an upcoming event (e.g., an NFL game or a portion thereof) for which a predicted outcome may be selected, which may include a prediction timeline of when a predicted outcome is to be selected by.

At 706, the control circuitry may execute instructions to cause the plugin to search streaming application libraries and/or media content libraries and/or channel guides (e.g., stored at media content source 502 or server 504 of FIG. 5 or locally at computing device 400 or 401 of FIG. 4) for the media content indicated at 704. At 706, if such content is found, processing proceeds to 708 where the media content (e.g., media asset 100) is identified and determined to be available (or not available) for viewing; otherwise, processing may revert to 702.

At 710, the control circuitry may retrieve event statistics (e.g., a current timepoint of the game, current players on the field, current statistics of the players in the game, an upcoming play, or any other suitable statistics, or any combination thereof) associated with the media content from statistics server 712, which may correspond to statistics server 218 of FIG. 2. At 712, such event statistics may be stored in association with plugin provider server 230 and/or plugin 226 and/or at the computing device (e.g., computing device 102 of FIGS. 1A-1B) and provided to event statistics datastore 714. At 716, the plugin may transmit an indication to the computing device (e.g., computing device 102 of FIGS. 1A-1B) and/or the media application regarding an opportunity for a user to select a predicted outcome for a particular event of a live program or a portion thereof.

At 718, the control circuitry may store the event statistics and/or information at device datastore 720 of the computing device. At 722, the control circuitry may determine whether the upcoming event is occurring or is scheduled to begin shortly; if so, processing may proceed to 727, otherwise processing proceeds to 724. At 724, the control circuitry may query event statistics datastore 714, and at 726 the control circuitry may provide long-term user interface elements related to the live event that is scheduled to begin at a relatively later time from a current time. For example, the control circuitry may generate for display long-term user interface elements (e.g., as barker, banner and/or other advertisements, channel guide elements, or other notifications or icons) associated with enabling a user to submit a predicted outcome, and may take into account other parameters (e.g., a type of the prediction and/or values or prizes associated with the prediction) and/or may provide event statistics fetched at 710.

At 727, the control circuitry may query event statistics datastore 714, and at 728 the control circuitry may determine whether the user is currently viewing the media content (e.g., media asset 100 of FIGS. 1A-1B); if so, processing may proceed to 732, otherwise processing may proceed to 730. At 730, the user may be informed of the media content and/or opportunities to submit predicted outcomes in relation to the media content.

Figure 8A:
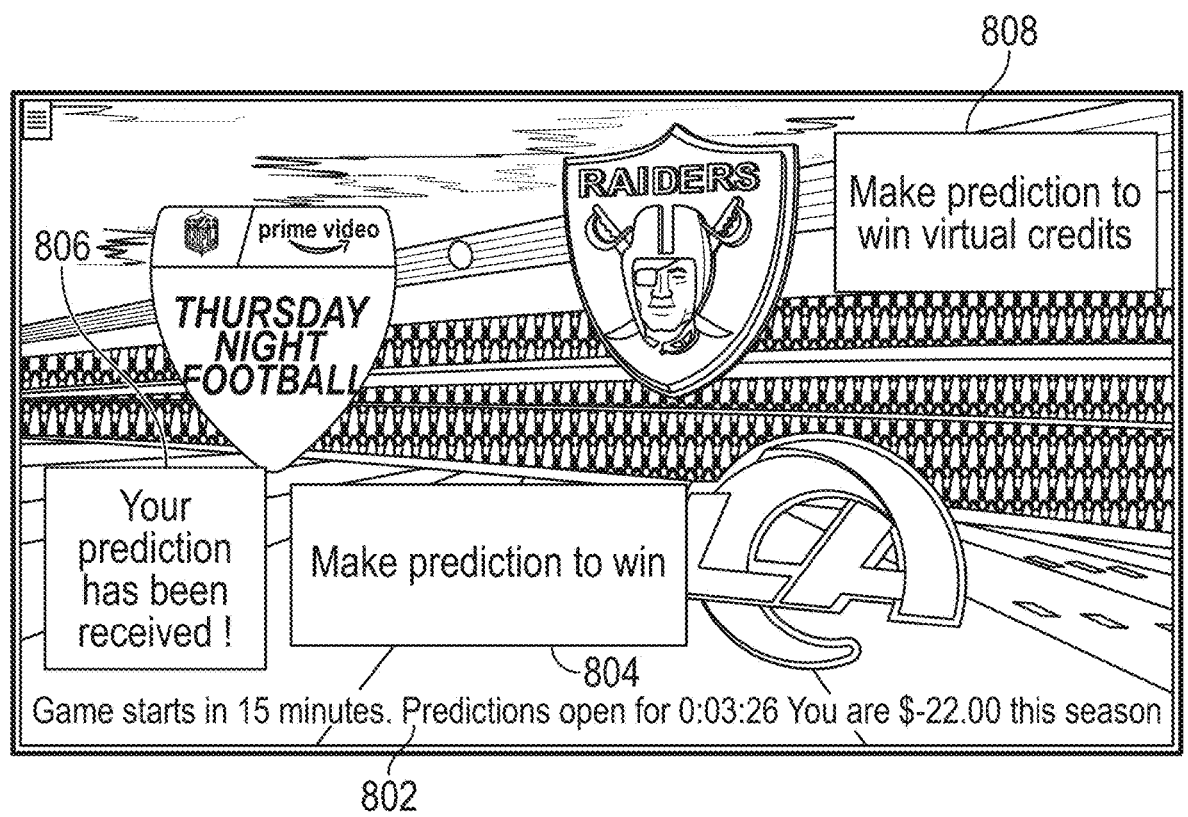
FIGS. 8A-8C show illustrative user interfaces, in accordance with some embodiments of this disclosure.

At 732, the control circuitry may present user interface elements (e.g., interactive content 106 of FIGS. 1A-1B including a graphic to allow for selection of a predicted outcome) and may take into account other parameters (e.g., a type of the prediction and/or values or prizes associated with the prediction) and/or may provide event statistics fetched at 710. For example, as shown in FIG. 8A, the control circuitry may provide various indications, such as indication 802 that the user may have three minutes and 26 seconds to submit his or her prediction, and indication 804 and 808 that a user may win virtual credits based on his or her prediction.

At 734, the control circuitry may determine whether a user selected a predicted outcome (e.g., via a "one-click" selection of option 112 of FIGS. 1A-1B) e.g., as voice input, tactile input, input received via a keyboard or remote control, input received via a touchscreen, text-based input, biometric input, or any other suitable input, or any combination thereof. If the selection is received, processing may proceed to 736; otherwise processing may return to 732.

In some embodiments, the control circuitry may learn from a user's historical prediction of outcomes to determine which types of events a user tends to prefer to select predicted outcomes for. For example, if a user often watches and selects predicted outcomes for NFL football games but rarely watches or selects predicted outcomes on college football games, the control circuitry may refrain from providing prompts to submit predicted outcomes during college football games, to avoid cluttering the screen of the user and annoying the user with content he or she is not interested in. As another example, if the user consistently associates predicted outcomes of certain types of events (e.g., penalty kicks in a soccer game) with a particular amount of virtual credits (e.g., micro-amounts), the control circuitry may suggest an increase (e.g., to a default amount) or only certain opportunities to select predicted outcomes only to certain users (e.g., users that associated predicted outcomes with a relatively high amount of virtual credits). In some embodiments, a user may be notified if his or her account balance is low, e.g., too low to associate virtual credits with a selected predicted outcome, and the user may be prompted to associate his or her account with more virtual credits in order to proceed. In some embodiments, based on metadata associated with the media asset and/or interactive content (e.g., if the NFL game is a playoff game), a higher amount of virtual credits may be permitted to be associated with a predicted outcome (e.g., as compared to a non-playoff game). In some embodiments, pre-set minimum and pre-set maximum amounts of virtual credits may be associated for different teams and/or games.

Figure 8B:
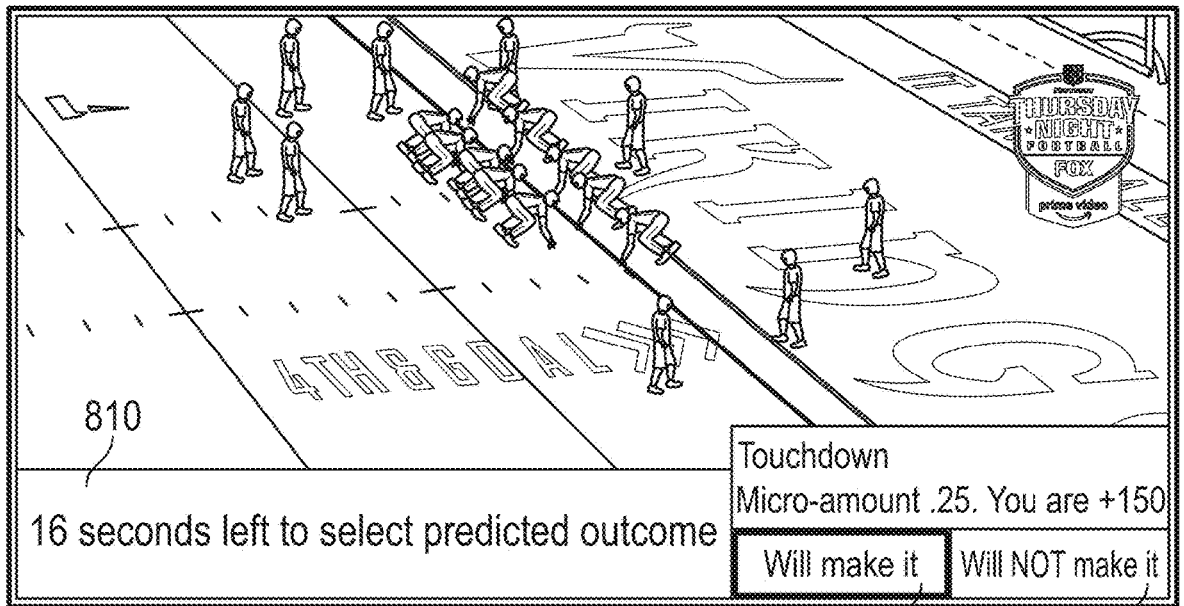
Figure 8C:
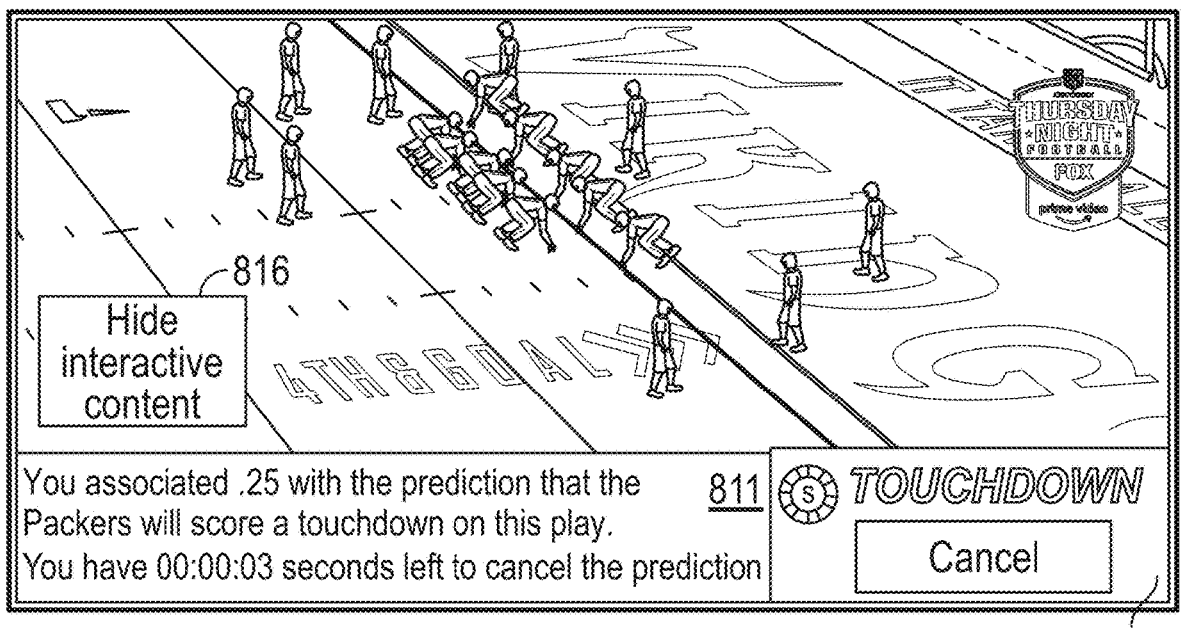

In some embodiments, as shown in FIG. 8B-8C, the control circuitry may provide the user with interactive content 810 indicating that there are 16 seconds left to submit a predicted outcome (e.g., option 812, selectable to predict that a touchdown will be scored on the next play, or option 84, selectable to predict that a touchdown will not be scored on the next play). In some embodiments, FIGS. 8B-8C may be shown when playback of the media asset is close to real time. The control circuitry may set the timer for submitting a prediction based on determining that the play is to begin in 16 seconds. As shown in FIG. 8C, selection of option 816 may cause interactive content 810 and/or 811 to be hidden from the display. At 818, an indication may be provided (e.g., "Touchdown" based on the user selecting option 812) of what the user predicted, and an option to cancel the submission of the prediction may be provided (as shown at 811, the user may have only three seconds remaining to cancel the prediction).

In some embodiments, the selection at 734 may be received in association with a media asset corresponding to a live event when a user's progress point in the media asset (e.g., media asset 100 of FIGS. 1A-1B) that a user is viewing may be in real time, or relatively close to real time, or relatively far away from real-time, e.g., as shown in FIG. 1, the user may be 13 minutes and 9 seconds behind the live game. In some embodiments, an opportunity to select a predicted outcome may be provided in association with content that is not a broadcast or stream of a live event, e.g., an episode of a television show or season thereof, movie or content which is pre-recorded, such as a first airing of a finale of a television show. In this instance, the control circuitry may identify an opportunity to select a predicted outcome (e.g., allowing a user to "play along" with the content) based on metadata for the media asset provided by a content provider, a third party (e.g., a closed captioning service), via a computer vision, text-to-speech processing, or using any other suitable computer-implemented technique, or any combination thereof. In some embodiments, where an episode has not been released (e.g., if new episodes come out each week on a particular day) opportunities to select predicted outcomes may be presented to users within an advertisement, barker, channel guide, notification and/or via any other suitable technique.

At 736, the control circuitry may cause an indication to be transmitted to plugin 226 indicating that selection of a predicted outcome (at 734) has been received. In some embodiments, such indication may be transmitted with metadata (e.g., an amount of virtual credits associated with the predicted outcome, a type of the prediction, which outcome was predicted, or any other suitable data or any combination thereof).

At 738, the control circuitry may cause data of such predicted outcome to be transmitted to plugin provider (e.g., server 230 of FIG. 2), and at 740 the plugin provider may respond with an indication as to whether the prediction was received. At 742, the user may be provided (e.g., via computing device 102 of FIGS. 1A-1B) whether the prediction was received. For example, as shown in FIG. 8A, the control circuitry may provide indication 806 that the user's prediction has been received. The control circuitry may provide an indication to the user whether the prediction was correct or incorrect (at 744). At 746, the user may be provided an indication e.g., via computing device 102 of FIGS. 1A-1B) as to whether his or her prediction was correct.

Figure 9A:
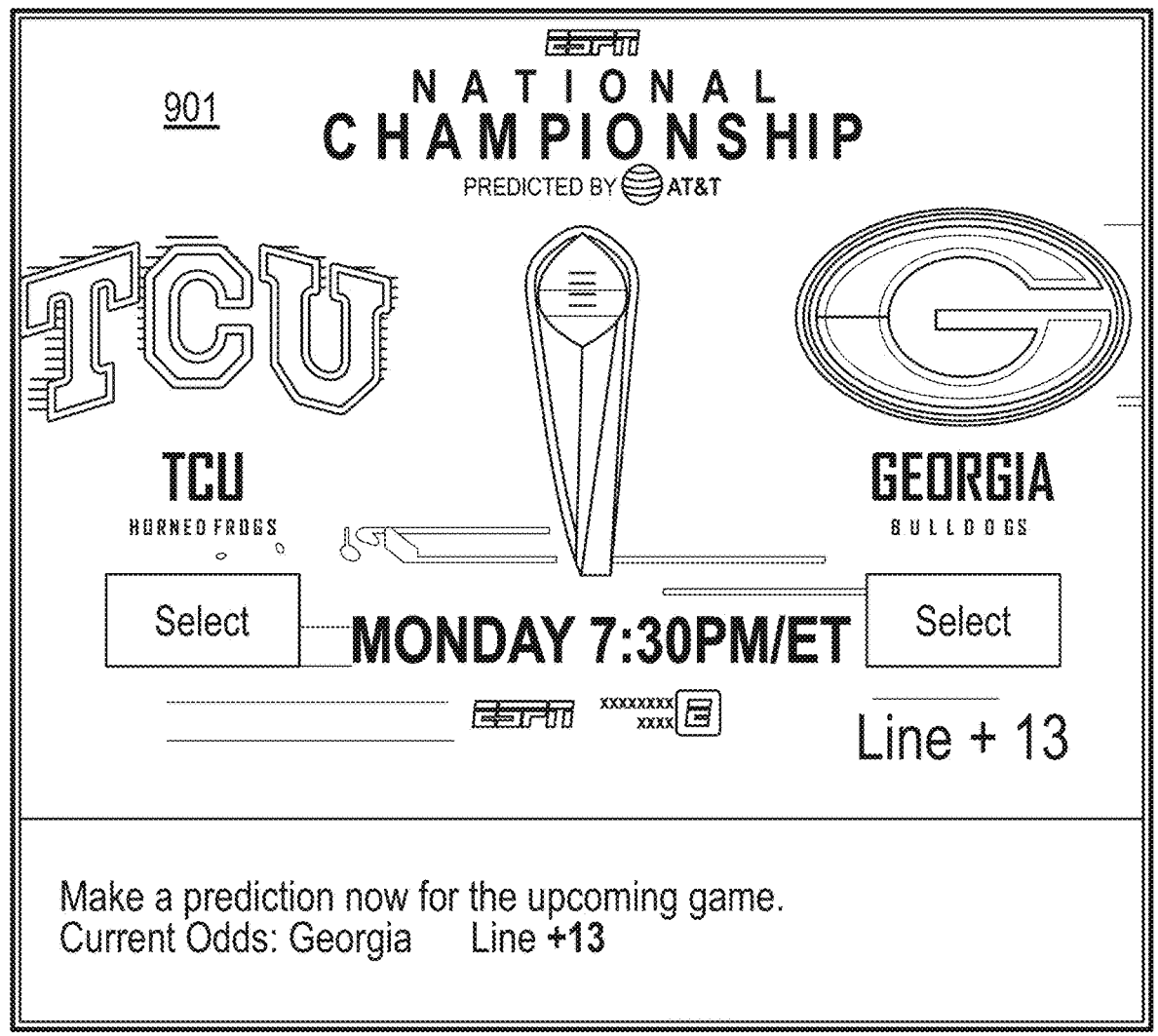
FIGS. 9A-9E show illustrative user interfaces, in accordance with some embodiments of this disclosure.
Figure 9B:
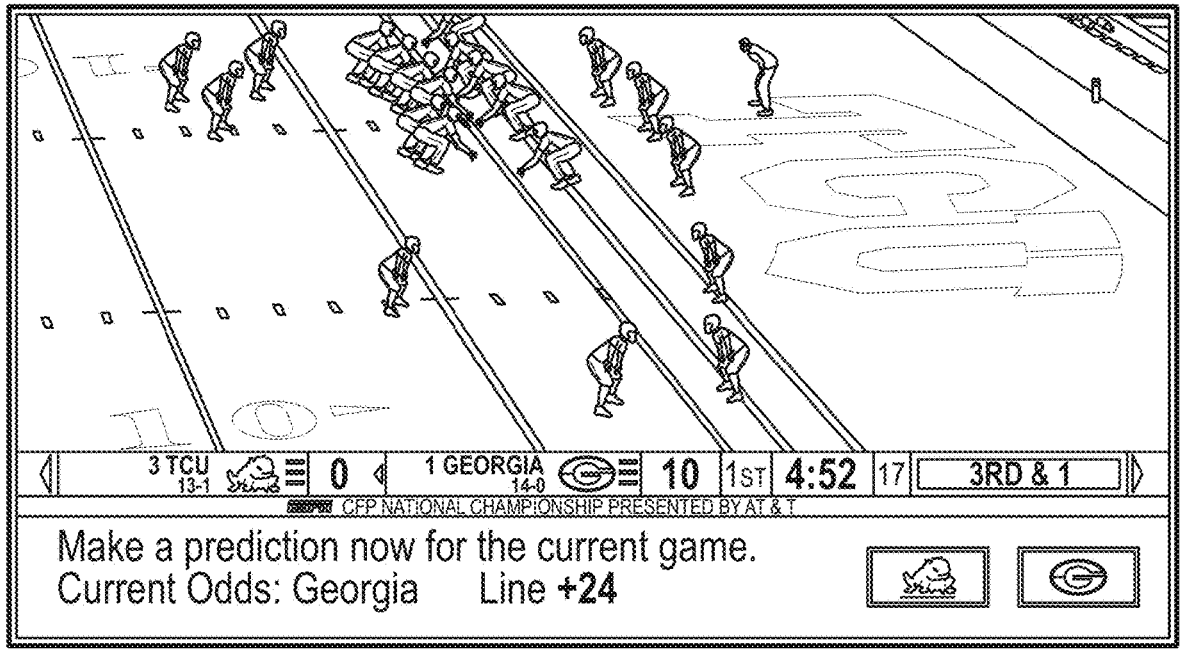
Figure 9C:
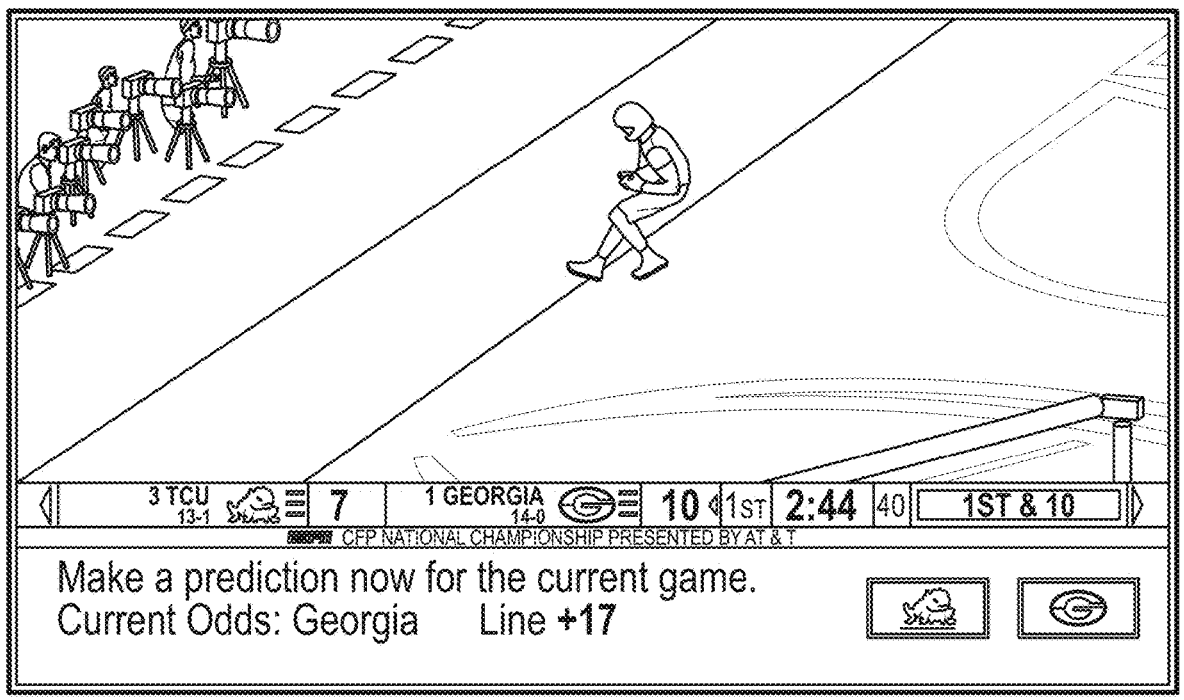
Figure 9D:
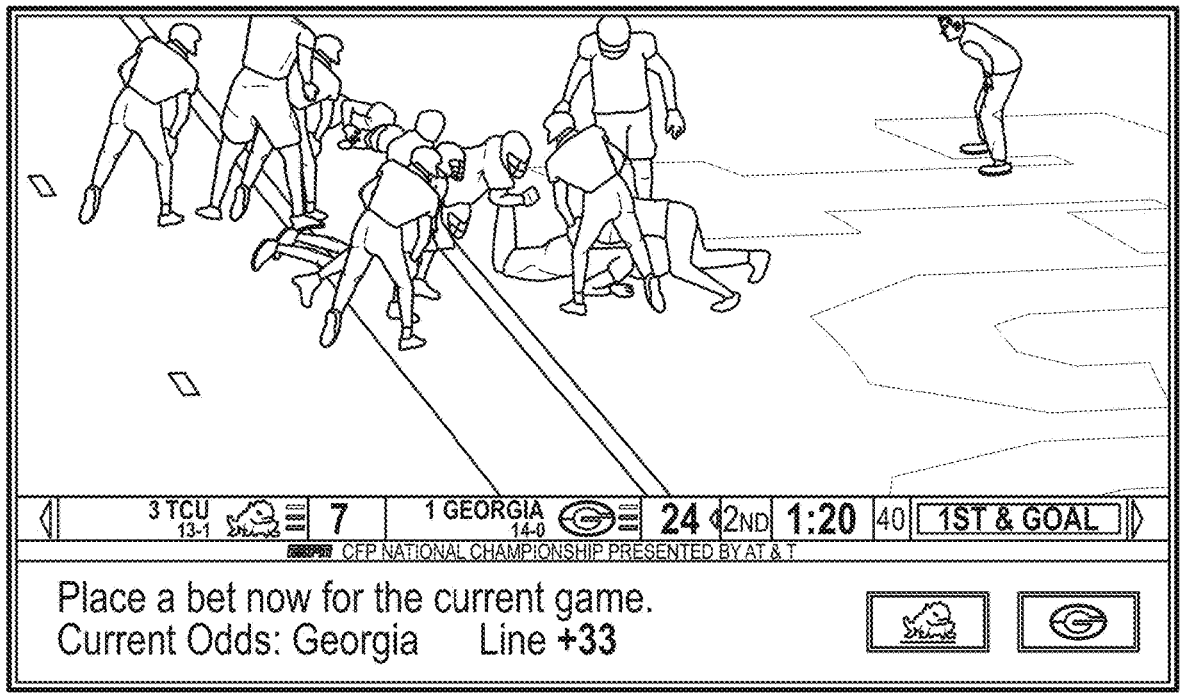
Figure 9E:
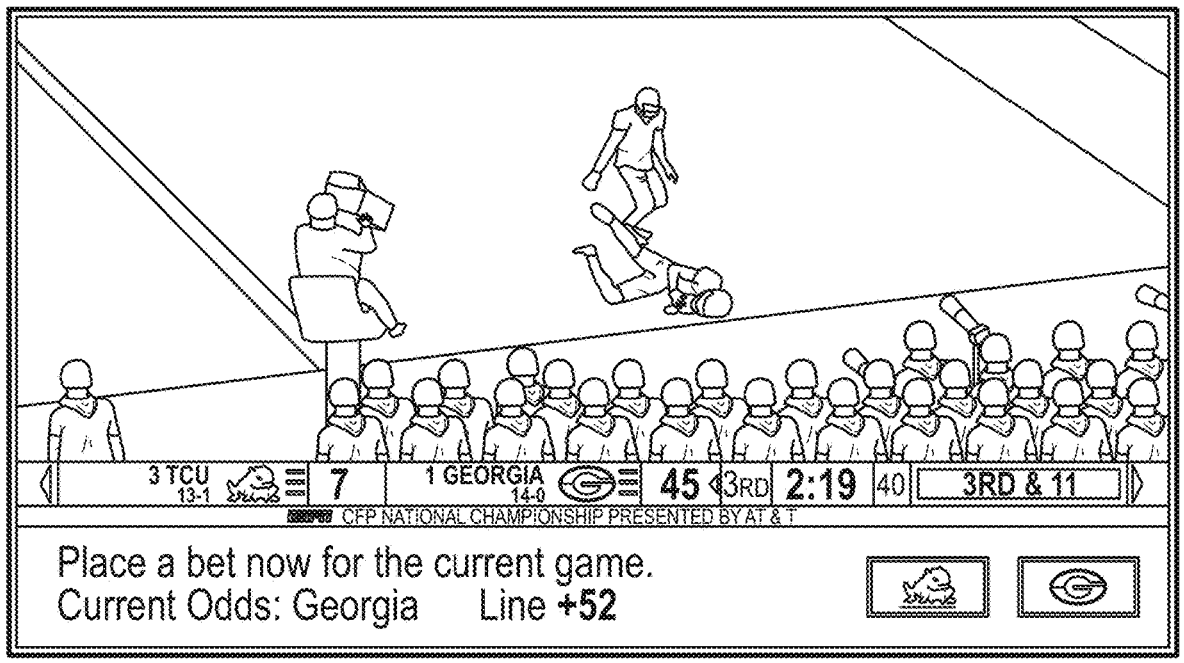

FIGS. 9A-9E show illustrative user interfaces, in accordance with some embodiments of this disclosure. As shown in FIG. 9A, the media application may provide, prior to the start of a game (e.g., the NCAA Football National Championship game between the TCU Horned Frogs and the Georgia Bulldogs) selectable icons for a user to select that either TCU or Georgia will win the game, or that either TCU or Georgia will cover a points spread (e.g., +13). Such options may be provided to the user when he or she is authenticated by the media application. As shown in FIGS. 9B-9F, the media application may provide further opportunities to submit predictions throughout the game. For example, the point spread may be dynamically adjusted as the score fluctuates during (and/or based on the time remaining in) the game, e.g., as Georgia builds a large lead, the point spread increases from +13 to +24, and when TCU makes a small comeback, the point spread may be adjusted back down to +17, and then the point spread may be further increased to +33 and +52 as Georgia builds a very large lead over TCU and the remaining time in the game is decreasing. In some embodiments, the user may be authenticated at the beginning of the game, and may be permitted to select predictions throughout the remainder of the game without having to be re-authenticated. On the other hand, if the channel is changed (e.g., for longer than a threshold period of time), permission may be revoked, and if the user tunes back to the live program, reauthentication of the user may be performed prior to providing interactive content related to the live program. Alternatively, the user may be reauthenticated prior to each prediction submission. Such policy may be controlled by, e.g., a third-party plugin API associated with the interactive content provider. In some embodiments, the point spread setting may taken into account that a score is so lopsided that a coach of the winning team is likely to substitute in backup players and/or stop running up the score, and/or it may take into account other circumstances in the game.

Figure 10:
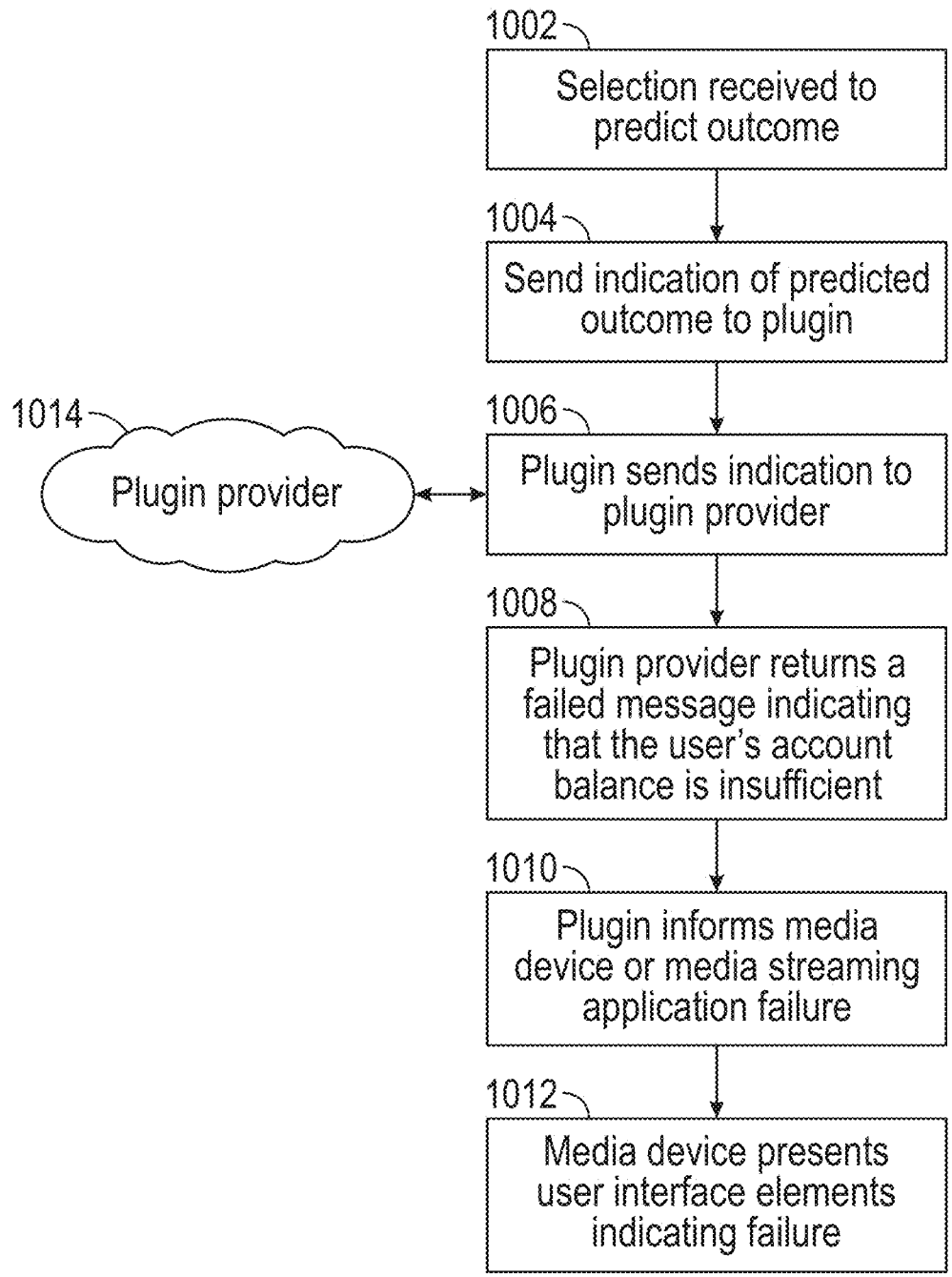
FIG. 10 is a flowchart of an illustrative process for notifying a user that a selection of a predicted outcome has failed to be processed, in accordance with some embodiments of this disclosure.

FIG. 10 is a flowchart of an illustrative process 1000 for notifying a user that a selection of a predicted outcome has failed to be processed, in accordance with some embodiments of this disclosure. In various embodiments, the individual steps of process 600 may be implemented by one or more components of the devices, systems and methods of FIGS. 1-22 and may be performed in combination with any of the other processes and aspects described herein. Although the present disclosure may describe certain steps of process 1000 (and of other processes described herein) as being implemented by certain components of the devices, systems and methods of FIGS. 1-22, this is for purposes of illustration only. It should be understood that other components of the devices, systems and methods of FIGS. 1-22 may implement those steps instead.

At 1002, control circuitry (e.g., control circuitry 404 of FIG. 4 and/or control circuitry 511 of FIG. 5), and/or I/O circuitry 402 or 512 of FIGS. 4-5, may receive selection of a predicted outcome in association with a media asset (e.g., media asset 100 of FIGS. 1A-1B). At 1004, the control circuitry may send an indication of the selection at 1002 to a plugin (e.g., plugin 226 of FIG. 2), and the plugin may provide such indication to interactive content provider server 230 of FIG. 2. Based on receiving the selected predicted outcomes, the control circuitry may query plugin provider 1014 (e.g., plugin provider service 234 of FIG. 2) or other account balance provider to determine if the user has an account balance capable of covering an amount of virtual credits associated with the predicted outcome. At 1008, the control circuitry may return a failed message indicating that the user's account balance is insufficient for selecting the predicted outcome, and at 1010 and 1012 may provide a notification indicating the same to the user. For example, a previously selected predicted outcome may have been associated with a virtual credit that lowered the user's account balance such that the current predicted outcome may not be able to be associated with a requested amount of virtual credits.

In some embodiments, the control circuitry may determine the user's account balance and adjust a user interface to account for a lack of funds, to inform the user and to enable or disable elements which may or may not be appropriate to display based on a user's account (balance, loss limit, etc.). In some embodiments, the virtual credits associated with predicted outcomes may be handled, managed and executed by the plugin provider, including collecting and distributing virtual credits before, during and/or after the conclusion of the event (e.g., from an account associated with the user profile, such as, for example, an Amazon Pay account or a "Cash" account such as, for example, Apple Cash).

Figure 11:
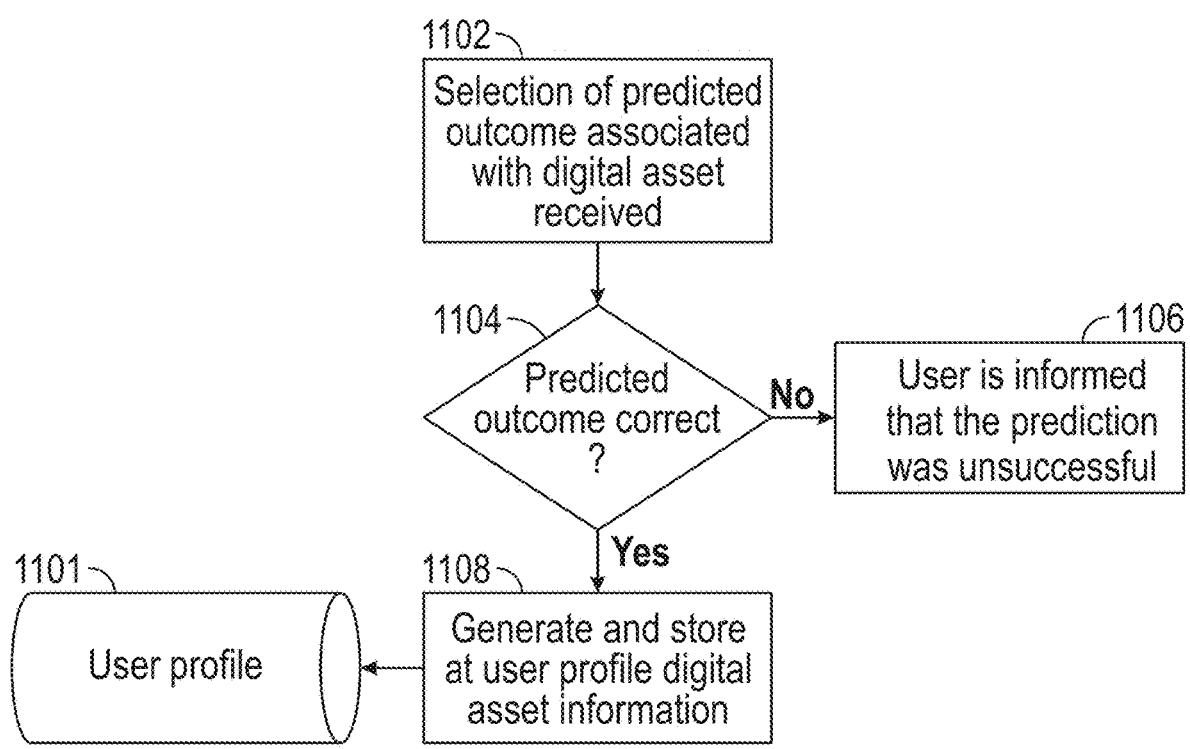
FIG. 11 is a flowchart of an illustrative process for storing digital assets, in accordance with some embodiments of this disclosure.

FIG. 11 is a flowchart of an illustrative process 1100 for storing digital assets, in accordance with some embodiments of this disclosure. In various embodiments, the individual steps of process 600 may be implemented by one or more components of the devices, systems and methods of FIGS. 1-22 and may be performed in combination with any of the other processes and aspects described herein. Although the present disclosure may describe certain steps of process 1000 (and of other processes described herein) as being implemented by certain components of the devices, systems and methods of FIGS. 1-22, this is for purposes of illustration only. It should be understood that other components of the devices, systems and methods of FIGS. 1-22 may implement those steps instead.

At 1102, control circuitry (e.g., control circuitry 404 of FIG. 4 and/or control circuitry 511 of FIG. 5), and/or I/O circuitry 402 or 512 of FIGS. 4-5, may receive a prediction of a selected outcome (e.g., whether Green Bay Packers kicker Mason Crosby in the example of FIGS. 1A-1B will make an upcoming field goal attempt). Such prediction may be associated with a digital asset (e.g., as points, levels, badges or other digital assets) that may be stored within a user profile 1101 and presented when the viewer watches related content. For example, if a user simply wishes to "play along," the user may earn points when he or she predicts the correct outcome, and the system may alter the interactive content to remove references to account balance amounts.

At 1104, the control circuitry may determine whether the selected predicted outcome was correct. For example, a user's selection that a field goal attempt will be successful may be compared against a result of the field goal (e.g., obtained from sports data feeds 238 and/or based on analyzing video and/or audio content and/or metadata of the media asset depicting the field goal attempt). If the user's prediction is correct, processing may proceed to 1106, where a notification may be provided indicating that the user's prediction was unsuccessful. Otherwise, processing may proceed to 1108.

At 1108, the control circuitry may generate, and store at user profile 1101 (e.g., a user profile of user 101 of FIGS. 1A-1B) digital asset information (e.g., points, credits, level information, URL for digital asset, or any other suitable data, or any combination thereof) for future use by the user in association with the user's profile. For example, such digital assets may be used in association with future predictions by the user, to access bonus or supplemental content, to enable viewing content without advertisements, and/or to obtain another suitable prize, badge or reward.

Figure 12A:
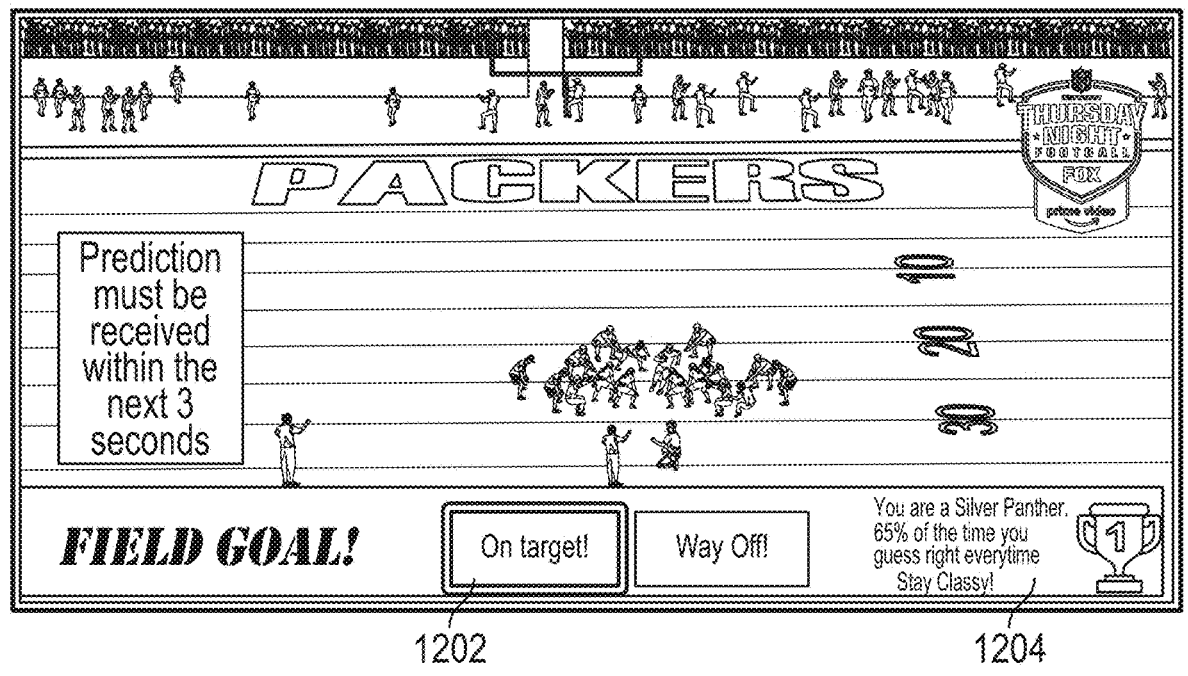
FIGS. 12A-12B show illustrative user interfaces, in accordance with some embodiments of this disclosure.
Figure 12B:
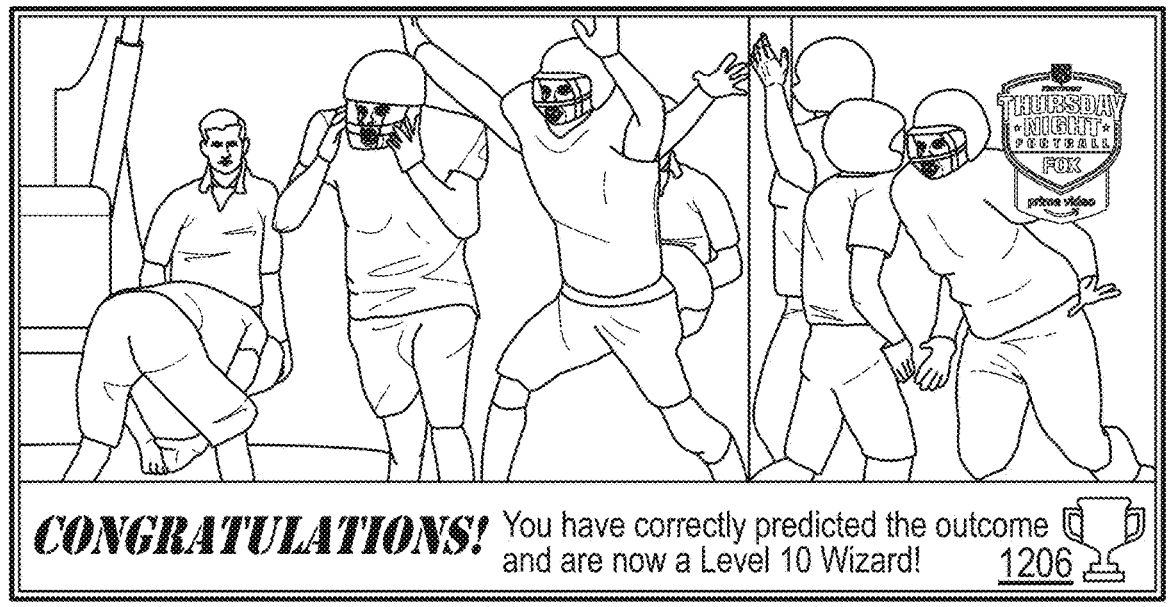

For example, as shown in FIGS. 12A-12B, a user may submit a prediction 1202 indicating that he or she believes that the upcoming field goal attempt by Green Bay Packers kicker Mason Crosby will be successful. As shown at 1204, a user's current level or rank may be a "Silver Panther" indicating that he or she is 65% accurate on his or her predictions. As shown at 1206, the media application may provide notification 1206, based on the user's prediction being correct, indicating that the user has been elevated to level 10 ("a Wizard") based on this successful prediction, and has been awarded a virtual trophy.

In some embodiments, the media application may trigger certain interactive user interface elements (e.g., actionable buttons, banners and icons) indicating active prediction opportunities ("select a predicted outcome now") and/or interactive user interface elements (e.g., graphical display of event statistics, historical statistics related to the event or statistics related to the user or user profile, such as, for example, the user's current winnings or losses amount, user profile points, badges, and/or other data or elements). The media application may present this trigger based on timings provided by a content provider (e.g., FOX). For example, a football game may be scheduled to start at a given time Jan. 1, 2024 12:00 PM but may actually start at 12:03 PM), and triggering information from the media application may arrive in real time (e.g., from the provider to the plugin). In some embodiments, the triggering information is not based on a playback timecode for user content, which may result (e.g., in situations where a content playback has buffered or has been paused or rewound by the user) in the media application determining that a particular prediction opportunity is inactive. For example, if a user tunes to or chooses to stream a live game, there may be opportunities presented by the media application that are active during the real time before the game has actually begun.

During this time, the media application may determine that an opportunity is available for predicting an outcome and may present the user with the option to "make a prediction" or "make a prediction now" (one-click predictions). In some embodiments, if a user is viewing the content in a buffered state or if the user has paused, rewound, fast-forwarded or is re-watching the content, and the prediction opportunity has passed, the media application may refrain from showing the actionable user interface elements. However, if the user did make a prediction during the opportunity for predicting an outcome, metadata associated with the live event, media asset and/or interactive content may cause the media application to display historical information related to the prediction at the time when the prediction opportunity occurred. For example if the prediction opportunity occurred during the event (e.g., predictions regarding whether a field goal attempt in a football game will be successful), then, upon rewind, fast-forward or re-watching the content, the media application can provide an on-screen indication (e.g., "You predicted that the penalty kick would be made . . . and it was"). User interface elements may be added or removed from the user experience based on the timing of prediction opportunities.

Figure 13:
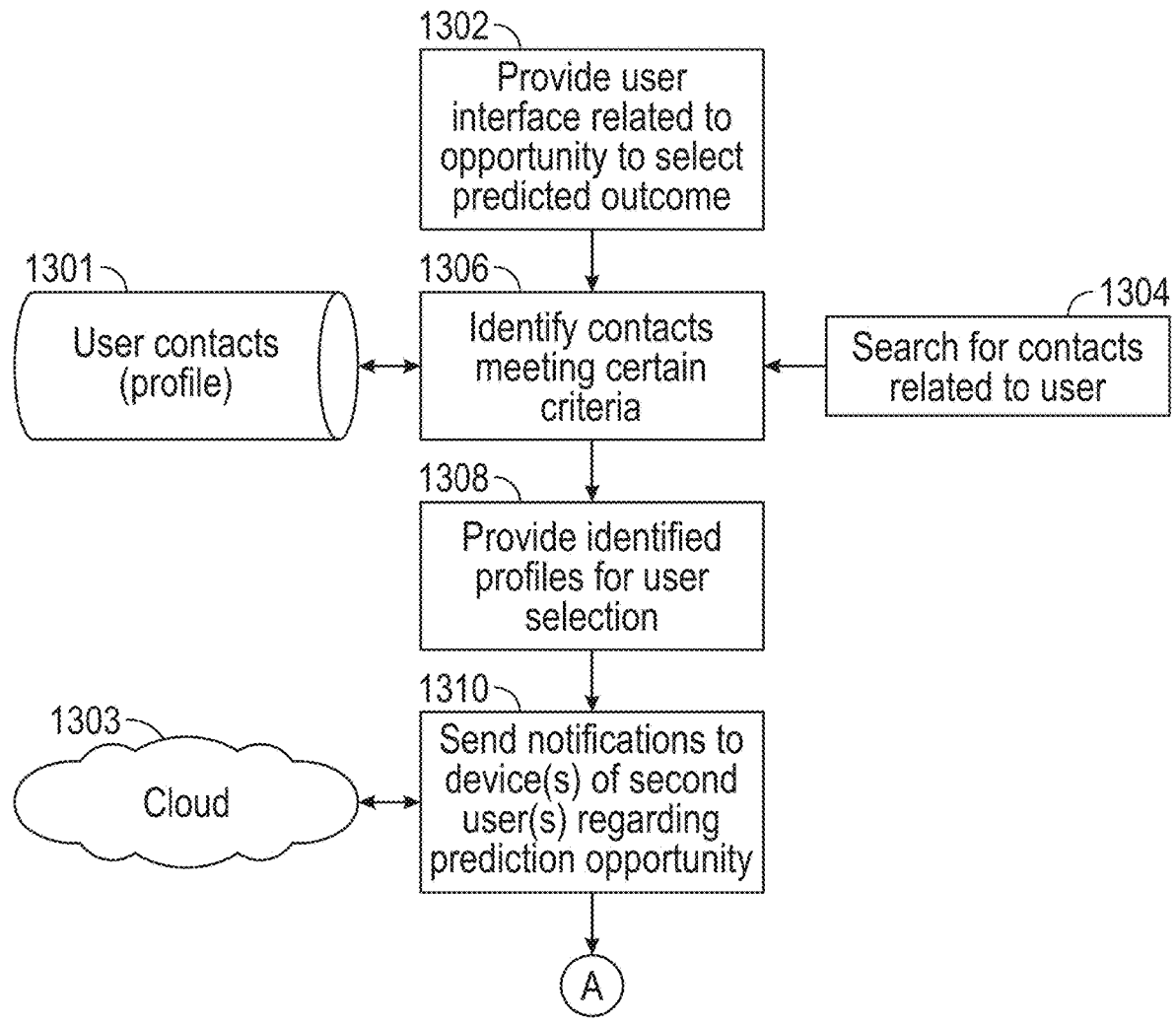
FIG. 13 is a flowchart of an illustrative process for providing for group predictions, in accordance with some embodiments of this disclosure.
Figure 13:
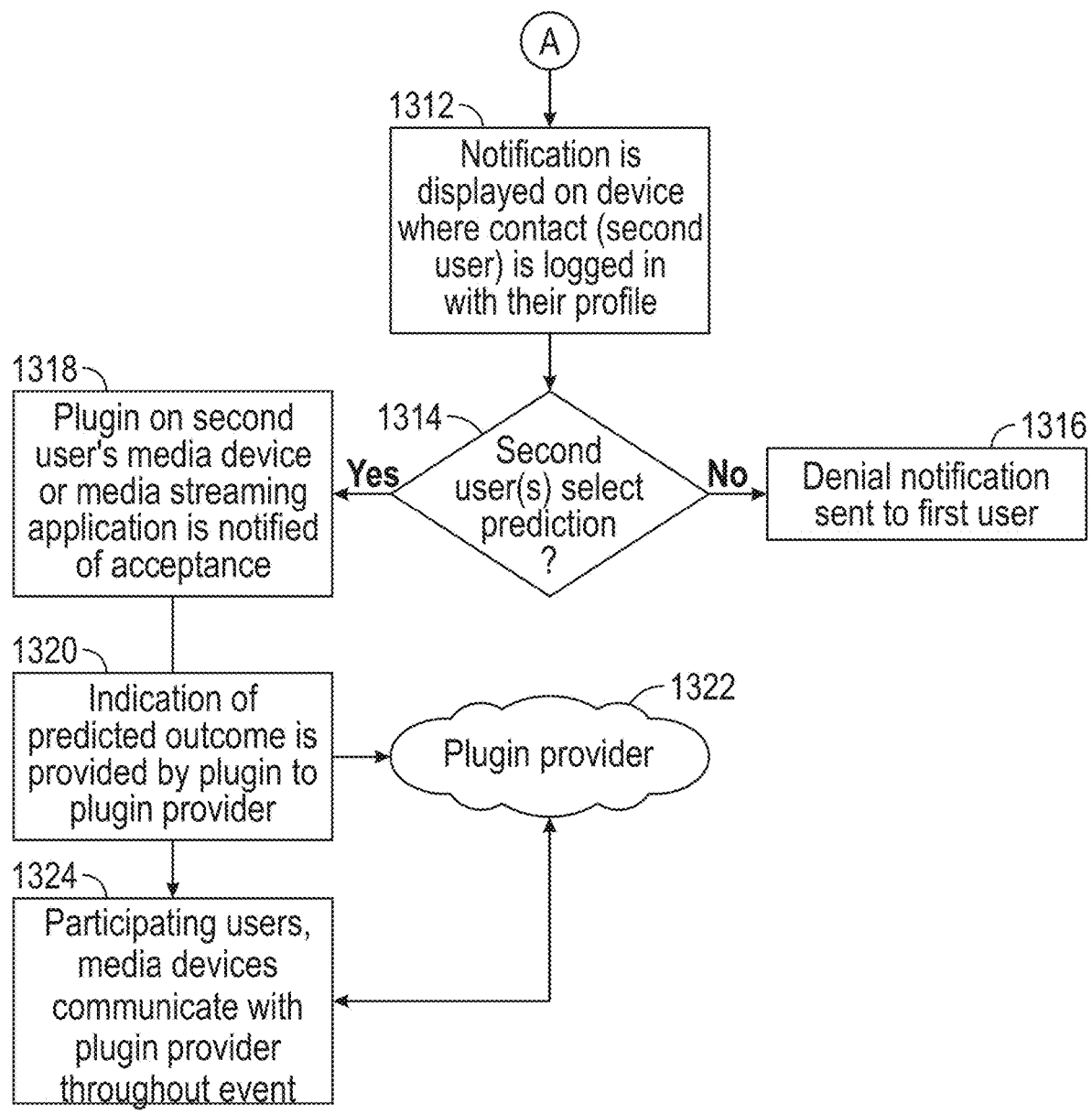

FIG. 13 is a flowchart of an illustrative process 1300 for providing for group predictions, in accordance with some embodiments of this disclosure. In various embodiments, the individual steps of process 1300 may be implemented by one or more components of the devices, systems and methods of FIGS. 1-22 and may be performed in combination with any of the other processes and aspects described herein. Although the present disclosure may describe certain steps of process 1300 (and of other processes described herein) as being implemented by certain components of the devices, systems and methods of FIGS. 1-22, this is for purposes of illustration only. It should be understood that other components of the devices, systems and methods of FIGS. 1-22 may implement those steps instead.

At 1302, control circuitry (e.g., control circuitry 404 of FIG. 4 and/or control circuitry 511 of FIG. 5), and/or I/O circuitry 402 or 512 of FIGS. 4-5, may provide a user interface related to an opportunity to select predicted outcome (e.g., the interface shown at FIGS. 1A-1B).

At 1304, the control circuitry may search for contacts (e.g., stored at user contacts 1301) related to the user (e.g., user 101 of FIGS. 1A-1B) at user contacts datastore 1301. For example, the control circuitry and/or I/O circuitry may receive input from a user specifying one or more other users that he or she wishes to predict an outcome with or against, and/or the control circuitry may identify one or more users that the user has historically predicted outcomes with or against, or otherwise share interests (e.g., in sports and/or football and/or the Green Bay Packers) with the user. At 1306, the control circuitry may identify contacts meeting certain criteria (e.g., historically have predicted outcomes with or against the user or predicted outcomes in similar events or content to the user, users registered with the same interactive content provider as the user, users having an age and location eligible for selecting predicted outcomes, users having elected to be provided with predicted outcomes, and/or any other suitable criteria). At 1308, the control circuitry and/or I/O circuitry may provide contacts for user selection (e.g., icons 344, 346, 348, 350, 352 and 354 of FIG. 3J).

In another embodiment, a user may select a peer-to-peer prediction directly with another user from within their known user contacts (e.g., other users in the user's contacts registered with the interactive content provider), and such prediction may adhere to any settings or limitations provided by the plugin (e.g., the timeline for selecting a prediction).

At 1310, the control circuitry (e.g., of cloud 1303, which may correspond to server 504 of FIG. 5) may transmit one or more notifications to one or more second users (e.g., selected at 1308) requesting such users to predict an outcome with or against the user (e.g., user 101 of FIGS. 1A-1B). In some embodiments, such notifications may comprise information for the live event (e.g., Green Bay Packers vs. Las Vegas Raiders NFL game), a predicted outcome of user 101, a type of the prediction, virtual credits (if any) associated with the prediction, media content information, odds, or other information, or any suitable combination thereof. In some embodiments, cloud 1303 may correspond to a cloud user management or contract system (e.g., iCloud). In some embodiments, 1310 may comprise sending a notification to computing device(s) of second user(s) inviting such user(s) to join a prediction pool or prediction group.

At 1312, the notification generated and transmitted at 1310 may be provided for display on device(s) of the one or more second user(s), where such user(s) may be logged into their respective profiles. For example, the notification may indicate that "User 101 thinks Mason Crosby will make this field goal. Do you agree?" or "User 101 is predicting the Green Bay Packers to win this game against the Las Vegas Raiders. He is challenging you because he knows you are a Raiders fan. What is your prediction?".

At 1314, the control circuitry may determine whether such one or more second user(s) selected a prediction, e.g., opposing or matching the prediction of user 101. In some embodiments, 1310 may comprise determining whether the second user(s) have accepted an invitation to join a prediction pool or prediction group. If the second user does not wish to select a prediction (or does not wish to joint a prediction group or pool) and indicates as such, processing may proceed to 1316, where the first user (e.g., user 101) may be notified of such denial of his or her proposal.

At 1318, the control circuitry may notify (e.g., plugin provider 1322 and/or plugin 226 of FIG. 2) that the second user(s) has selected a predicted outcome (e.g., the same prediction as user 101 or a different prediction) on a proposed prediction having been forwarded by user 101 to the second user. At 1320, the plugin may notify plugin provider 1322 (e.g., server 230 of FIG. 2) of the predicted outcome selected by the second user. At 1324, the control circuitry may communicate with the computing devices of the first and second users during the live event, to provide updates regarding one or more predicted outcomes selected by such users. In some embodiments, based on an affirmative selection at 1314, the control circuitry may create a prediction group, prediction pool or prediction entity, which may enable the first user and the second user(s) to make predictions on outcomes together and/or share in the receipt or distribution of virtual credits based on the outcome. For example, a user profile of a first user (e.g., user 101 of FIGS. 1A-1B) may be permitted to link his or her profile with user profiles of one or more other users to form the group or pool within the media application.

Figure 14:
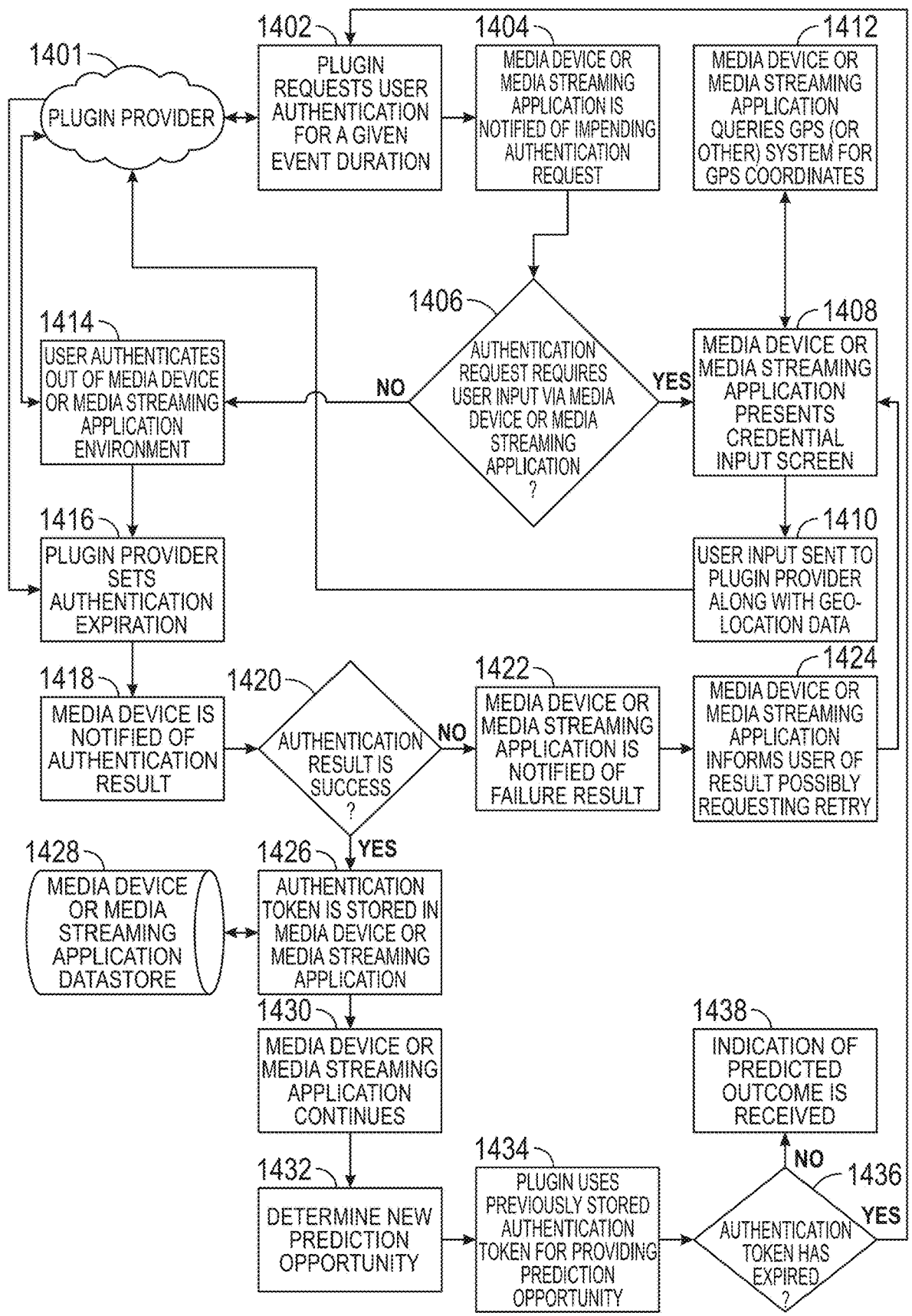
FIG. 14 is a flowchart of an illustrative process for authenticating a user, in accordance with some embodiments of this disclosure.

FIG. 14 is a flowchart of an illustrative process 1400 for authenticating a user, in accordance with some embodiments of this disclosure. In various embodiments, the individual steps of process 1400 may be implemented by one or more components of the devices, systems and methods of FIGS. 1-22 and may be performed in combination with any of the other processes and aspects described herein. Although the present disclosure may describe certain steps of process 1000 (and of other processes described herein) as being implemented by certain components of the devices, systems and methods of FIGS. 1-22, this is for purposes of illustration only. It should be understood that other components of the devices, systems and methods of FIGS. 1-22 may implement those steps instead.

At 1402, control circuitry (e.g., control circuitry 404 of FIG. 4 and/or control circuitry 511 of FIG. 5) may request (e.g., via plugin 226 of FIG. 2 and/or plugin provider 1401 of FIG. 14, which may correspond to service provider server 230 of FIG. 2) user authentication for a given prediction (e.g., selected by user 101 of FIGS. 1A-1B) and/or for a given duration (e.g., the duration of an NFL game that the prediction is associated with).

At 1404, the control circuitry may cause the media application to be notified of the impending authentication request, and at 1406, the control circuitry may determine whether the authentication request requires user input, e.g., via a computing device (e.g., computing device 102 of FIGS. 1A-1B) and/or the media application. If yes, processing may proceed to 1408; otherwise processing may proceed to 1414. At 1408, the control circuitry may cause the media application (e.g., via computing device 102) to present a credential input screen, and upon receiving user input, such user input may be transmitted (at 1410) to plugin provider 1401, e.g., along with geolocation data to verify a location of the user (e.g., user 101 of FIGS. 1A-1B). In some embodiments, at 1412, the control circuitry may query a GPS system (or one or more other positional systems) of the computing device (e.g., computing device 102 of FIG. 1A-1B), or access via API with the media application, regarding coordinates of a location of the computing device.

For example, a particular geographic location or jurisdiction in which user 101 is located may have certain legal requirements regarding whether predicted outcomes being associated with virtual credits are permitted at all, and/or a required minimum age in order to participate. In some embodiments, the control circuitry may utilize the geolocation of each of computing device 102 (e.g., IP geolocation mapping) and a third-party authentication (e.g., with geo-location enabled) to enable or disable the plugin(s) where applicable based on the determined location, e.g., comparing the determined location to a list of locations where selection of predicted outcomes might be permitted or restricted. In some embodiments, multi-factor authentication may be utilized, e.g., via text message, email, or biometric input) when authenticating the user profile. In some embodiments, an age of the user may be verified based on sensors and/or biometric input, e.g., captured images, facial recognition, or using any other suitable technique, or any combination thereof. In some embodiments, an age of the user may be verified based on receiving payment methods (e.g., credit card information of the user), and/or by providing an option (e.g., on a mobile device) to approve a prediction submitted via a different device (e.g., computing device 102 of FIGS. 1A-1B).

At 1414, the control circuitry may enable the user to further authenticate outside of the media application environment, e.g., double-factor authentication via SMS text, email, telephone call, application code entry and/or any other suitable technique. In some embodiments, such double-factor authentication may be input to the media application using, for example, a remote control, or via a user's smartphone device. In some embodiments, such entered authentication may be passed to the plugin (e.g., plugin 226 of FIG. 2 and/or plugin provider 1401 of FIG. 14, which may correspond to service provider server 230 of FIG. 2) for approval.

At 1416, the control circuitry may enable plugin provider 1401 to set an expiration for the authentication (and/or user preferences and/or content provider settings may specify such duration). For example, once authenticated, the user's authentication may persist for any suitable period of time, e.g., for a particular amount of minutes or hours, for the duration of the live event (e.g., the NFL game shown in FIGS. 1A-1B), for the duration of the session (e.g., until the user exits his or her profile accessing the content provider's media asset 100, for all NFL games, or based on any other suitable criterion, or any combination thereof). For example, a token may be associated with the user's session, and the token may be associated with an expiration time period. In some embodiments, the duration for which the authentication is to persist may be specified by the user as a user preference and/or may be set by the content provider and/or interactive content provider. For example, the interactive content provider may require re-authentication if a channel is changed (or the user's accessing of the media asset is otherwise ceased) or each time a predicted outcome is selected, and this may be a policy of the interactive content provider to be enforced by the content provider. In some embodiments, authentication may be denied or revoked based on a current location of a user.

At 1418, the control circuitry may cause a notification of the authentication result to be provided to the user (e.g., via computing device 102 of FIGS. 1A-1B). At 1420, if the control circuitry determines that the authentication was successful, processing may proceed to 1426; otherwise processing may proceed to 1422. At 1422, the user (e.g., user 101 of FIGS. 1A-1B) may be notified of the authentication failure (e.g., via computing device 102 of FIGS. 1A-1B), and at 1424 the user may be prompted to retry the authentication.

At 1426, the control circuitry may receive an authentication token and store such token at a media application datastore 1428, e.g., at storage 408 of FIG. 4 and/or storage 514 of FIG. 5. For example, a content provider may generate the token, and share such token with an interactive content provider, to verify a zip code of a user, and the plugin may be enabled if the zip code indicates that the user is in a permitted location.

At 1430, the control circuitry may continue providing the media asset (e.g., media asset 100 of FIGS. 1A-1B), and at 1432, may determine a new prediction opportunity associated with the media asset. At 1434, the previously stored authentication token (at 1426) may be used to provide an interface at which the user may select a predicted outcome for one or more portions of the media asset. At 1436, the control circuitry may determine whether the authentication token has expired; if so, processing may return to 1402 to authenticate the user. Otherwise, at 1438, the predicted outcome selected by the user may be received (e.g., by the plugin provider) and processed.

Figure 15:
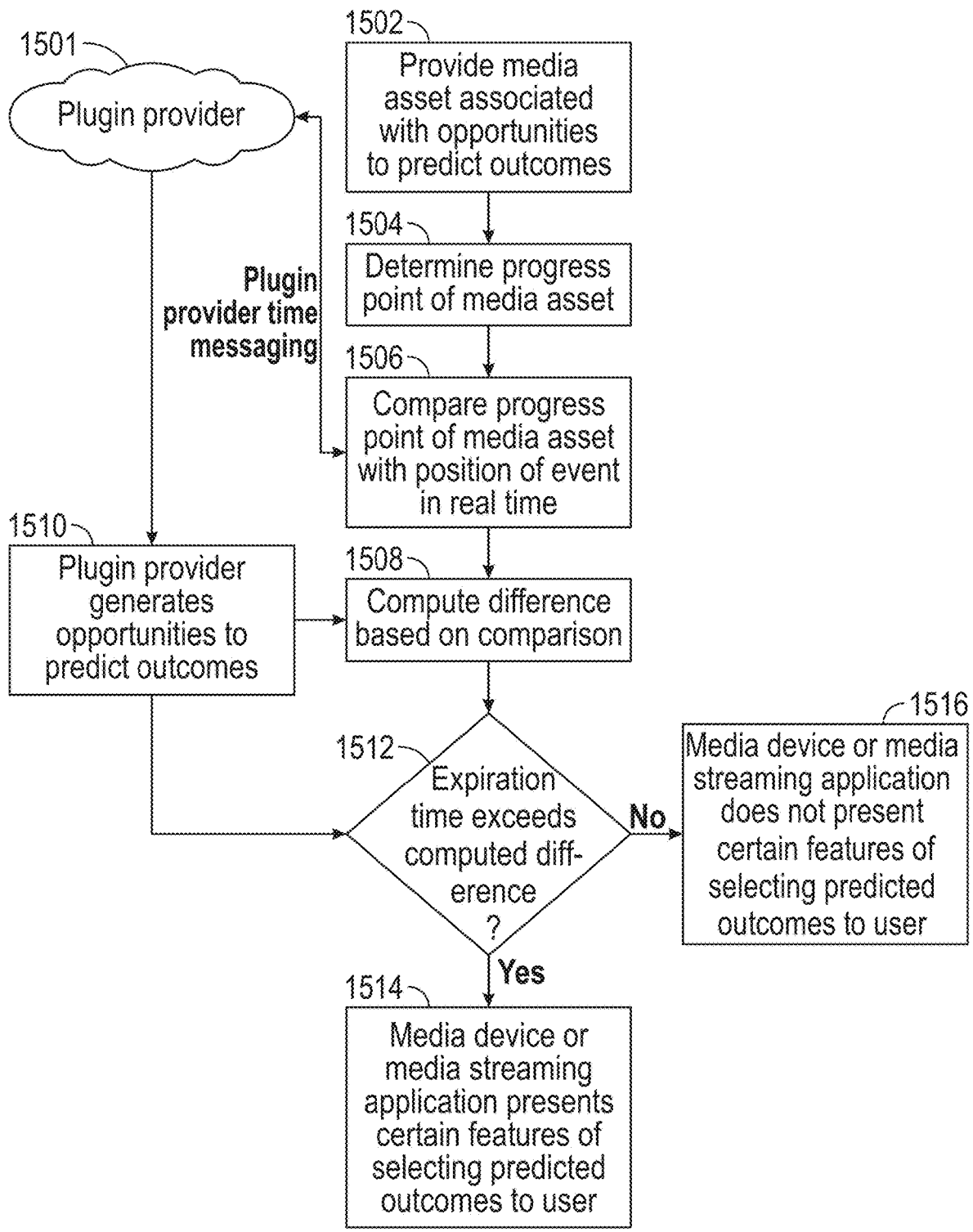
FIG. 15 is a flowchart of an illustrative process for providing opportunities to predict outcomes of one or more portions of a live program based on network conditions, in accordance with some embodiments of this disclosure.

FIG. 15 is a flowchart of an illustrative process for providing opportunities to predict outcomes of one or more portions of a live program based on network conditions, in accordance with some embodiments of this disclosure. In various embodiments, the individual steps of process 1500 may be implemented by one or more components of the devices, systems and methods of FIGS. 1-22 and may be performed in combination with any of the other processes and aspects described herein. Although the present disclosure may describe certain steps of process 1000 (and of other processes described herein) as being implemented by certain components of the devices, systems and methods of FIGS. 1-22, this is for purposes of illustration only. It should be understood that other components of the devices, systems and methods of FIGS. 1-22 may implement those steps instead.

At 1502, control circuitry (e.g., control circuitry 404 of FIG. 4 and/or control circuitry 511 of FIG. 5) and/or I/O circuitry 402 or 512 of FIGS. 4-5, may provide a media asset (e.g., media asset 100 of FIGS. 1A-1B) associated with opportunities to predict outcomes. For example, the control circuitry may generate, for presentation at a particular computing device (e.g., computing device 102 of FIGS. 1A-1B), a display of a live program (e.g., an NFL game) which may be delayed relative to a live program stream of the live program and/or relative to a real time position in the underlying live event (e.g., the NFL game).

At 1504, the control circuitry may determine a current progress of the media asset, e.g., based on a current timestamp of the live program being presented to the user (e.g., user 101 of FIGS. 1A-1B). At 1506, the control circuitry may compare the user's progress point determined at 1504 to a position of the live program stream of the live program and/or to a position of the underlying live event (e.g., the NFL game) in real time (e.g., based on an indication from plugin provider 1501 and/or sports data feeds 238 of FIG. 2). At 1508, the control circuitry may compute a difference between the user's progress point determined at 1504 to a position of the live program in the live program stream and/or the position of the live event real time, based on the comparison at 1506. At 1510, the control circuitry may generate opportunities to select predicted outcomes for transmission and display at computing devices (e.g., computing device 102 of FIGS. 1A-1B). For example, the control circuitry may generate for display interactive content 103 and/or 106 of FIGS. 1A-1B, using one or more of the techniques described herein. In some embodiments, at 1510, the control circuitry may associate virtual credits (e.g., micro-amounts or standard amounts) and/or an expiration time and/or other parameters with such predicted outcome opportunities.

At 1512, the control circuitry may account for a situation in which the user's network conditions are inadequate (e.g., too slow) for certain features of selecting predicted outcomes (e.g., associating micro-amounts with a prediction), such as, for example, if the user has started to view live (streamed) content, but the device is buffering longer than a permitted timeline, and/or the user began to watch the media asset later than the actual event start time. For example, the control circuitry may compare the expiration time for predicting the outcome with the time offset or difference computed at 1508 (and/or with a sum of the difference computed at 1508 and an N time value). If an amount of time remaining before the expiration time exceeds difference or offset computed at 1508, certain features of selecting predicted outcomes (e.g., associating micro-amounts with a prediction) may be associated with the opportunity to predict an outcome in the live event; otherwise, such features may not be provided presently and/or later in the media asset (at 1516).

Figure 16:
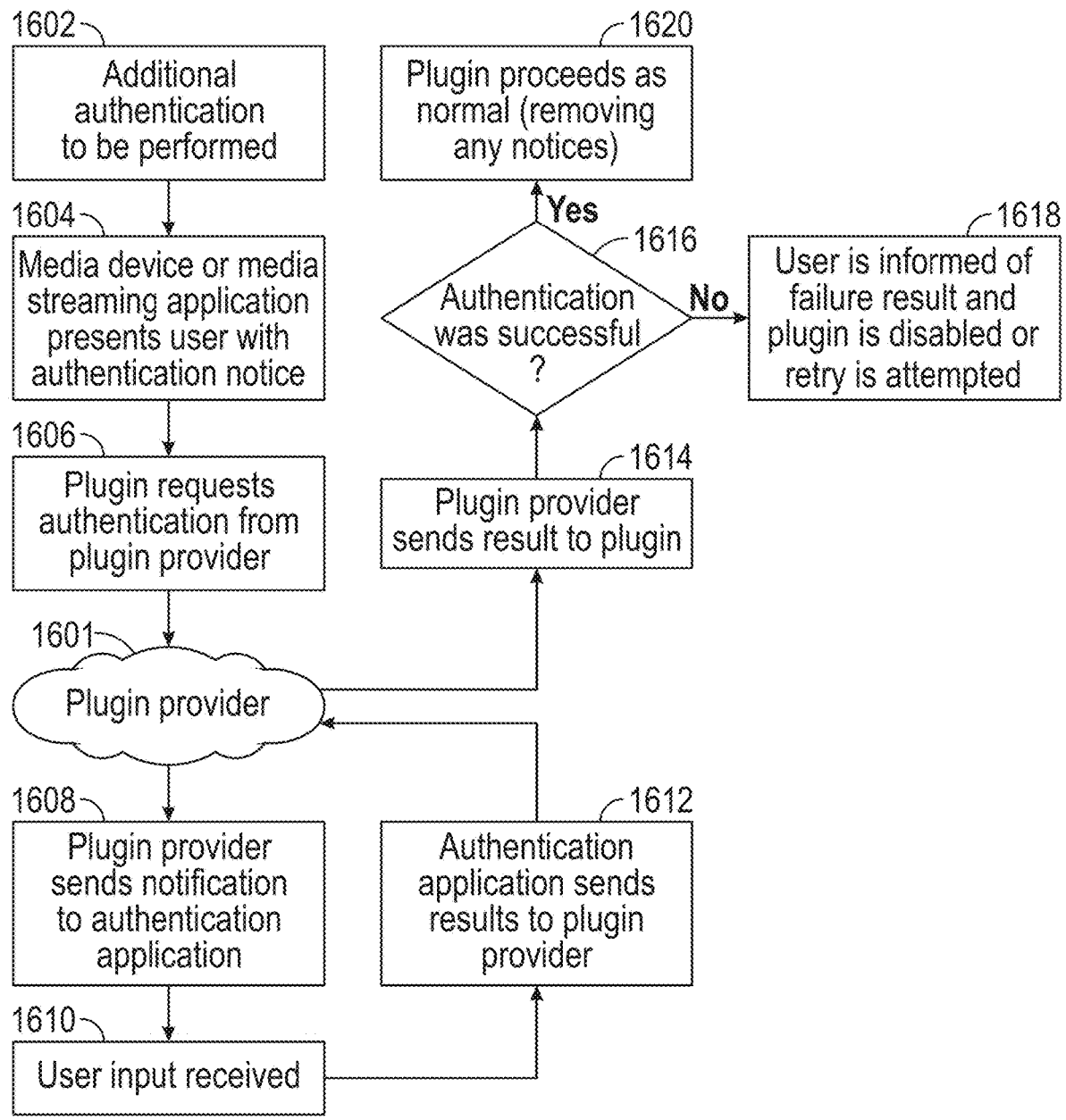
FIG. 16 is a flowchart of an illustrative process for authenticating a user, in accordance with some embodiments of this disclosure.

FIG. 16 is a flowchart of an illustrative process for authenticating a user, in accordance with some embodiments of this disclosure. In various embodiments, the individual steps of process 1600 may be implemented by one or more components of the devices, systems and methods of FIGS. 1-22 and may be performed in combination with any of the other processes and aspects described herein. Although the present disclosure may describe certain steps of process 1000 (and of other processes described herein) as being implemented by certain components of the devices, systems and methods of FIGS. 1-22, this is for purposes of illustration only. It should be understood that other components of the devices, systems and methods of FIGS. 1-22 may implement those steps instead.

At 1602, control circuitry (e.g., control circuitry 404 of FIG. 4 and/or control circuitry 511 of FIG. 5) may determine that an additional authentication (e.g., a third-party authentication and/or on an external device, such as, for example, to verify the location and/or age of the user) is to be performed prior to permitting selection of one or more predicted outcomes in association with a media asset depicting a live event or other content.

Figure 17A:
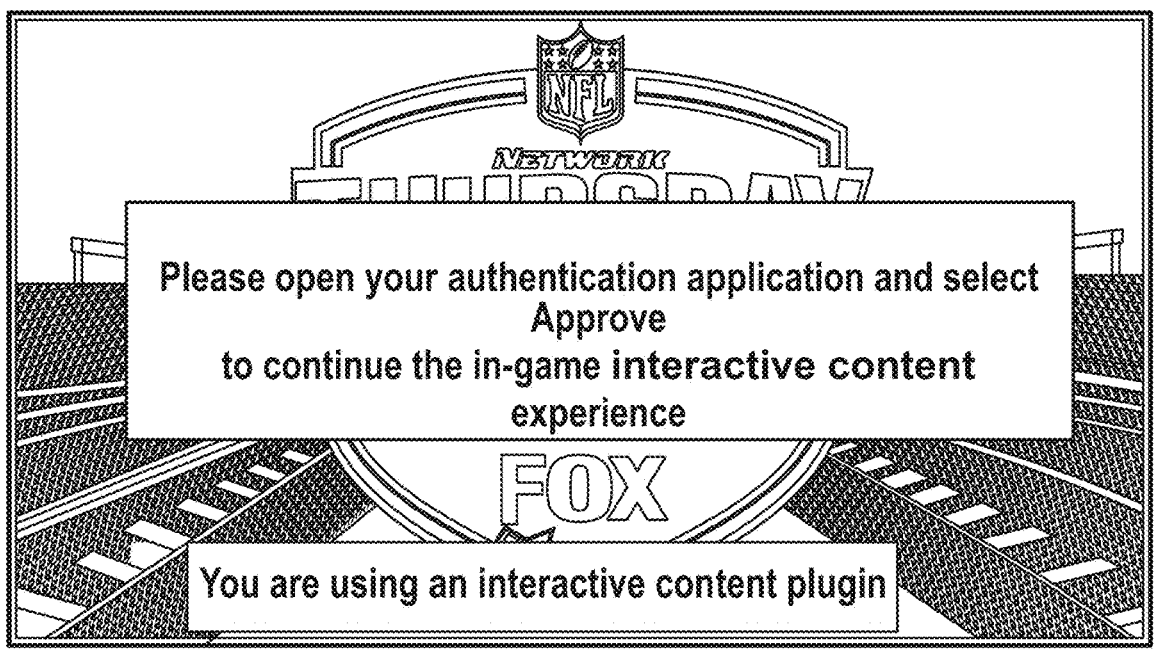
FIGS. 17A-17B show illustrative interfaces, in accordance with some embodiments of this disclosure.
Figure 17B:

At 1604, the control circuitry may present (e.g., via a media application) the user with an authentication notice, and at 1606, the control circuitry may request (e.g., via plugin 226 of FIG. 2) authentication (e.g., from plugin provider 1601 which may correspond to plugin provider service 234 of FIG. 2). At 1608, the plugin provider may send a notification to the authentication application (e.g., a third-party authentication such as, for example, Google's Authenticator), as shown in FIGS. 17A-17B. At 1610, user input may be received, e.g., entering or specifying a number or specifying a portion of an image). As another example, the plugin provider may have an application which may reside on the user's mobile device and/or computing device (e.g., computing device 102 of FIGS. 1A-1B) and may prompt the user for input. At 1612, the control circuitry transmits the authentication result (based on the user input) to plugin provider 1601.

At 1614, the control circuitry may cause plugin provider 1601 to transmit the authentication results to the plugin (e.g., plugin 226 of FIG. 2), and upon determining at 1616 that authentication is successful, processing may proceed to 1620; otherwise processing may proceed to 1618. At 1618, the user is informed of the failure via his or her computing device, and the plugin is disabled or re-authentication is attempted. At 1620, the control circuitry may cause the plugin to proceed, e.g., to present opportunities for selecting predicted outcomes.

Figure 18:
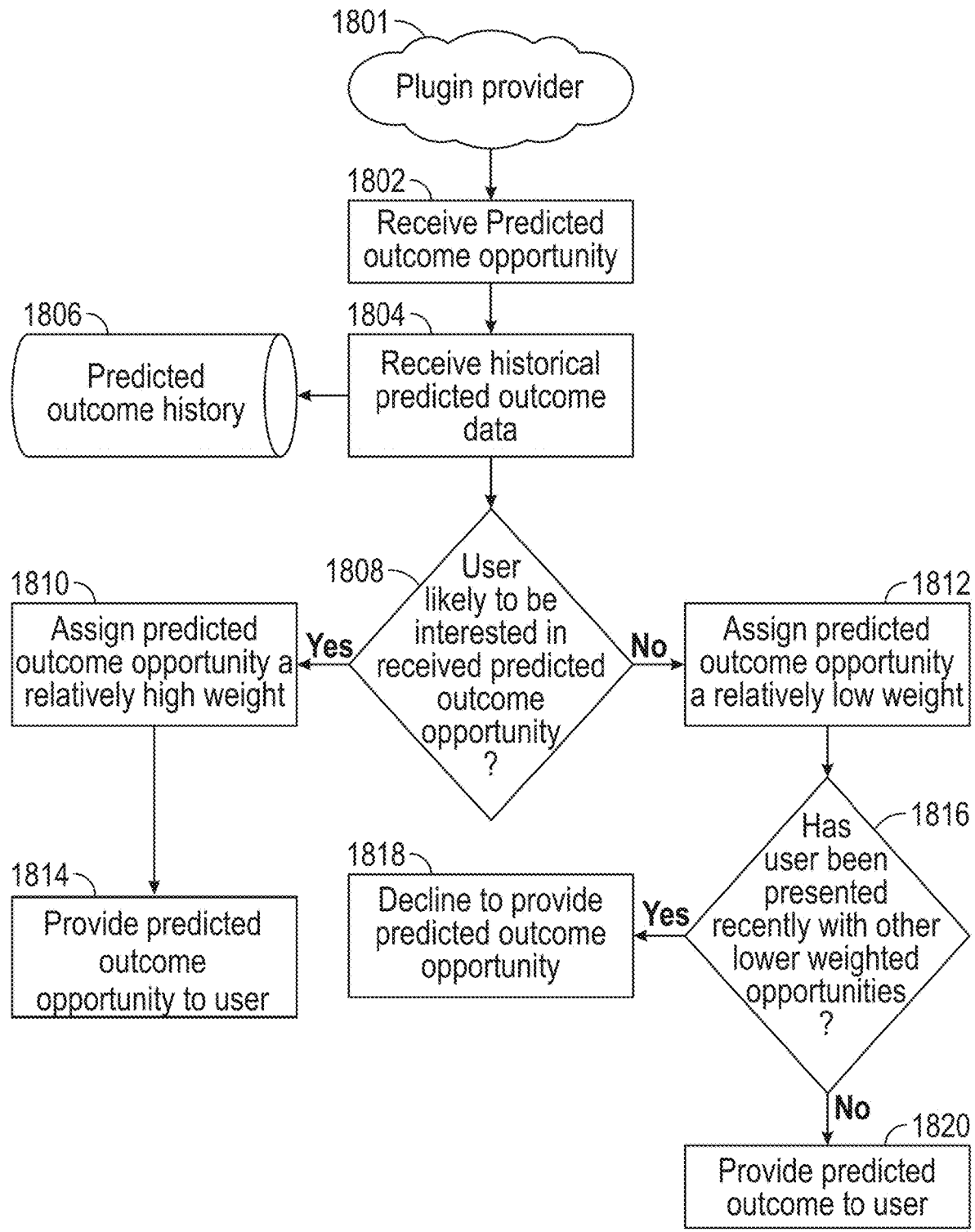
FIG. 18 is a flowchart of an illustrative process for determining whether to provide a prediction opportunity to a user, in accordance with some embodiments of this disclosure.

FIG. 18 is a flowchart of an illustrative process 1800 for determining whether to provide a prediction opportunity to a user, in accordance with some embodiments of this disclosure. In various embodiments, the individual steps of process 1800 may be implemented by one or more components of the devices, systems and methods of FIGS. 1-22 and may be performed in combination with any of the other processes and aspects described herein. Although the present disclosure may describe certain steps of process 1800 (and of other processes described herein) as being implemented by certain components of the devices, systems and methods of FIGS. 1-22, this is for purposes of illustration only. It should be understood that other components of the devices, systems and methods of FIGS. 1-22 may implement those steps instead.

At 1802, control circuitry (e.g., control circuitry 404 of FIG. 4 and/or control circuitry 511 of FIG. 5) and/or I/O circuitry 402 or 512 of FIGS. 4-5, may receive a predicted outcome opportunity, e.g., by plugin 226 of FIG. 2 from plugin provider service 234.

At 1804, the control circuitry may query the user's predicted outcome history datastore 1806 (e.g., at storage 408 of FIG. 4 and/or storage 514 of FIG. 5) and receive a user's historical data of outcomes predicted by the user (e.g., user 101 of FIGS. 1A-1B) in relation to media assets of one or more live events and/or other content. Based on such historical data (e.g., types of events predictions were selected for, virtual credits associated with predictions, time of day or time of year of predictions, whether predictions were accurate and/or any other suitable data) the control circuitry may compute a weight to be assigned to the predicted outcome opportunity received at 1802.

At 1808, the control circuitry may determine, by comparing the attributes of the received opportunity (at 1802) with the attributes indicated in the user's historical predictions (received from datastore 1806), whether the user is likely to be interested in selecting a prediction in the received prediction opportunity. If so, processing may proceed to 1810, and the currently prediction opportunity may be assigned a relatively high weight; otherwise, processing may proceed to 1812, and the prediction opportunity may be assigned a relatively low weight.

At 1814, the control circuitry may provide the predicted outcome opportunity to the user, based on the determination, at 1808 and 1810 that such predicted outcome opportunity has a relatively high weight and is likely to be of interest to the user at 1808. In some embodiments, the control circuitry (e.g., via plugin 226 of FIG. 2) may use the historical prediction data of the user (e.g., a type of event the prediction is selected for, a median amount of virtual credits associated with a prediction, and/or and other suitable data) to calculate a weight to assign to incoming prediction opportunities, to increase or decrease the display of prediction opportunities to provide a more focused and or less "noisy" experience. In some embodiments, such assigning of weights may be controlled with a user setting (e.g., to always show all prediction opportunities or prediction opportunities based on a "learning" mode). In such "learning" mode, the control circuitry may suggest an adjustment of the default virtual credit amounts associated with a prediction, e.g., based on a median amount of virtual credits for a given type (e.g., micro-amount or standard amount of virtual credits being associated with the prediction).

At 1816, the control circuitry may decline to present the opportunity to the user. In some embodiments, at 1816, the control circuitry may determine whether the user has recently been presented with other relatively lower prediction opportunities; if so, processing may proceed to 1818 where the present opportunity is ignored; otherwise, the user may be presented with the predicted opportunity at 1820. In some embodiments, if a friend of a user is determined to have selected a predicted outcome for a particular event or portion thereof, the user may be notified of the opportunity to also select a predicted outcome of the same event or portion thereof, regardless of a weight assigned to the predicted outcome opportunity.

In some embodiments, the control circuitry may use a user's historical data to increase or decrease a number of times a user is shown predicted outcome opportunities. In some embodiments, the user may be provided with an interactive selectable option to "silence" predicted outcome opportunities, to prevent such opportunities from being presented for a certain period of time, or during a particular event, or until further input is received. For example, a user may choose to only allow predicted outcome opportunities to be presented after 5:00 PM during the week and not on Sundays.

Figure 19:
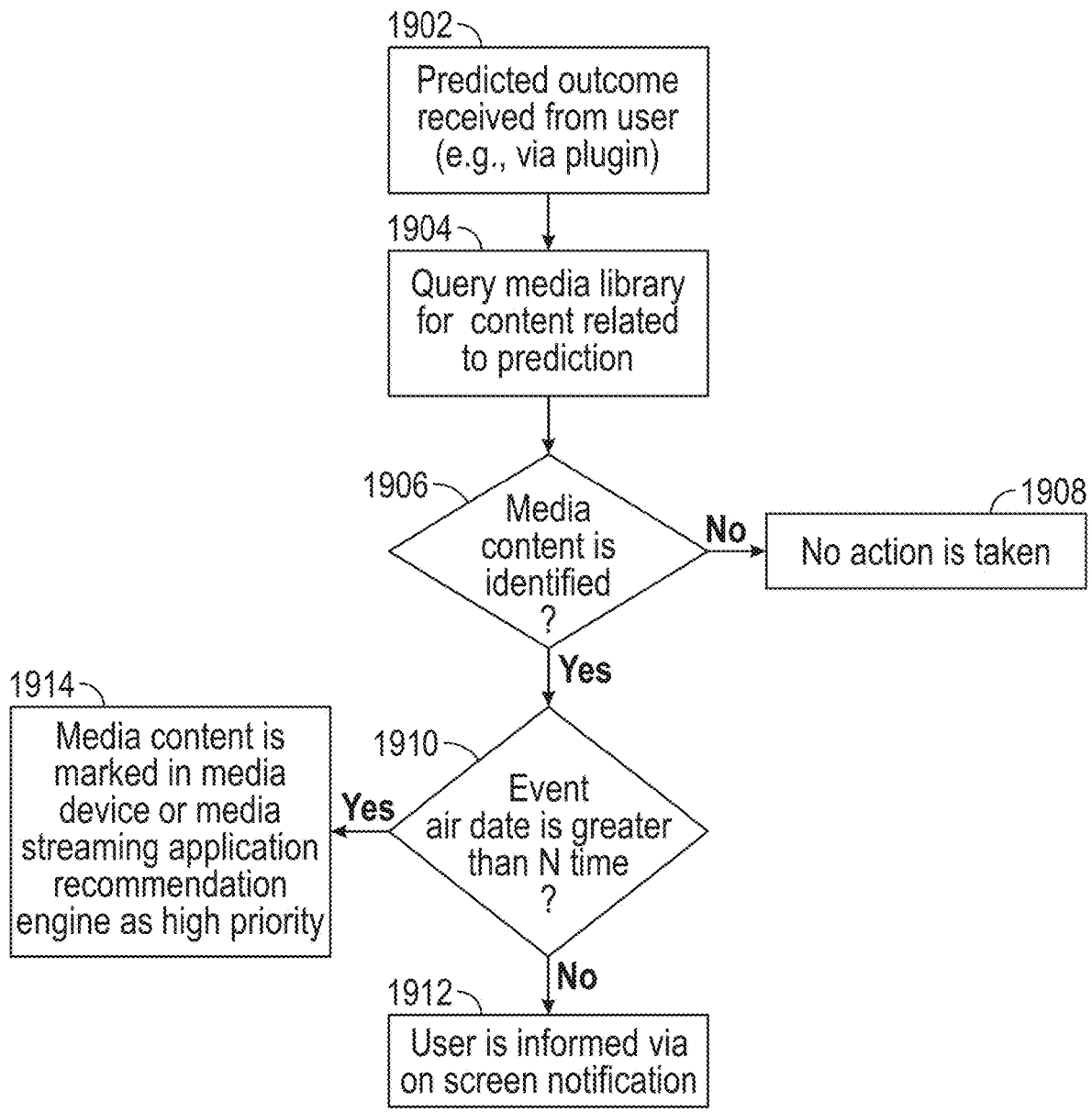
FIG. 19 is a flowchart of an illustrative process for notifying a user of availability of content associated with a selected prediction, in accordance with some embodiments of this disclosure.

FIG. 19 is a flowchart of an illustrative process 1900 for notifying a user of availability of content associated with a selected prediction, in accordance with some embodiments of this disclosure. In various embodiments, the individual steps of process 1900 may be implemented by one or more components of the devices, systems and methods of FIGS. 1-22 and may be performed in combination with any of the other processes and aspects described herein. Although the present disclosure may describe certain steps of process 1900 (and of other processes described herein) as being implemented by certain components of the devices, systems and methods of FIGS. 1-22, this is for purposes of illustration only. It should be understood that other components of the devices, systems and methods of FIGS. 1-22 may implement those steps instead.

At 1902, control circuitry (e.g., control circuitry 404 of FIG. 4 and/or control circuitry 511 of FIG. 5) and/or I/O circuitry 402 or 512 of FIGS. 4-5, may receive a selection of a predicted outcome from a user (e.g., via the plugin provider, at a device executing an application, such as a mobile application, for example, associated with the plugin provider). In some embodiments, such prediction may be selected at a device (e.g., a PC or a mobile device) that is separate from a device (e.g., computing device 102) that is playing (or is to play) the media asset associated with the prediction. For example, the plugin may inform the media application and/or computing device that a prediction has been selected for a media asset that the computing device and/or media application may deliver to the user, and the user may be presented with the option of recording, tuning to, accessing, and/or playing the event.

At 1904, the control circuitry (e.g., via plugin 226 of FIG. 2) may query a media library (e.g., content source 502 of FIG. 5) associated with the media application for media content related to or associated with or linked to the prediction (e.g., the NFL game shown in FIGS. 1A-1B). At 1906, if such related content is identified, processing may proceed to 1910; otherwise content may proceed to 1908, where no further action may be taken. At 1910, the control circuitry may determine whether an air date of the identified content is greater than a threshold amount of time (e.g., 20 minutes or any other suitable time period) away from a current time. If so, processing may proceed to 1914; otherwise processing may proceed to 1912. At 1912, the user may be informed via an on-screen notification that the start time of the media asset is relatively far away from the current time. At 1914, the media content may be marked as high priority in a recommendation engine of the media application, and the user may be notified of that. In either 1912 or 1914, the user may be provided with, e.g., supplemental content such as, for example, advertisements, tailored to the user's interests indicated in his or her profile. In some embodiments, a priority for supplemental content (e.g., one or more advertisements) may be set based on whether the event or media content has a selected predicted outcome associated with the event or media content.

Figure 20:
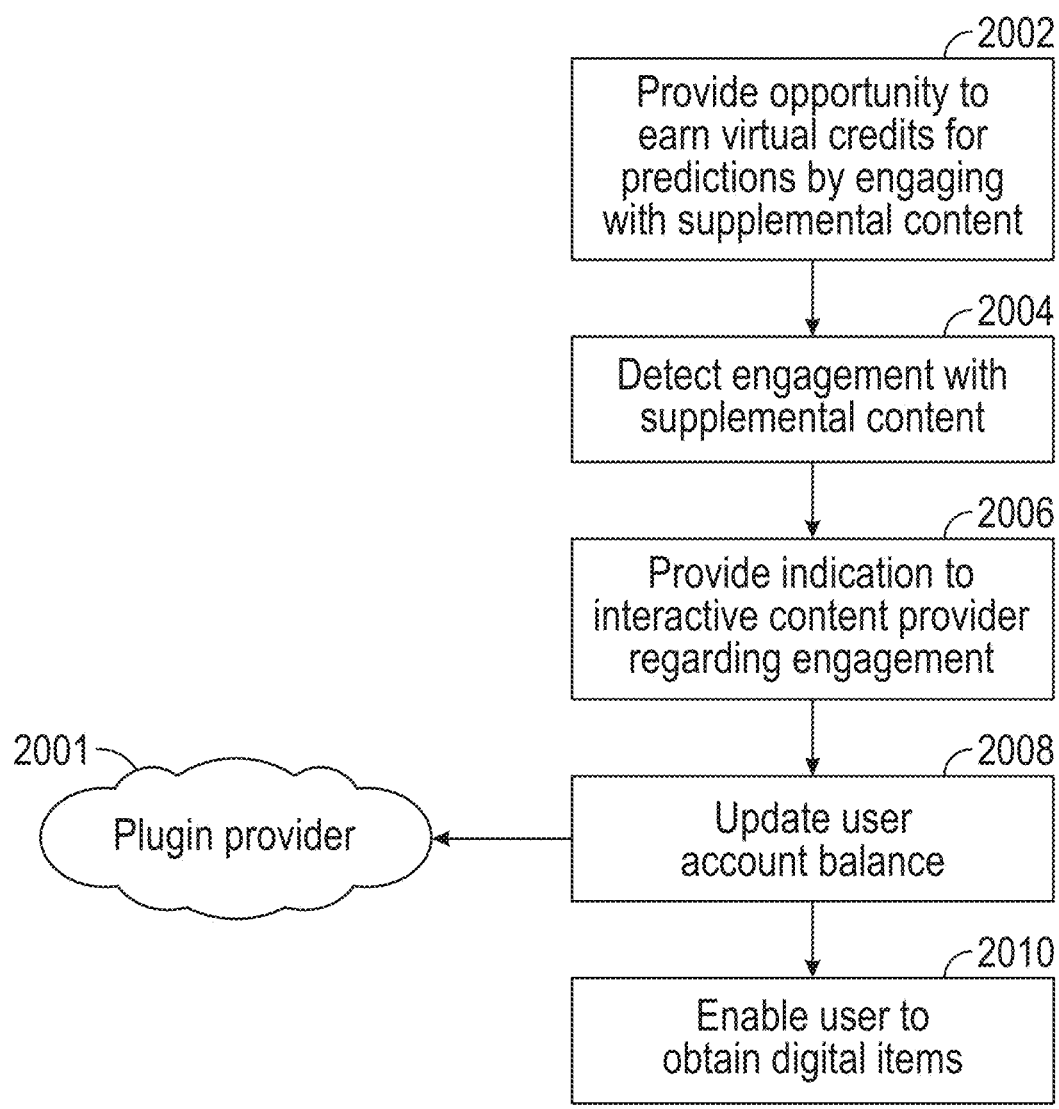
FIG. 20 is a flowchart of an illustrative process for updating a user's account balance based on detecting engagement with supplemental content, in accordance with some embodiments of this disclosure.

FIG. 20 is a flowchart of an illustrative process 2000 for updating a user's account balance based on detecting engagement with supplemental content, in accordance with some embodiments of this disclosure. In various embodiments, the individual steps of process 1900 may be implemented by one or more components of the devices, systems and methods of FIGS. 1-22 and may be performed in combination with any of the other processes and aspects described herein. Although the present disclosure may describe certain steps of process 1900 (and of other processes described herein) as being implemented by certain components of the devices, systems and methods of FIGS. 1-22, this is for purposes of illustration only. It should be understood that other components of the devices, systems and methods of FIGS. 1-22 may implement those steps instead.

At 2002, the control circuitry (e.g., control circuitry 404 of FIG. 4 and/or control circuitry 511 of FIG. 5) and/or I/O circuitry 402 or 512 of FIGS. 4-5, may provide and/or receive (e.g., from a supplemental content provider, such as, for example, an advertiser and/or advertisement plugin provider) an opportunity to earn virtual credits for predictions by engaging with supplemental content. At 2004, the control circuitry may detect engagement with supplemental content, e.g., by determining that a user has consumed an entirety of the supplemental content; that a user has consumed at least a threshold amount of the supplemental content; that a user has selected the supplemental content during playback (and subsequently been transported to a website associated with the advertiser), such as, at a particular time during the content or during an advertisement or commercial) at a particular time or randomized time; that a user has answered a survey associated with the supplemental content; or any other engagement; or any combination thereof.

At 2006, the control circuitry and/or I/O circuitry may provide (e.g., via the supplemental content provider) an indication to the interactive content provider (e.g., which provides interactive content 103 and/or 106 of FIGS. 1A-1B, and which may correspond to plugin provider 2001) regarding the detected engagement at 2004. At 2008, the interactive content provider may update an account balance of the user (e.g., having engaged with the supplemental content) with virtual credits based on such engagement, to enable the user (at 2010) to obtain digital items (e.g., to be associated by the user with a future predicted outcome, and/or badges and/or the ability to watch a media asset without advertisements, and/or any other suitable digital item or reward). The user may earn virtual credits over time, as he or she engages with supplemental content, and such virtual credits may accumulate in the user's profile. In some embodiments, a supplemental content provider may allow users to use the virtual credits in order to reduce future advertisements or to earn digital assets.

Figure 21:
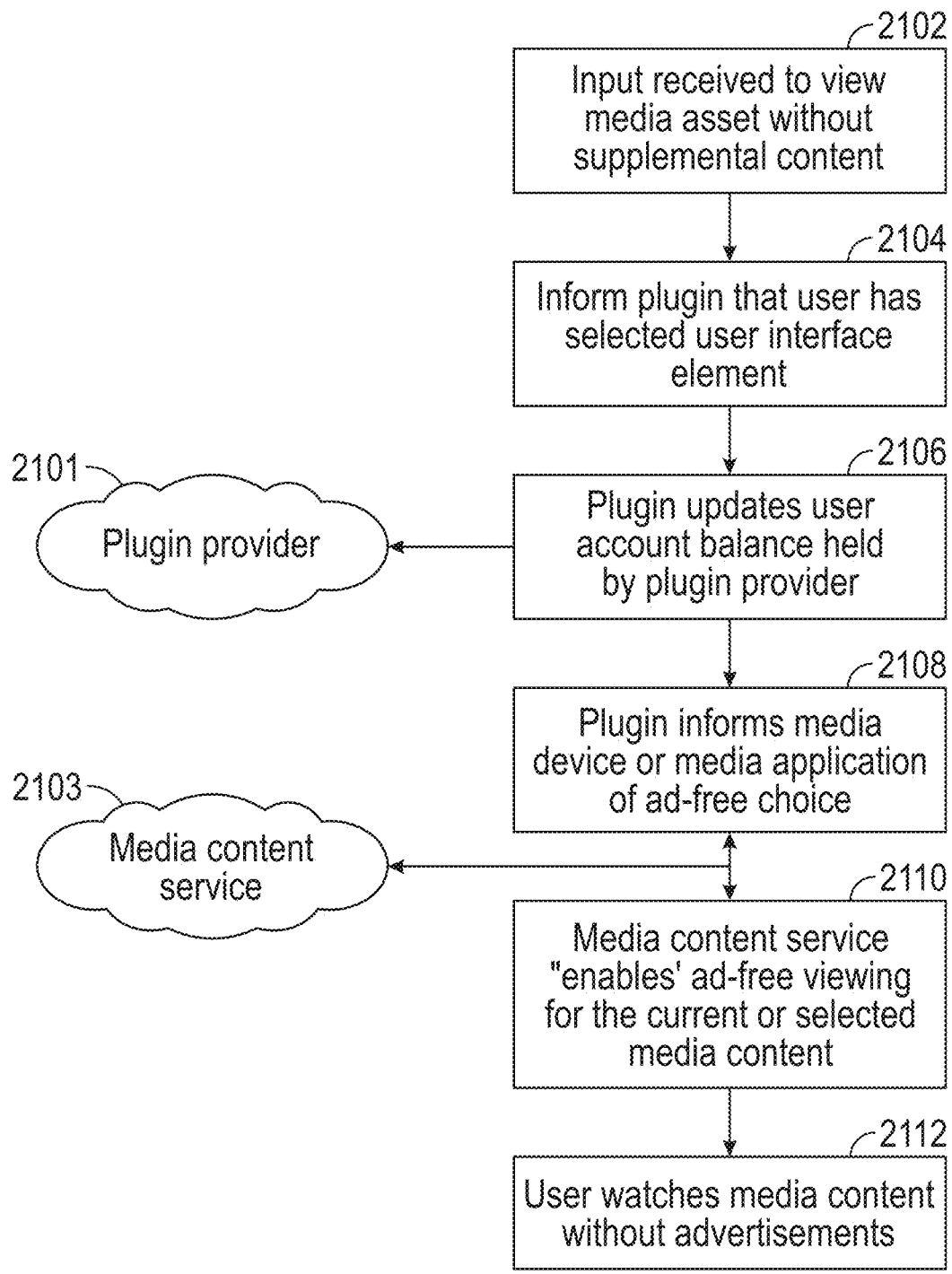
FIG. 21 is a flowchart of an illustrative process for enabling a user to consume content based on earned virtual credits, in accordance with some embodiments of this disclosure.

FIG. 21 is a flowchart of an illustrative process 2000 for enabling a user to consume content based on earned virtual credits, in accordance with some embodiments of this disclosure. In various embodiments, the individual steps of process 2000 may be implemented by one or more components of the devices, systems and methods of FIGS. 1-22 and may be performed in combination with any of the other processes and aspects described herein. Although the present disclosure may describe certain steps of process 2000 (and of other processes described herein) as being implemented by certain components of the devices, systems and methods of FIGS. 1-22, this is for purposes of illustration only. It should be understood that other components of the devices, systems and methods of FIGS. 1-22 may implement those steps instead.

At 2102, the control circuitry (e.g., control circuitry 404 of FIG. 4 and/or control circuitry 511 of FIG. 5) and/or I/O circuitry 402 or 512 of FIGS. 4-5, may determine that user input has been received indicating (e.g., based on selection of a user interface element) a desire to watch content without supplemental content (e.g., without advertisements) within the media application, e.g., using virtual credits accumulated based on the process discussed in FIG. 20. In some embodiments, such earned credits or points may be earned by viewing supplemental content for any suitable content, e.g., e-sports, fantasy sports, gaming, on-line gaming, video enhancements for sports/games, and/or any other suitable content.

At 2104, the control circuitry may inform the plugin (e.g., plugin 226 of FIG. 2) of the user's selection of the user interface element. At 2106, the control circuitry may update the user's account balance (e.g., to reduce a certain amount of virtual credits used to view content without supplemental content). While supplemental content (e.g., advertisements) may not be included in such viewing of the media asset, the viewing of the media asset may still include interactive content (e.g., to provide an opportunity to select predicted outcomes). At 2108, the control circuitry (e.g., via the plugin) may indicate to the computing device the user's input (e.g., to consume the media asset without supplemental content). At 2110, the control circuitry may enable viewing of the media asset without supplemental content (e.g., advertisements). At 2112, the control circuitry may enable the user to consume the media asset without the supplemental content.

Figure 22A:
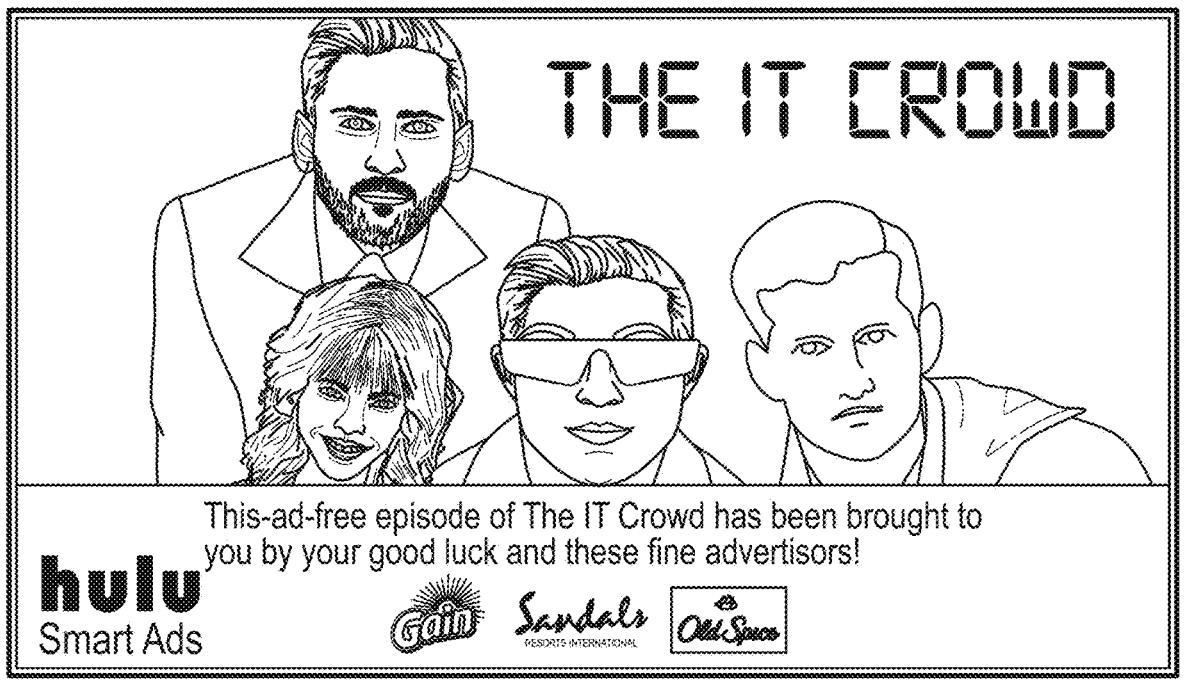
FIGS. 22A-22C show illustrative interfaces, in accordance with some embodiments of this disclosure.
Figure 22B:
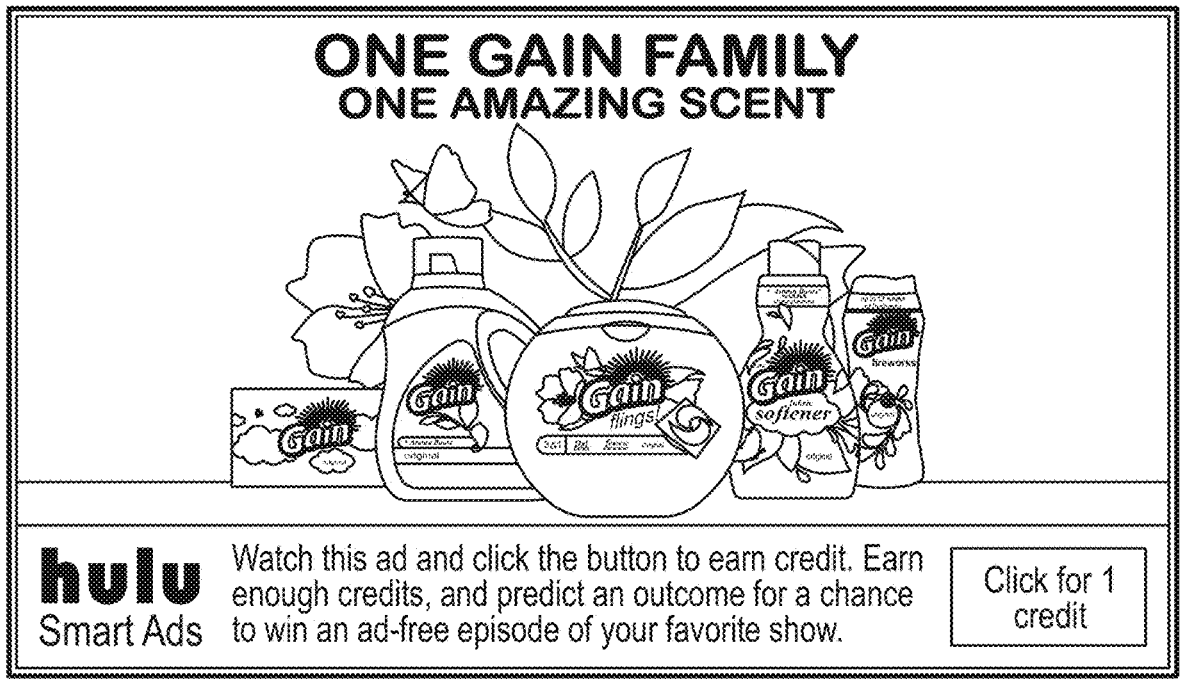
Figure 22C:
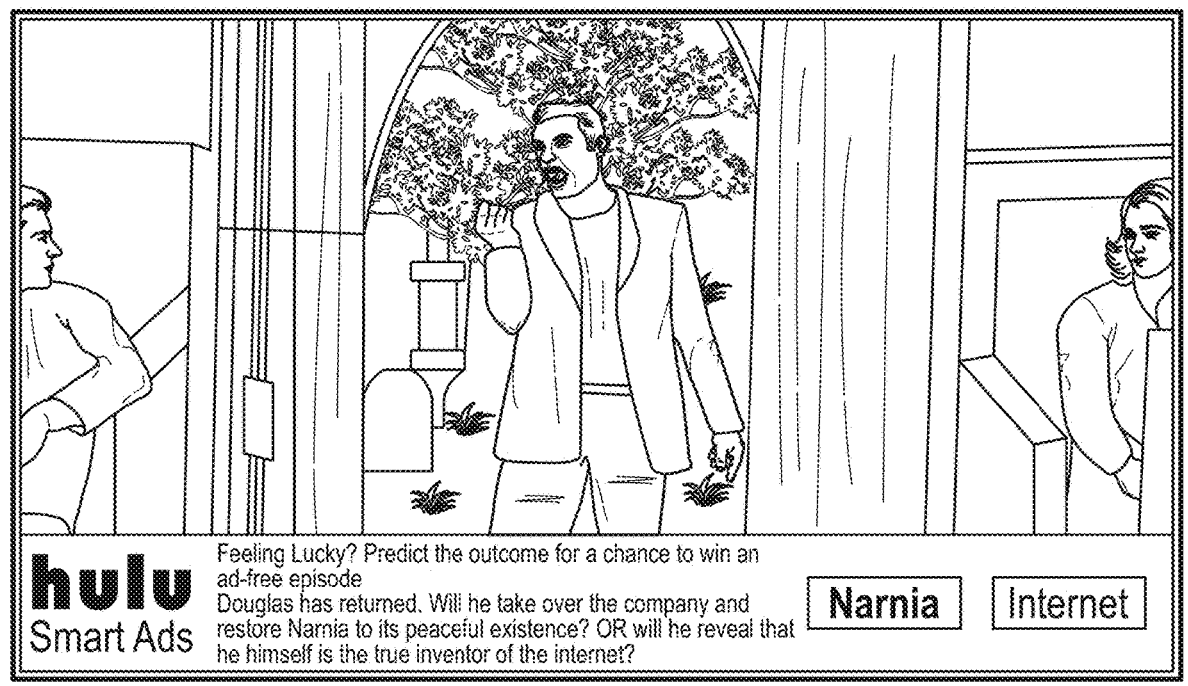

In some embodiments, as shown in FIGS. 22A-22C, the control circuitry may provide interfaces to the user indicating that if the user accumulates enough credits, the user may be permitted to predict an outcome (e.g., as shown in FIG. 22C, will the character Douglas take over the company and restore Narnia to its peaceful existence, or will he reveal himself as the true inventor of the Internet), for a chance to win an ad-free future episode or other content if such prediction is correct.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method, comprising:
    generating, for presentation at a particular computing device, a display of a live program;
    determining that the display of the live program at the particular computing device is delayed in relation to a live program stream of the live program;
    receiving interactive content related to a particular event that is to occur in the live program stream of the live program, wherein the interactive content enables selection of a predicted outcome of the particular event;
    generating, for presentation at the particular computing device, and prior to presentation of the particular event in the display of the live program at the particular computing device, the interactive content;
    receiving, via the particular computing device, the selection of the predicted outcome associated with the interactive content;
    generating, for presentation at the particular computing device, the particular event; and
    during the presentation of the particular event and prior to a conclusion of the presentation of the particular event in the display of the live program at the particular computing device:
        receiving an indication of an outcome of the particular event; and
        based on receiving the indication, generating, for presentation at the particular computing device, an indication of whether the predicted outcome was correct.

2. The method of claim 1, wherein the generating, for presentation at the particular computing device, of the interactive content further comprises generating, for simultaneous presentation at the particular computing device:
    an indication that the particular event is occurring or is about to occur in the live program stream of the live program;
    an indication of an amount of time that the display of the live program is delayed relative to the particular event; and
    selectable indications of a plurality of potential outcomes of the particular event, the plurality of potential outcomes including the selected predicted outcome.

3. The method of claim 1, wherein the interactive content is provided by a content provider that is providing the display of the live program.

4. The method of claim 1, wherein a content provider is providing the display of the live program, the interactive content is provided as a plugin by an interactive content provider to the content provider, and the content provider is distinct from the interactive content provider.

5. The method of claim 4, wherein the display of the live program is being provided to a user of the particular computing device, the method further comprising:
    determining whether the user is permitted to access the interactive content by:
        generating, by the content provider, a token indicative of a location of the user;
        transmitting the token to the interactive content provider; and
        determining, by the interactive content provider and based on the location, whether the user is permitted to access the interactive content.

6. The method of claim 1, wherein the display of the live program is being provided to a user of the particular computing device, the method further comprising:
    determining whether the user is permitted to access the interactive content; and
    in response to determining that the user is permitted to access the interactive content, generating for presentation interactive content enabling, for a remainder of the display of the live program, selection of predicted outcomes of a plurality of events that are to occur in the live program stream of the live program.

7. The method of claim 6, further comprising:
    receiving a request to cease the presentation of the display of the live program; and
    based on the request, causing the presentation of the display of the live program to be ceased and revoking the permission to access the interactive content.

8. The method of claim 1, wherein the display of the live program is being provided to a user of the particular computing device, the user is a first user, the particular computing device is a first computing device, the selection of the predicted outcome is a first selection, and the method further comprising:
    determining that a second user is consuming the live program at a second computing device;
    generating for presentation, at the second computing device, the interactive content enabling a second selection of a predicted outcome of the particular event;

receiving, via the second computing device, the second selection of the predicted outcome associated with the interactive content;

determining that the first selection matches the second selection; and generating for display an indication at the first and second computing devices that the first selection of the first user matches the second selection of the second user.

9. The method of claim 1, wherein the display of the live program is being provided to a user of the particular computing device, the user is a first user, the particular computing device is a first computing device, the selection of the predicted outcome is a first selection, and the method further comprising:

determining that a second user is consuming the live program at a second computing device;

generating for presentation, at the second computing device, the interactive content enabling a second selection of a predicted outcome of the particular event;

receiving, via the second computing device, the second selection of the predicted outcome associated with the interactive content;

determining that the first selection is contrary to the second selection; and generating for display an indication at the first and second computing devices that the first selection of the first user is contrary to the second selection of the second user.

10. The method of claim 1, further comprising:

identifying a plurality of interactive content providers, wherein generating for presentation the interactive content, at the particular computing device and prior to presentation of the particular event in the display of the live program at the particular computing device, comprises generating for presentation a plurality of interactive content items respectively associated with different interactive content providers.

11. The method of claim 1, wherein the display of the live program is being provided to a user of the particular computing device, the method further comprising:

storing a portion of the live program depicting the particular event to enable consumption of the particular event by the user at a future time;

generating for presentation a selectable option to consume the particular event; and in response to receiving selection of the selectable option at the future time, generating for presentation the depiction of the particular event.

12. The method of claim 1, wherein the display of the live program is being provided to a user of the particular computing device, the method further comprising:

determining historical predicted outcomes previously selected by the user; and determining whether to generate for presentation the interactive content based on the historical predicted outcomes previously selected by the user.

13. A computer-implemented system, comprising:

input/output (I/O) circuitry configured to:

control circuitry configured to:

generate, for presentation at a particular computing device, a display of a live program; and determine that the display of the live program at the particular computing device is delayed in relation to a live program stream of the live program;

wherein the I/O circuitry is configured to:

receive interactive content related to a particular event that is to occur in the live program stream of the live program, wherein the interactive content enables selection of a predicted outcome of the particular event;

wherein the control circuitry is configured to:

generate, for presentation at the particular computing device, and prior to presentation of the particular event in the display of the live program at the particular computing device, the interactive content;

wherein the I/O circuitry is configured to:

receive, via the particular computing device, the selection of the predicted outcome associated with the interactive content;

wherein the control circuitry is configured to:

generate, for presentation at the particular computing device, the particular event;

wherein the I/O circuitry is configured to:

during the presentation of the particular event and prior to a conclusion of the presentation of the particular event in the display of the live program at the particular computing device:

receive an indication of an outcome of the particular event; and wherein the control circuitry is configured to:

based on receiving the indication, generate, for presentation at the particular computing device, an indication of whether the predicted outcome was correct.

14. The system of claim 13, wherein the interactive content comprises:

an indication that the particular event is occurring or is about to occur in the live program stream of the live program;

an indication of an amount of time that the display of the live program is delayed relative to the particular event; and selectable indications of a plurality of potential outcomes of the particular event, the plurality of potential outcomes including the selected predicted outcome.

15. The system of claim 13, wherein the interactive content is provided by a content provider that is providing the display of the live program.

16. The system of claim 13, wherein a content provider is providing the display of the live program, the interactive content is provided as a plugin by an interactive content provider to the content provider, and the content provider is distinct from the interactive content provider.

17. The method of claim 1, wherein the live program is a sporting event, the particular event is associated with a particular player in the sporting event, and when the interactive content is presented in the display of the live program at the particular computing device, the player is not being presented.

18. The method of claim 17, wherein generating for presentation the interactive content further comprises generating for simultaneous presentation at the particular computing device:

an option for receiving the selection of the predicted outcome;

an indication of the player; and one or more statistics of the player in relation to the particular event.

19. The method of claim 1, wherein the interactive content is presented in the display of the live program at the particular computing device during a pregame portion of the sporting event or a halftime portion of the sporting event.

* * * * *